United States Patent
Suslick et al.

(10) Patent No.: US 11,047,836 B2
(45) Date of Patent: Jun. 29, 2021

(54) POLYMER MICROCOLUMN FOR GAS OR VAPOR SEPARATION, CHROMATOGRAPHY, AND ANALYSIS

(71) Applicant: The Board of Trustees of the University of Illinois, Urbana, IL (US)

(72) Inventors: Kenneth S. Suslick, Champaign, IL (US); Jordan J. Hinman, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 261 days.

(21) Appl. No.: 15/941,404

(22) Filed: Mar. 30, 2018

(65) Prior Publication Data
US 2018/0292364 A1    Oct. 11, 2018

Related U.S. Application Data

(60) Provisional application No. 62/479,360, filed on Mar. 31, 2017.

(51) Int. Cl.
| | |
|---|---|
| *G01N 30/00* | (2006.01) |
| *G01N 30/60* | (2006.01) |
| *B01D 53/02* | (2006.01) |
| *B01D 53/04* | (2006.01) |

(Continued)

(52) U.S. Cl.
CPC ....... *G01N 30/6052* (2013.01); *B01D 53/025* (2013.01); *B01D 53/0423* (2013.01); *B01J 20/285* (2013.01); *B01J 20/3272* (2013.01); *G01N 30/6073* (2013.01); *G01N 30/6095* (2013.01); *B01D 2253/202* (2013.01); *B01D 2253/34* (2013.01); *B01J 2220/54* (2013.01); *B01J 2220/86* (2013.01)

(58) Field of Classification Search
CPC .................................................. G01N 30/6052
See application file for complete search history.

(56) References Cited

U.S. PATENT DOCUMENTS

| | | |
|---|---|---|
| 4,471,647 A | 9/1984 | Jerman et al. |
| 6,068,684 A | 5/2000 | Overton et al. |

(Continued)

OTHER PUBLICATIONS

Angell, "Silicon Micromechanical devices", *Scientific American*, 248 (4):44 (1983).

(Continued)

*Primary Examiner* — Timothy Kennedy
(74) *Attorney, Agent, or Firm* — Leydig, Voit & Mayer, Ltd.

(57) ABSTRACT

In an aspect, a method for forming a microcolumn comprises steps of: (a) providing a sacrificial fiber; (b) forming a microcolumn body around said sacrificial fiber; and (c) removing said sacrificial fiber from said microcolumn body such that a hollow channel is formed within said microcolumn body via removal of said sacrificial fiber. In any embodiment of the methods disclosed herein for forming a microcolumn, said hollow channel extends through said microcolumn body and is continuous between a first end and a second end. The first end may be an inlet and the second end may be an outlet, for example, allowing for a mobile phase to enter the hollow channel via the first end and exit via the second end.

19 Claims, 30 Drawing Sheets

(51) Int. Cl.
B01J 20/285 (2006.01)
B01J 20/32 (2006.01)

(56) References Cited

U.S. PATENT DOCUMENTS

| | | | |
|---|---|---|---|
| 6,113,722 A * | 9/2000 | Hoffman | B81C 99/0085 |
| | | | 156/155 |
| 7,147,695 B2 | 12/2006 | Mitra | |
| 7,273,517 B1 | 9/2007 | Lewis et al. | |
| 7,513,936 B2 | 4/2009 | Roques | |
| 7,790,084 B1 * | 9/2010 | Wapner | B01D 17/10 |
| | | | 264/271.1 |
| 8,123,841 B2 | 2/2012 | Masel et al. | |
| 8,132,443 B2 | 3/2012 | McGill et al. | |
| 2004/0255643 A1 | 12/2004 | Wise et al. | |
| 2009/0211452 A1 | 8/2009 | Masel et al. | |
| 2014/0106454 A1 * | 4/2014 | Lenardi | B81C 1/00523 |
| | | | 435/396 |
| 2014/0162519 A1 * | 6/2014 | Dong | D03D 15/00 |
| | | | 442/181 |
| 2015/0240072 A1 | 8/2015 | Esser-Kahn et al. | |
| 2015/0300998 A1 | 10/2015 | Suslick et al. | |

OTHER PUBLICATIONS

Bae et al., "Development of a portable gas analyzer using a micro-Gas Chromatograph/Flame Ionization Detector (micro-GC/FID) for NASA's environmental missions", 42nd International Conference on Environmental Systems, American Institute of Aeronautics and Astronautics (2012).
Bhushan et al., "Fabrication and Preliminary Results for LiGA Fabricated Nickel Micro Gas Chromatograph Columns", *J. Microelectromechanical Systems*, 16 (2): 383-393 (2007).
Bhushan et al., "Fabrication of micro-gas chromatograph columns for fast chromatography", *Microsyst. Technol.*, 13 (3-4): 361-368 (2007).
Chen et al., "A multidimensional micro gas chromatograph employing a parallel separation multi-column chip and stop-flow µGCxµGCs configuration", *Lab on a Chip*, 13 (7): 1333-1341 (2013).
Dong et al., "Chemical Treatment of Poly(lactic acid) Fibers to Enhance the Rate of Thermal Depolymerization", *ACS Appl. Mater. Interfaces*, 4 (2): 503-509 (2012).
Esser-Kahn et al., "Three-Dimensional Microvascular Fiber-Reinforced Composites", *Advanced Materials*, 23(32): 3654-3658 (2011).
Haghighi et al., "Through the years with on-a-chip gas chromatography: a review", *Lab on a Chip*, 15 (12): 2559-2575 (2015).
Halliday et al., "Lab-on-a-Chip GC for Environmental Research", *LC GC Europe*, 23(10): 514 (2010).
He et al., "Fabrication of Nanocolumns for Liquid Chromatography", *Analytical Chemistry*, 70 (18): 3790-3797 (1998).
Hsieh et al., "A miniature closed-loop gas chromatography system", *Lab on a Chip*, 16 (6): 1002-1012 (2016).
Kim et al., "Microfabricated Gas Chromatograph for the Selective Determination of Trichloroethylene Vapor at Sub-Parts-Per-Billion Concentrations in Complex Mixtures", *Analytical Chemistry*, 83 (18): 7198-7206 (2011).
Kolesar et al., "Review and summary of a silicon micromachined gas chromatography system," *IEEE Trans. Compon., Packag., Manuf. Technol., Part B*, 21: 324-328 (1998).
Kuo et al., "Disposable microfluidic substrates: transitioning from the research laboratory into the clinic", *Lab on a Chip*, 11 (16): 2656-2665 (2011).
Lambertus et al., "Design, Fabrication, and Evaluation of Microfabricated Columns for Gas Chromatography", *Analytical Chemistry*, 76 (9): 2629-2637 (2004).
Lambertus et al., "Silicon Microfabricated Column with Microfabricated Differential Mobility Spectrometer for GC Analysis of Volatile Organic Compounds", *Analytical Chemistry*, 77 (23): 7563-7571 (2005).
Lambertus et al., "Stop-Flow Programmable Selectivity with a Dual-Column Ensemble of Microfabricated Etched Silicon Columns and Air as Carrier Gas", *Analytical Chemistry*, 77 (7): 2078-2084 (2005).
Lee et al., "High-performance MEMS-based gas chromatography column with integrated micro-heater," 2010 Symposium on Design Test Integration and Packaging of MEMS/MOEMS (DTIP), pp. 190-194. (May 5-7, 2010).
Lindner, The µChemLab™ project: "Micro total analysis system R&D at Sandia National Laboratories" *Lab on a Chip—Minituarization for Chemistry and Biology*, 1 (1), 15N-19N (2001).
Liu et al., "Demonstration of motionless Knudsen pump based micro-gas chromatography featuring micro-fabricated columns and on-columns detectors", *Lab on a Chip*, 11 (20): 3487-3492 (2011).
Lorenzelli et al. "Development of a gas chromatography silicon-based microsystem in clinical diagnostics", *Biosens. Bioelectron.*, 20: 1968-1976 (2005).
Lu et al., "First-generation hybrid MEMS gas chromatograph", *Lab on a Chip*, 5 (10): 1123-1131 (2005).
Lu et al., "Portable Gas Chromatograph with Tunable Retention and Sensor Array Detection for Determination of Complex Vapor Mixtures", *Analytical Chemistry*, 75 (6): 1400-1409 (2003).
Lucklum et al., "Miniature 3D gas chromatography columns with integrated fluidic connectors using high-resolution stereolithography fabrication", *Procedia Engineering*, 120: 703-706 (2015).
Malainou et al., "The fabrication of a microcolumn for gas separation using poly(dimethylsiloxane) as the structural and functional material", *J. of Micromechanics and Microengineering*, 18 (10): 105007 (2008).
Ngan et al., "High power density laser etching of silicon", *Journal of Applied Physics*, 83 (3): 1637-1641 (1998).
Nguyen et al., "Three-Dimensional Conformal Coatings through the Entrapment of Polymer Membrane Precursors", *ACS Appl. Mater. Interfaces*, 6 (4): 2830-2835 (2014).
Noh et al., "Parylene gas chromatographic column for rapid thermal cycling", *J. of microelectromechanical systems*, 11 (6): 718 (2002).
Ohira et al., "Micro gas analyzers for environmental and medical applications", *Analytica Chimica Acta*, 619 (2): 143-156 (2008).
Pai et al., "Microfabricated Gas Chromatograph for Trace Analysis, Technologies for Homeland Security", 2008 IEEE Conference, pp. 150-154 (May 12-13, 2008).
Potkay et al., "A low-power pressure- and temperature-programmable micro gas chromatography column", *J. Microelectromech. Syst.*, pp. 1071-1079 (2007).
Radadia et al., "Micromachined GC Columns for Fast Separation of Organophosphonate and Organosulfur Compounds", *Analytical Chemistry*, 80 (11): 4087-4094 (2008).
Radadia et al., "Partially Buried Microcolumns for Micro Gas Analyzers", *Analytical Chemistry*, 81 (9): 3471-3477 (2009).
Radadia et al., "The fabrication of all-silicon micro gas chromatography columns using gold diffusion eutectic bonding", *J. of Micromechanics and Microengineering*, 20 (1): 015002 (2010).
Rankin et al., "The development of a disposable gas chromatography microcolumn", *Chemical Communications*, 51 (43): 8920-8923 (2015).
Reidy, "High-Performance Micro-Fabricated Gas Chromatography Columns for Complex Mixture Analysis," Dissertation, The University of Michigan, Online, (2009).
Reidy et al., "Temperature-programmed GC using silicon microfabricated columns with integrated heaters and temperature sensors", *Anal. Chem.*, 79: 2911-2917 (2007).
Reidy et al., "High-Performance, Static-Coated Silicon Microfabricated Columns for Gas Chromatography", *Analytical Chemistry*, 78 (8): 2623-2630 (2006).
Reston et al., "Silicon-micromachined gas chromatography system used to separate and detect ammonia and nitrogen dioxide. I. Design, fabrication, and integration of the gas chromatography system", *J. of Microelectromechanical Systems*, 3: 134-146 (1994).
Sacks et al., "Pressure-tunable dual-column ensembles for high-speed GC and GC/MS", *J. High Resolut. Chromatogr.*, 23: 25-234 (2000).

(56) References Cited

OTHER PUBLICATIONS

Serrano et al., "Assessing the reliability of wall-coated microfabricated gas chromatographic separation columns", *Sensors and Actuators B: Chemical*, 141 (1): 217-226 (2009).

Sumpter et al., "Enhanced radial dispersion in open tubular column chromatography", *J. of Microcolumn Separations*, 3 (2): 91-113 (1991).

Terry et al., "A gas chromatographic air analyzer fabricated on a silicon wafer", *Electron Devices*, IEEE Transactions on 1979, 26 (12): 1880-1886 (1979).

Yuan et al., "MEMS-based column coated with reduced graphene oxide as stationary phase for gas chromatography", *RSC Advances*, 7 (52): 32749-32756 (2017).

\* cited by examiner

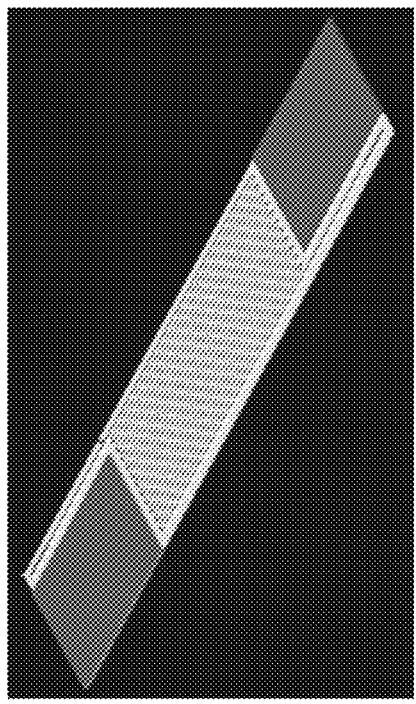 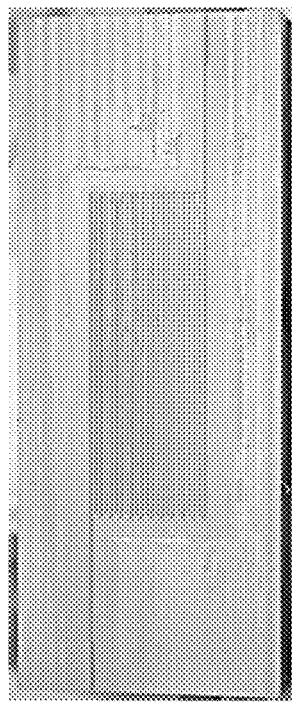 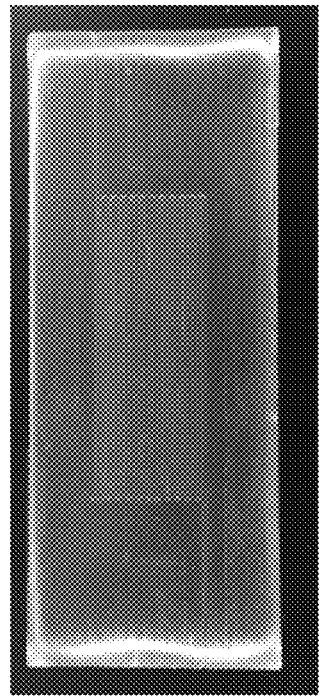
FIG. 1A    FIG. 1B    FIG. 1C
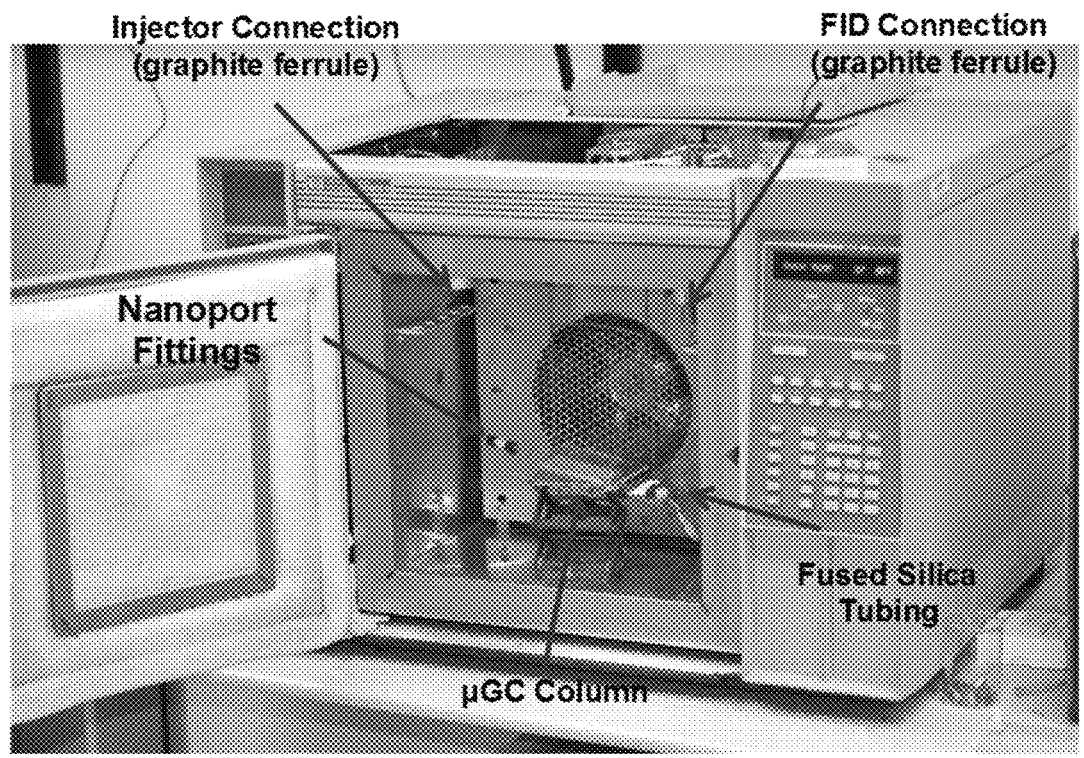
FIG. 2

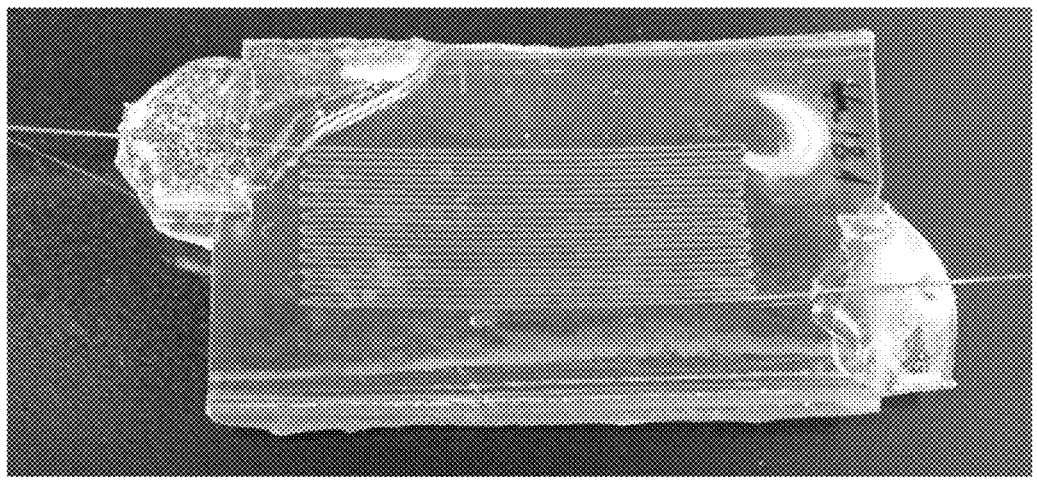
FIG. 3
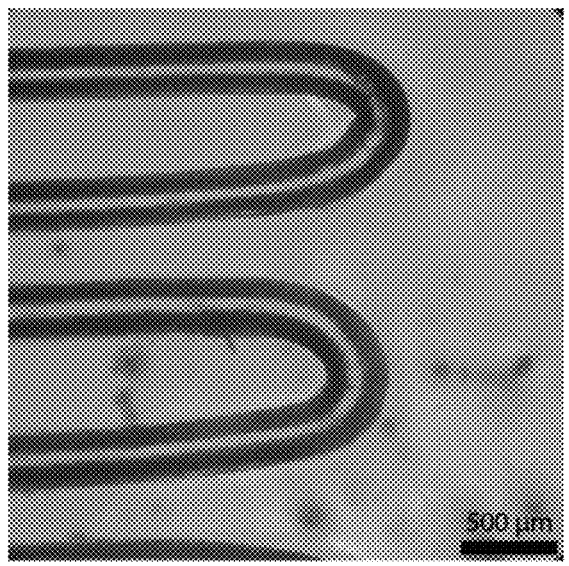 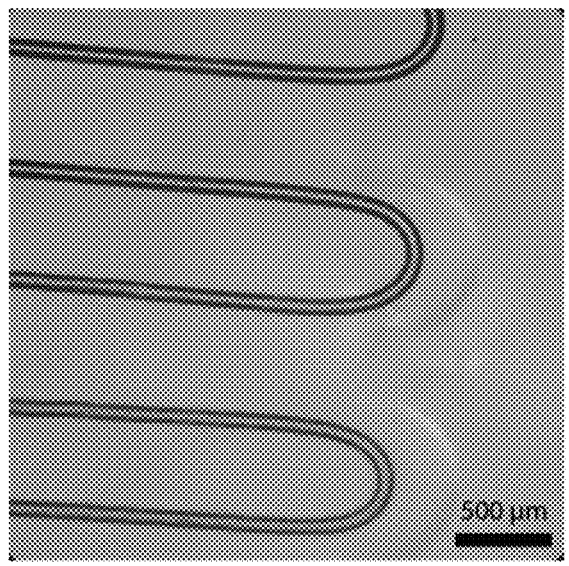
FIG. 4A  FIG. 4B

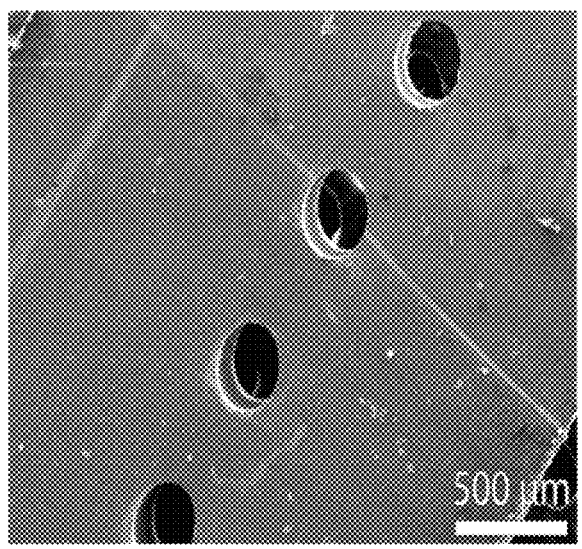 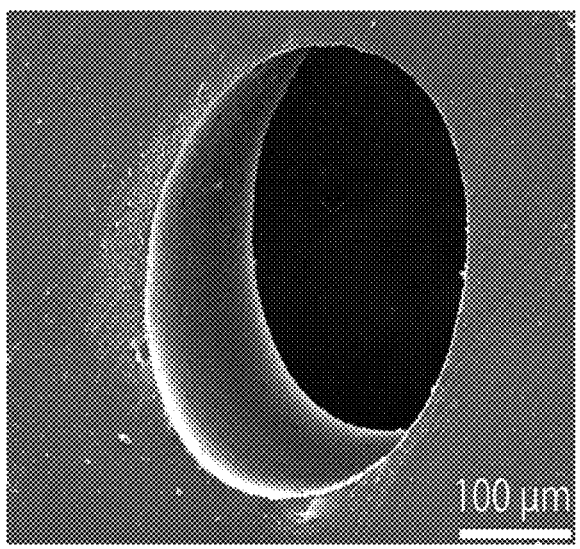
FIG. 5A  FIG. 5B
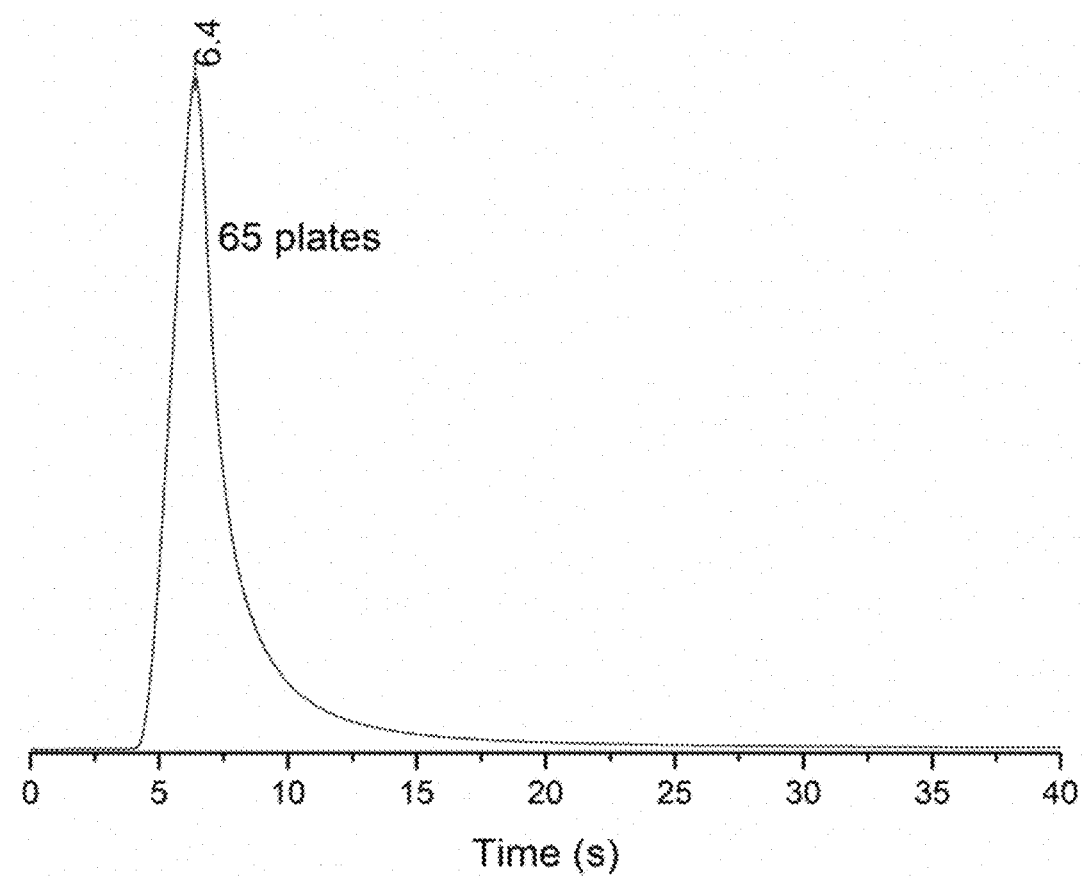
FIG. 6

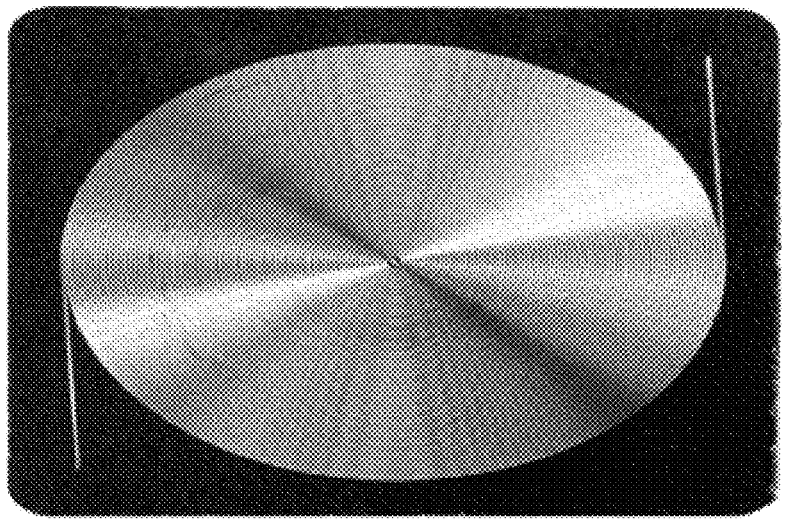
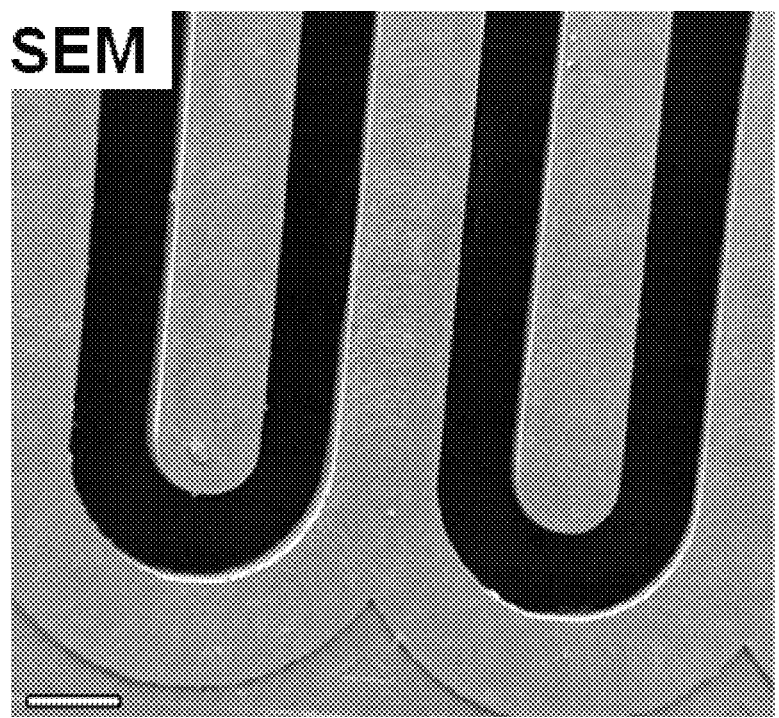
FIG. 12

100:1 split ratio, F=1.7 mL min$^{-1}$, $u$=40 cm s$^{-1}$ 0.02 µL injection

100:1 split ratio, F=1.7 mL min$^{-1}$,
$u$=40 cm s$^{-1}$ 0.02 µL injection

| Chemical | Center (s) | Plate Count |
|---|---|---|
| 1. Heptane | 5.40 | 1500 |
| 2. Octane | 6.20 | 740 |
| 3. Nonane | 8.90 | 320 |
| 4. Decane | 17.10 | 120 |
| 5. Undecane | 41.55 | 70 |

100:1 split ratio, F=1.7 mL min$^{-1}$, $u$=40 cm s$^{-1}$ 0.02 μL injection

| Chemical | Center (s) | Plate Count |
|---|---|---|
| 1. Heptane | 5.25 | 1800 |
| 2. Octane | 6.00 | 1100 |
| 3. Nonane | 8.10 | 330 |
| 4. Decane | 14.35 | 120 |
| 5. Undecane | 33.75 | 70 |

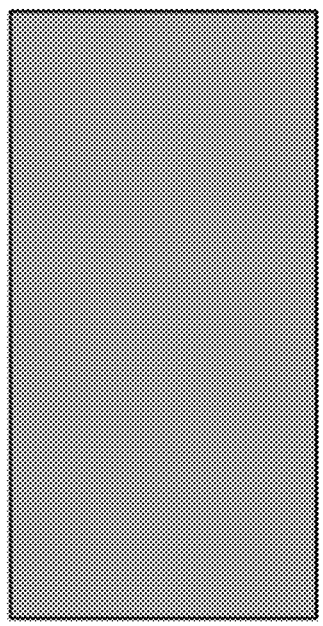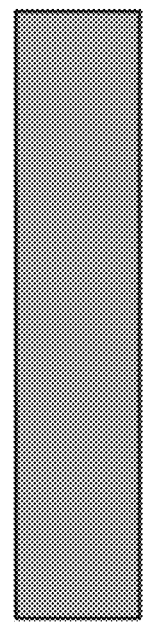
250 x 500 μm      100 x 500 μm
$1.25 \times 10^5$ μm$^2$     $5.00 \times 10^4$ μm$^2$
FIG. 32A
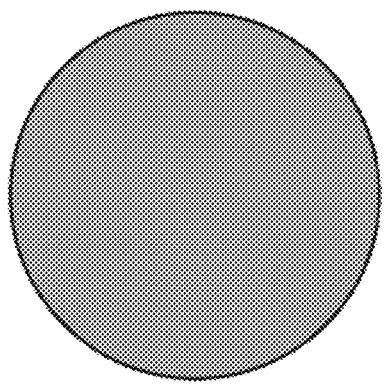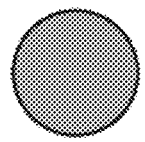
300 μm diameter      100 μm diameter
$7.07 \times 10^4$ μm$^2$     $7.85 \times 10^3$ μm$^2$
FIG. 32B

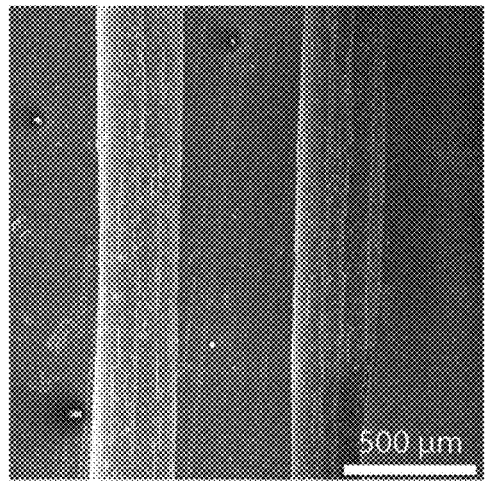 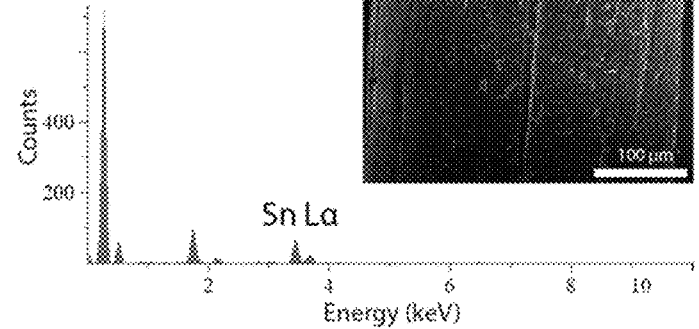
FIG. 38A  FIG. 38B
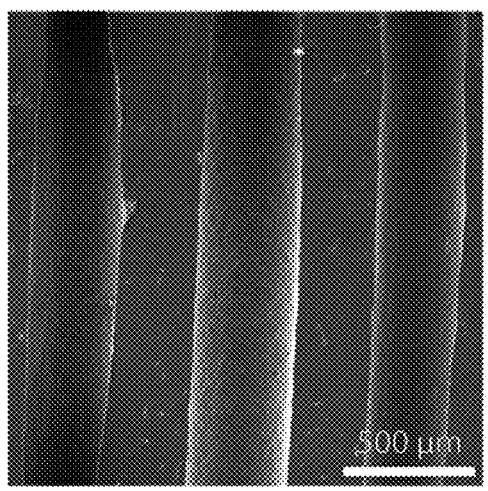 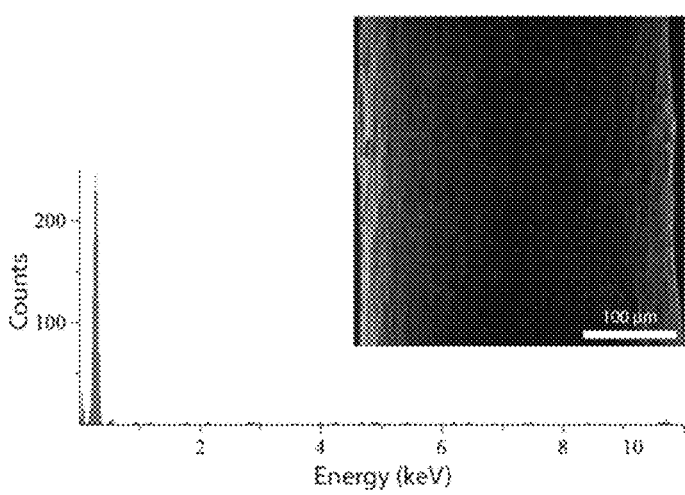
FIG. 38C  FIG. 38D

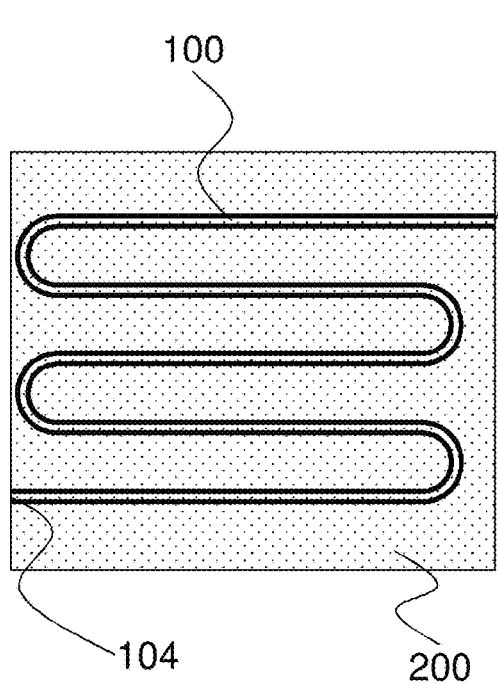
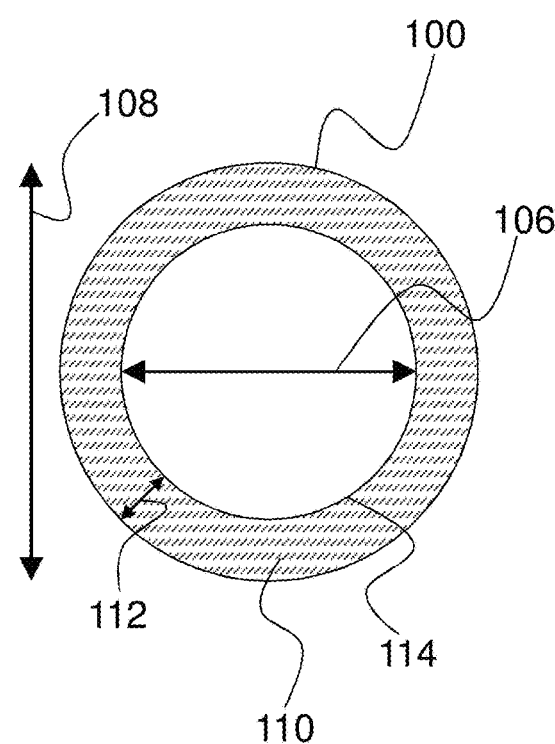
FIG. 42A  FIG. 42B
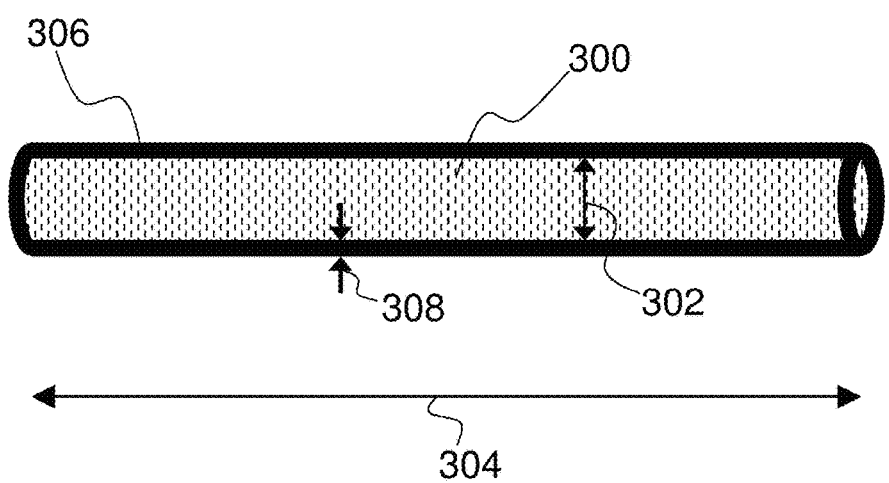
FIG. 43

POLYMER MICROCOLUMN FOR GAS OR VAPOR SEPARATION, CHROMATOGRAPHY, AND ANALYSIS

CROSS-REFERENCE TO RELATED APPLICATIONS

This applicable claims the benefit of and priority to U.S. Provisional Application No. 62/479,360, filed Mar. 31, 2017, which is hereby incorporated in its entirety.

STATEMENT REGARDING FEDERALLY SPONSORED RESEARCH OR DEVELOPMENT

Not applicable.

BACKGROUND OF INVENTION

Recently, there has been increasing interest in the development of portable gas chromatography (GC) systems for use in the field and in the development of disposable microfluidic technology. Conventional GC systems are bulky, have high power consumption, and usually have very long analysis times, often in tens of minutes. These factors have largely limited the use of GC to a laboratory environment; thus, obtaining immediate results from field or environmental samples is difficult. Immediate results are particularly important in situations where chemicals that are dangerous to life and health may be present (e.g., in chemical workplace monitoring, industrial accidents, and military settings). Additionally, personnel who may respond to these situations are not generally trained scientists. Therefore, there is a pressing need for a portable instrument capable of real-time gas analysis that can be operated in the field by minimally trained first responders. The development of extremely compact GC systems, often called MicroGC (μGC), have potential applications in the fields of biomedicine, environmental sciences, and national defense Conventional microcolumn fabrication processes are complicated and require the use of expensive equipment and hazardous reagents, contributing to very expensive microcolumns. Conventional methods consist of three main steps: (1) the column design is patterned onto a Si or metal wafer via lithography, (2) the patterned piece is sealed, and (3) the column is coated with a thin film stationary phase. Lithography requires specialized equipment and may require the use of a cleanroom or involve hazardous chemicals. Microcolumn cross sectional shape is an additional challenge. For example, columns with rectangular cross-sections, the stationary phases may pool in the corners during the coating step, leading to band broadening and poor separation efficiency.

Provided herein are a class of microcolumns, and methods for forming these microcolumns, which address these, and other, challenges. The microcolumns provided herein may be useful for separation of volatile species.

SUMMARY OF THE INVENTION

Provided herein are a new class of microcolumns and new methods for making these microcolumns for separation of gaseous or volatile chemical species. The methods disclosed herein are inexpensive, simple, and scalable while also providing for microcolumns capable of efficient gas separation and having highly tunable geometries, configurations, and materials. Furthermore, the methods disclosed herein may provide for uniform stationary phase coatings or layers, which may improve separation efficiency and increase plate count. Some of the advantageous and new features of the methods and microcolumns disclosed herein are enabled due to the use of a sacrificial fiber in the process for forming the microcolumns. In some embodiments, the methods disclosed herein provide for microcolumns having circular cross-sections, which are difficult to achieve using conventional methods and offer many advantages including a more inform stationary phase layer. Microcolumns having other cross-sectional configurations are also obtainable using the methods disclosed herein. The methods disclosed herein are compatible with a wide range of materials, including a wide range of polymers which may be used to form each of the elements of the microcolumns, such as the microcolumn body and stationary phase. In some embodiments, the methods disclosed herein provide for microcolumns having three-dimensional geometries.

Microcolumns having a three-dimensional arrangement may offer many advantages including, but not limited to, decreasing the footprint for portable chromatographs and increasing design options for portable chromatographs that employ a three-dimensional microcolumn.

In an aspect, a method for forming a microcolumn, such as a microcolumn for gas and/or vapor phase separation, the method comprising steps of: (a) providing a sacrificial fiber; (b) forming a microcolumn body around the sacrificial fiber; and (c) removing the sacrificial fiber from the microcolumn body such that a hollow channel is formed within the microcolumn body via removal of the sacrificial fiber. In any embodiment of the methods disclosed herein for forming a microcolumn, the hollow channel extends through the microcolumn body and is continuous between a first end and a second end. The first end may be an inlet and the second end may be an outlet, for example, allowing for a mobile phase to enter the hollow channel via the first end and exit via the second end.

In an aspect, a microcolumn, such as a microcolumn for gas and/or vapor separation, comprises: (a) a microcolumn body formed of a first polymer; and (b) a hollow channel within the microcolumn body; wherein: (i) the hollow channel extends through the microcolumn body; (ii) the hollow channel is continuous between a first end and a second end; (iii) the hollow channel has a circular cross-sectional shape between the first end and the second end; and (iv) the hollow channel has an inner diameter and an outer diameter defining a thickness of a wall of the hollow channel; wherein: (i) the thickness of the wall is substantially uniform between the first end and the second end of the hollow channel; and (ii) the wall is formed of a stationary phase material, the stationary phase material comprising a polymer. In an embodiment of this aspect, (i) the hollow channel has a substantially three-dimensional geometry; and/or (ii) an inner surface of the hollow channel is substantially smooth. In some embodiments of this aspect, the first polymer, of which the microcolumn body is formed, is substantially gas impermeable.

In an aspect, a microcolumn, such as a microcolumn for gas and/or vapor separation, comprises: (a) a microcolumn body; and (b) a hollow channel within the microcolumn body; wherein: (i) the hollow channel extends through the microcolumn body; (ii) the hollow channel is continuous between a first end and a second end; (iii) the hollow channel has a circular cross-sectional shape between the first end and the second end; (iv) the hollow channel has an inner diameter and an outer diameter defining a thickness of a wall of the hollow channel, wherein the wall is formed of a stationary phase material; and (v) the hollow channel has a substantially three-dimensional geometry. In an embodiment of this aspect, (i) the thickness of the wall is substantially uniform between the first end and the second end of the hollow channel; and/or (ii) the microcolumn is formed of a first polymer; and/or (iii) the stationary phase material comprises a polymer; and/or (iv) an inner surface of the hollow channel is substantially smooth. In some embodiments of this aspect, the first polymer, of which the microcolumn body is formed, is substantially gas impermeable.

Microcolumns of the present invention may have a hollow channel with a wide range of spatial configurations.

In some embodiments, the hollow channel has a substantially three-dimensional geometry. In some embodiments, the three-dimensional geometry is (i) corkscrew, (ii) spiral, (iii) helical, (iv) 3D stacked serpentine, (iv) double helical, (v) toroidal, (vi) that of a hollow tube wrapped around a torus, cylinder, cone, prism, and/or pyramid, (vi) other three dimensional shapes obvious to those skilled in the art, or (vii) any combination thereof.

In some embodiments, the hollow channel is circular in cross-sectional shape. In some embodiments, a cross-sectional shape of the hollow channel is an ellipse. In some embodiments, a cross-sectional shape of the hollow channel is substantially not rectangular. In some embodiments, a cross-sectional shape of the hollow channel is without straight or non-rounded portions. In some embodiments, a cross-sectional shape of the hollow channel is not hemispherical. In some embodiments, the hollow channel is free of obstructions.

In some embodiments, the hollow channel has an inner diameter and an outer diameter defining a thickness of a wall of the hollow channel. In some embodiments, the thickness of the wall is substantially uniform between the first end and the second end of the hollow channel. In some embodiments, the wall comprises a stationary phase material.

In some embodiments, the hollow channel has an inner diameter that is greater than or equal to 10 µm. In some embodiments, the hollow channel has an inner diameter selected from the range of 10 to 1000 µm. In some embodiments, the hollow channel has an inner diameter that is greater than or equal to 100 µm. In some embodiments, the hollow channel has an inner diameter that is less than or equal to 1000 µm. In some embodiments, the hollow channel has an inner diameter selected from the range of 100 to 1000 µm. In some embodiments, the hollow channel has a length that is greater than or equal to 10 cm; where the length is a total length along a longitudinal axis of the hollow channel. In some embodiments, the hollow channel has a length that is selected from the range of 10 cm to 100 m. In some embodiments, the hollow channel has a length that is selected from the range of 10 cm to 90 m. In some embodiments, the thickness of the wall of the hollow channel is selected from the range of 0.05 µm to 10 µm. In some embodiments, the thickness of the wall of the hollow channel is selected from the range of 0.05 µm to 5 µm. In some embodiments, the thickness of the wall of the hollow channel is selected from the range of 0.1 µm to 5 µm. In some embodiments, the thickness of the wall of the hollow channel is selected from the range of 0.1 µm to 1 µm. In some embodiments, the thickness of the wall of the hollow channel is approximately 0.5 µm.

In some embodiments, an inner surface of the hollow channel is substantially smooth. In some embodiments, an inner surface of the hollow channel has a surface roughness $R_q$ of less than 0.50 µm. In some embodiments, an inner surface of the hollow channel has a surface roughness $R_q$ of less than 0.20 µm. In some embodiments, an inner surface of the hollow channel has a surface roughness $R_q$ of less than 0.1 µm.

The microcolumns and methods disclosed herein are compatible with a wide range of sacrificial fibers, including a wide range of materials and configurations thereof.

In some embodiments, the sacrificial fiber is circular in cross-sectional shape. In some embodiments, a cross-sectional shape of the sacrificial fiber is an ellipse.

In some embodiments, the sacrificial fiber has a diameter that is greater than or equal to 10 µm. In some embodiments, the sacrificial fiber has a diameter selected from the range of 10 to 1000 µm. In some embodiments, the sacrificial fiber has a diameter that is greater than or equal to 100 µm. In some embodiments, the sacrificial fiber has a diameter that is less than or equal to 1000 µm. In some embodiments, the sacrificial fiber has a diameter selected from the range of 100 to 1000 µm. In some embodiments, the sacrificial fiber has a length that is greater than or equal to 10 cm; where the length is a total length along a longitudinal axis of the sacrificial fiber. In some embodiments, the sacrificial fiber has a length that is selected from the range of 10 cm to 100 m. In some embodiments, the sacrificial fiber has a length that is selected from the range of 10 cm to 90 m. In some embodiments, the sacrificial fiber has a length that is greater than 100 m.

In some embodiments, an outer surface of the sacrificial fiber is a coating, the coating comprising a stationary phase material. In some embodiments, an outer surface of the sacrificial fiber has a coating thereon; wherein the coating forms a wall of the hollow channel during the step of removing of the sacrificial fiber, the wall of the hollow channel comprising a stationary phase material. In some embodiments, the coating comprising a stationary phase material. In some embodiments, the coating has a thickness which is substantially uniform between ends of the sacrificial fiber. In some embodiments, the coating thickness is selected from the range of 0.05 µm to 10 µm. In some embodiments, the coating thickness is selected from the range of 0.05 µm to 5 µm. In some embodiments, the coating thickness is selected from the range of 0.1 µm to 5 µm. In some embodiments, the coating thickness is selected from the range of 0.1 µm to 1 µm. In some embodiments, the coating thickness is approximately 0.5 µm.

In some embodiments, the stationary phase material comprises a monomer, a prepolymer, a polymer, or a combination thereof. In some embodiments, the stationary phase material comprises one or more polymers. In some embodiments, the stationary phase material consists of one or more polymers. In some embodiments, the stationary phase material is a polymer. In some embodiments, the stationary phase material is a monomer. In some embodiments, the stationary phase material is a combination or mixture of two or more polymers. In some embodiments, the stationary phase material is a combination or mixture of one or more polymers and one or more monomers. In some embodiments, the stationary phase material comprises one or more polymers selected from the group consisting of polydimethylsiloxane (PDMS), polyphenylmethylsiloxane, poly(trifluoropropyldimethyl) siloxane, polycyanopropyl-phenyl siloxane, diethoxydimethylsilane (DEDMS), polyethylene glycol, and any combination thereof. In some embodiments, the stationary phase material is selected from the group consisting of polydimethylsiloxane (PDMS), polyphenylmethylsiloxane, poly(trifluoropropyldimethyl) siloxane, polycyanopropyl-phenyl siloxane, diethoxydimethylsilane (DEDMS), polyethylene glycol, other stationary phase material(s) conventionally used in gas chromatography, and any combination thereof.

In some embodiments, the sacrificial fiber comprises one or more polymers. In some embodiments, the sacrificial fiber consists of one or more polymers. In some embodiments, the sacrificial fiber is formed of one or more polymers. In some embodiments, the sacrificial fiber comprises one or more materials selected from the group consisting of poly(lactic acid) (PLA), a polyanhydride(s), polybutadieneperoxide, a polyperoxide(s), nitrocellulose, a nitrated poymer(s), a polymer(s) that exhibits solid to gaseous decomposition at temperatures below 250° C., and any combination thereof. In some embodiments, the sacrificial fiber further comprises a catalyst to facilitate thermal decomposition or depolymerization of the sacrificial fiber (e.g., wherein "facilitate" refers to lowering the temperature at which thermal decomposition or depolymerization may occur). The catalyst may comprise a metal. In some embodiments, the sacrificial fiber further comprises a catalyst selected from the group consisting of tin(IV) oxalate, iron chloride, one or more Lewis acid catalysts, and any combination thereof.

In some embodiments, the sacrificial fiber is capable of being thermally depolymerized or thermally decomposed. In some embodiments, the sacrificial fiber is a material that is capable of being thermally depolymerized or thermally decomposed at a temperature equal to or less than 300° C. In some embodiments, the sacrificial fiber is a material that is capable of being thermally depolymerized or thermally decomposed at a temperature equal to or less than 250° C. In some embodiments, the sacrificial fiber is a material that is capable of being thermally depolymerized at a temperature equal to or less than 200° C. In some embodiments, the sacrificial fiber is capable of being thermally depolymerized at a temperature selected from the range of 150° C. to 200° C. In some embodiments, the sacrificial fiber is capable of being thermally depolymerized at a temperature selected from the range of 190° C. to 200° C.

In some embodiments, the coating on the sacrificial fiber is thermally stable at a temperature greater than or equal to 250° C., and optionally a temperature greater than or equal to 350° C. In some embodiments, the coating on the sacrificial fiber is thermally stable at a temperature up to 300° C., or optionally at a temperature up to 250° C., or optionally at a temperature up to 200° C. In some embodiments, the coating on the sacrificial fiber is thermally stable at any temperature less than or equal to 200° C. In some embodiments, the coating on the sacrificial fiber is thermally stable at a temperature selected from the range of 20° C. to 200° C., optionally selected from the range of 20° C. to 300° C. In some embodiments, the coating on the sacrificial fiber is thermally stable at a temperature corresponding to a processing temperature during a step of removing the sacrificial fiber from the microcolumn body such that a hollow channel is formed within the microcolumn body, such as at or greater than a decomposition temperature of the sacrificial fiber.

In some embodiments, the stationary phase material is thermally stable at a temperature greater than or equal to 250° C. In some embodiments, the stationary phase material is thermally stable at a temperature greater than or equal to 300° C., or optionally at a temperature greater than or equal to 200° C., or optionally at a temperature greater than or equal to 100° C., or optionally at a temperature greater than or equal to 50° C., or optionally at a temperature greater than or equal to 20° C. In some embodiments, the stationary phase material is thermally stable at a temperature selected from the range of 20° C. to 200° C., optionally selected from the range of 20° C. to 300° C. In some embodiments, the stationary phase material is thermally stable at room temperature. In some embodiments, the stationary phase material is thermally stable at a temperature corresponding to a processing temperature during a step of removing the sacrificial fiber from the microcolumn body such that a hollow channel is formed within the microcolumn body, such as at or greater than a decomposition temperature of the sacrificial fiber. In some embodiments, the stationary phase material is thermally stable at the temperature at which the GC column is run.

In some embodiments, the step of removing the sacrificial fiber comprises thermally decomposing the sacrificial fiber, thermally depolymerizing the sacrificial fiber, solvent etching the sacrificial fiber, or a combination of these. In some embodiments, the step of removing the sacrificial fiber comprises depolymerizing or decomposing the sacrificial fiber into a volatile compound which is removed in a gaseous phase.

In some embodiments, a method of the present invention comprises a step of forming the sacrificial fiber.

In some embodiments, a method of the present invention comprises a step of forming a coating on an outer surface of the sacrificial fiber, such that a diameter of the sacrificial fiber increases once the coating is formed and the coating once formed becomes an outer surface of the sacrificial fiber. In some embodiments, a method of the present invention comprises a step of forming a coating on an outer surface of the sacrificial fiber, wherein the coating forms a wall of the hollow channel during the step of removing of the sacrificial fiber, the wall comprising a stationary phase material In some embodiments, the step of forming a coating on the sacrificial fiber comprises steps of solvent swelling and oligomer or polymer trapping of a stationary phase. In some embodiments, the step of forming a coating on the sacrificial fiber comprises soaking the sacrificial fiber in a solution comprising at a first solvent and a stationary phase material, or precursor thereof, dissolved in the first solvent. In some embodiments, the step of forming a coating is a static coating step or a dynamic coating step.

In some embodiments, the outer diameter of the hollow channel is substantially equivalent to an outer diameter of the sacrificial fiber. In some embodiments, the hollow channel has a cross-sectional shape that is substantially equivalent to a cross-sectional shape of the sacrificial fiber. In some embodiments, the thickness of the wall of the hollow channel is substantially equivalent to a thickness of a coating on the sacrificial fiber; and wherein the coating is an outer surface of the sacrificial fiber and the coating comprises a stationary phase material.

In some embodiments, a method of the present invention comprises a step of forming a primary mold, the primary mold comprising a channel relief feature. The primary mold may comprise one or more polymers. The primary mold may comprise polyether ether ketone (PEEK). In some embodiments, a method of the present invention comprises a step of forming a secondary mold, the secondary mold comprising a channel recess feature. The secondary mold may comprise one or more polymers. The secondary mold may comprise PDMS. A geometry of the channel recess feature may be substantially identical to a geometry of the channel relief feature. In some embodiments, the step of forming a microcolumn body comprises a step of inserting the sacrificial fiber into the channel recess feature of the secondary mold. In some embodiments, the step of forming a microcolumn body comprises a step of encasing the sacrificial fiber in a first pre-body material. The step of encasing the sacrificial fiber in a first pre-body material may be performed after the step of inserting the sacrificial fiber into the channel recess feature of the secondary mold. In some embodiments, the step of encasing the sacrificial fiber comprises a step of encasing a first side of the sacrificial fiber in a first pre-body material and a step of encasing a second side of the sacrificial fiber in the first pre-body material. The first pre-body material may be a thermosetting epoxy which is thermally and/or light cured during each of the steps of encasing, such that the microcolumn body is formed when the pre-body material is cured. The first pre-body material may be a photosensitive epoxy which is thermally and/or light cured during each of the steps of encasing, such that the microcolumn body is formed when the pre-body material is cured. In some embodiments, the microcolumn body is free of air bubbles.

In some embodiments, the channel recess feature has a three-dimensional geometry.

In some embodiments, a method of the present invention does not comprise a step of silicon-based lithography. In some embodiments, a method of the present invention does not comprise photolithography. In some embodiments, a method of the present invention does not comprise an etching step, such as etching of silicon. In some embodiments, the microcolumn does not comprise crystalline silicon.

In some embodiments, the microcolumn has a theoretical plate count of at least 2000 plates/meter. In some embodiments, the microcolumn has a theoretical plate count selected from the range of 50 to 15000 plates/meter. In some embodiments, the the microcolumn has a theoretical plate count selected from the range of 50 to 15000 plates/meter corresponding to separation of one or more alkanes selected from the group consisting of heptane, octane, nonane, decane, and any combination thereof. In some embodiments, the microcolumn has a theoretical plate count selected from the range of 50 to 5000 plates/meter. In some embodiments, the the microcolumn has a theoretical plate count selected from the range of 50 to 5000 plates/meter corresponding to separation of one or more alkanes selected from the group consisting of heptane, octane, nonane, decane, and any combination thereof. In some embodiments, the microcolumn has a theoretical plate count selected from the range of 70 to 2200 plates/meter corresponding to separation of one or more alkanes selected from the group consisting of heptane, octane, nonane, decane, and any combination thereof.

In some embodiments, the microcolumn body is characterized by substantial gas impermeability with a gas permeability of less than 100 barrer. In some embodiments, the stationary phase material is characterized by a gas permeability of at least 100 barrer.

Methods and systems of the invention are useful for microcolumns for separation, for example, separation of fluids including gases and vapors. In some embodiments, the microcolumn is a portion of a gas chromatograph. In some embodiments, the microcolumn is a portion of a portable gas chromatograph.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

The features, objects and advantages other than those set forth above will become more readily apparent when consideration is given to the detailed description below. Such detailed description makes reference to the following drawings, wherein:

FIGS. 1A-1C. Molds for preparing fiber-templated polymer microcolumns.

FIG. 1A. SurfCam image of the pattern machined into PEEK to make the reusable plastic mold. The mold in this image has a 250 μm×450 μm×1 m serpentine channel design. FIG. 1B. A photograph of the reusable primary mold (formed of PEEK) whose design was shown in FIG. 1A. The mold block is 3.5× by 8.5 cm. FIG. 1C. A photograph of a secondary mold formed of PDMS prepared using the PEEK primary mold. The secondary mold measures 3.5 cm×8.5 cm.

FIG. 2. Photograph of a HP 5890 Series II GC/FID instrument used to evaluate microcolumns. The microcolumn is attached to the GC/FID system using two Nanoport fittings and fused silica capillary tubing. The HP 5890 Gas Chromatograph has a manual injection system, flame ionization detector and communicates with chemstation software (Rev. A.10.01).

FIG. 3. Photograph of an exemplary microcolumn in accordance with the present invention.

FIGS. 4A-4B. Optical micrographs of a (FIG. 4A) 300 μm diameter microcolumn and a (FIG. 4B) 100 μm diameter microcolumn. Both columns show clear channels with smooth channel walls. No bubbles are evident in the epoxy substrate.

FIGS. 5A-5B. SEM image of a cross-sectional slice of a fiber-templated GC microcolumn showing the circular geometry of the column channels.

FIG. 6. Chromatogram of a the elution of hexane through a column prepared with a fiber soaked in a 33/40/27 PDMS precursor/hexane/1,4-dioxane coating solution for one hour. The chromatogram was obtained using a 200:1 split ratio with a column flow rate of 3 mL min$^{-1}$. The peak is broad with tailing, indicating the stationary phase is too thick.

FIG. 12. Images of some conventional gas chromatography microcolumns. Conventional microcolumns are etched silicon wafer, have a rectangular channel, are sealed with glass, are expensive, are non-disposable; are difficult to make with other cross-sectional shapes or geometries.

FIGS. 32A-32B. Illustrations of exemplary hollow channel shapes and configurations. A hollow channel with a cross-sectional shape having a smaller diameter may increase plate count.

FIG. 38A. SEM image showing a radial section of column channels before sacrificial fiber residue has been removed.

FIG. 38B. EDS spectrum of the uncleaned channel surface. The inset SEM image shows the point of the radial channel section from which the spectrum was obtained. The Sn Lα peak indicates the presence of the tin catalyst. FIG. 38C. SEM image of a radial section of a column channel after treatment with acid and solvent to remove sacrificial fiber residue. The channel appears smoother after cleaning. FIG. 38D. EDS spectrum of the cleaned channel surface. The inset SEM image shows where the channel surface was scanned to obtain the spectrum. The Sn Lα is no longer present, indicating that the cleaning procedure has successfully removed not only residual PLA or dilactide, but also the tin catalyst.

FIGS. 42A-42B. FIG. 42A is an illustration of a hollow channel extending through a microcolumn body between first end and second end of the hollow channel.

FIG. 42B is an illustration of a cross-section of a hollow channel having a wall, which comprises a stationary phase material. Though the hollow channel of FIG. 42A appears to have a two-dimensional geometry, the hollow channel may also extend in a direction orthogonal to the image, or otherwise into and/or out of the plane of the image, and may have a three-dimensional geometry.

FIG. 43. An illustration of a sacrificial fiber having a coating.

STATEMENTS REGARDING CHEMICAL COMPOUNDS AND NOMENCLATURE

Figure 7:
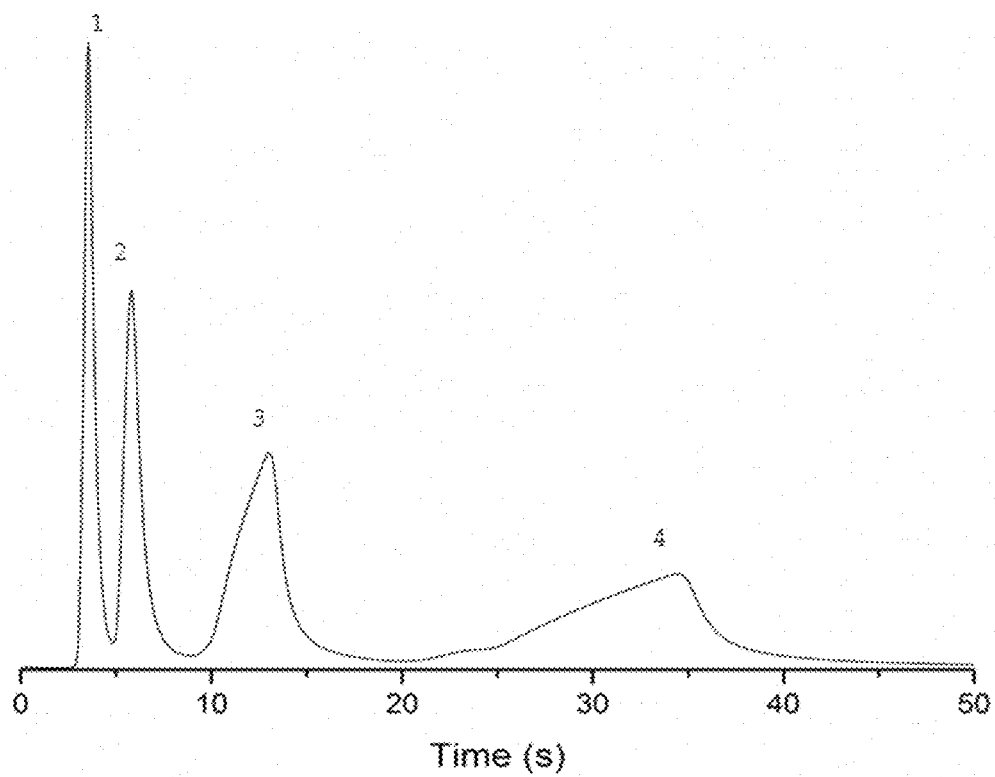
FIG. 7. Chromatogram of a the elution of an alkane mixture through a column prepared with a fiber soaked in a 20/60/20 PDMS precursor/hexane/1,4-dioxane coating solution for one hour. The column split ratio was 200:1 and the flow rate was 2 mL min$^{-1}$. The peaks labeled are 1) hexane, 2) heptane, 3) octane, and 4) nonane. While the column successfully separates the alkane mixture, there is significant peak fronting.

In general, the terms and phrases used herein have their art-recognized meaning, which can be found by reference to standard texts, journal references and contexts known to those skilled in the art. The following definitions are provided to clarify their specific use in the context of the invention.

In an embodiment, a composition or compound of the invention is isolated or purified. In an embodiment, an isolated or purified compound is at least partially isolated or purified as would be understood in the art. In an embodiment, the composition or compound of the invention has a chemical purity of at least 90%, optionally for some applications at least 95%, optionally for some applications at least 99%, optionally for some applications at least 99.9%, optionally for some applications at least 99.99%, and optionally for some applications at least 99.999% pure.

As used herein, the term "polymer" refers to a molecule composed of repeating structural units connected by covalent chemical bonds often characterized by a substantial number of repeating units (e.g., equal to or greater than 3 repeating units, optionally, in some embodiments equal to or greater than 10 repeating units, in some embodiments greater or equal to 30 repeating units) and a high molecular weight (e.g. greater than or equal to 5,000 Da, in some embodiments greater than or equal to 10,000 Da, in some embodiments greater than or equal to 50,000 Da or greater than or equal to 100,000 Da). Polymers are commonly the polymerization product of one or more monomer precursors. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications. Useful copolymers may include block copolymers and/or graft copolymers. Polymers useful in the present invention may include repeating units having one or more unsubstituted or substituted polyisocyanate groups, polymethacrylate groups, polyacrylate groups, polymethacrylamide groups, polyacrylamide groups, polyquinoxaline groups, polyguanidine groups, polysilane groups, polyacetylene groups, polyamino acid groups, polypeptide groups, polychloral groups, polylactide groups, polystyrene groups, polyacrylate groups, poly tert-butyl acrylate groups, polymethyl methacrylate groups, polysiloxane groups, polydimethylsiloxane groups, poly n-butyl acrylate groups, polyethylene glycol groups, polyethylene oxide groups, polyethylene groups, polypropylene groups, polytetrafluoroethylene groups, polyvinyl chloride groups, and any combination thereof.

An "oligomer" refers to a molecule composed of repeating structural units connected by covalent chemical bonds often characterized by a number of repeating units less than that of a polymer (e.g., equal to or less than 3 repeating units) and a lower molecular weights (e.g. less than or equal to 1,000 Da) than polymers. Oligomers may be the polymerization product of one or more monomer precursors.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group, including, but not limited to: a halogen or halide (e.g., F—, Cl—, Br—, I—), an alkyl, a cycloalkyl, an aryl, a heteroaryl, an acyl, an alkoxy, an alkenyl, an alkynyl, an alkylaryl, an arylene, a heteroarylene, an alkenylene, a cycloalkenylene, an alkynylene, a hydroxyl (—OH), a carbonyl (RCOR'), a sulfide (e.g., RSR'), a phosphate (ROP(=O)(OH)$_2$), an azo (RNNR'), a cyanate (ROCN), an amine (e.g., primary, secondary, or tertiary), an imine (RC(=NH)R'), a nitrile (RCN), a pyridinyl (or pyridyl), a diamine, a triamine, an azide, a diimine, a triimine, an amide, a diimide, or an ether (ROR'); where each of R and R' is independently a single bond, a hydrogen, or a substituted or unsubstituted alkyl group, aryl group, alkenyl group, or a combination of these. In some embodiments, the term substituted refers to a compound wherein more than one hydrogen is replaced by another functional group, such as any described above.

As to any of the above groups which contain one or more substituents, it is understood that such groups do not contain any substitution or substitution patterns which are sterically impractical and/or synthetically non-feasible.

Unless otherwise specified, the term "molecular weight" refers to an average molecular weight. Unless otherwise specified, the term "average molecular weight," refers to number-average molecular weight. Number average molecular weight is defined as the total weight of a sample volume divided by the number of molecules within the sample. As is customary and well known in the art, peak average molecular weight and weight average molecular weight may also be used to characterize the molecular weight of the distribution of polymers within a sample.

The term "weight-average molecular weight" ($M_w$) refers to the average molecular weight defined as the sum of the products of the molecular weight of each polymer molecule ($M_i$) multiplied by its weight fraction ($w_i$): $M_w = \Sigma w_i M_i$. As is customary and well known in the art, peak average molecular weight and number average molecular weight may also be used to characterize the molecular weight of the distribution of polymers within a sample.

As used herein, the term "polydispersity index" of a polymer can be calculated as $M_w/M_n$, where $M_w$ is the weight-averaged molar mass and $M_n$ is the number-averaged molar mass of the polymer. In an embodiment, the polydispersity index of a graft copolymer of the present invention is selected from the range of 1.00 to 1.20, or 1.00 to 1.10, or 1.00 to 1.05.

The term "pre-polymer" or "prepolymer" refers to a monomer or mixture comprising one or more monomers where the monomer(s) have been reacted to an intermediate molecular mass state. The prepolymer is capable of undergoing further polymerization to a fully cured higher molecular weight state. In some embodiments, the terms prepolymer and monomer may be used interchangeably.

As used herein, the term "thermosensitive" refers to a temperature-responsive or thermoresponsive polymer, or material comprising such polymer, that exhibits significant and, optionally discontinuous, change of its physical properties with temperature, such as a change in phase, or physical property. A "thermoset", "thermosetting polymer", or "thermosetting plastic" is a polymer, or material comprising a polymer, that is a type of thermosensitive material which undergoes irreversible change in properties in response to application or removal of heat or suitable radiation. In an embodiment, a thermosetting polymer is one that is capable of being irreversibly cured from a soft solid or viscous pre-polymer or resin state to a solid. A "thermoplastic" is a polymer, or material comprising a polymer, that may reversibly transition between a pliable or moldable state and a solid state with application or removal of heat or other suitable radiation. For example, a thermoplastic material may be pliable or moldable above a specific temperature and a solid below the specific temperature.

As used herein, the term "photosensitive" refers to a photo- or light-responsive polymer, or material comprising such polymer, that exhibits significant and, optionally discontinuous, change of its physical properties, such as a phase change, upon exposure to light, such as ultraviolet or visible light of the electromagnetic spectrum.

The term "substantially" refers to a property that is within 10%, within 5%, within 1%, or is equivalent to a reference property. For example, the thickness of a wall of a hollow channel is substantially uniform if the thickness at any point is within 10%, within 5%, within 1%, or equal to a reference wall thickness value, such as the average wall thickness. The term "substantially equal" or "substantially equivalent", when used in conjunction with a reference value describing a property or condition, refers to a value that is within 10%, within 5%, within 1%, or is equivalent to the provided reference value. For example, a plate count, of a microcolumn, is substantially equal to 100 if the plate count is a value within 10%, within 5%, within 1%, or equivalent to 100. The term "substantially greater", when used in conjunction with a reference value describing a property or condition, refers to a value that is at least 2%, at least 5%, or at least 10% greater than the provided reference value. For example, a plate count, of a microcolumn, is substantially greater than 100 if the plate count is at least 2%, at least 5%, or at least 10% greater than 100. The term "substantially less", when used in conjunction with a reference value describing a property or condition, refers to a value that is at least 2%, at least 5%, or at least 10% less than the provided reference value. For example, a plate count, of a microcolumn, is substantially less than 100 if the plate count is at least 2%, at least 5%, or at least 10% less than 100.

The term "three dimensional geometry", when referring to an element, refers to the element having a three-dimensional geometric configuration. In an embodiment, when referring to a substantially longitudinal element such as a wire, fiber, tube, groove, recess channel, relief channel, or a hollow channel, said longitudinal element has a three dimensional geometry when a three-coordinate system of space is required to fully describe any and all points along a longitudinal axis of said longitudinal element. In an embodiment, when referring to a substantially longitudinal element such as a wire, fiber, tube, groove, recess channel, relief channel, or a hollow channel, said element has a three dimensional geometry when a three-coordinate system of space is required to fully describe a longitudinal direction of said element at any and all points along the longitudinal axis of said element; where a longitudinal direction is a direction parallel to the longitudinal, or length-wise, axis of said element. In a contrasting example, a groove, having the same depth at all points, etched into a planar, or two-dimensional, surface (e.g., a long recess groove etched into a silicon wafer) may have a one- or two-dimensional geometry but not a three dimensional geometry. By way of illustrative example, three dimensional geometries would include helices, corkscrews, hollow tubes wrapped around a torus, cylinder, cone, prism, and/or pyramid, and other three dimensional shapes obvious to those skilled in the art.

The term "smooth" refers to a surface having a surface roughness $R_q$ (or RMS) value of less than 0.50 µm, less than 0.20 µm, less than 0.15 µm, less than 0.10 µm, or less than 0.05 µm.

The term "sacrificial" may refer to an element, such as a fiber. A "sacrificial" element refers to an element that is useful in a process for forming another element but is ultimately removed or destroyed in the course of the process for forming the other element. For example, a sacrificial fiber may be useful for forming a microcolumn body having a hollow channel, where the sacrificial fiber may serve as a template for the hollow channel during formation of the microcolumn body though the fiber is ultimately removed (e.g., via thermal decomposition, via thermal depolymerization, and/or via solvent etching) to leave behind the hollow channel.

The term "stationary phase material" refers to a material that is stationary within a microcolumn during operation of the microcolumn. In contrast, a mobile phase material, which may be a gas or a liquid, is one that passes through the microcolumn during operation of the microcolumn. An analyte, such as a mixture of gaseous or volatile compounds, may be carried by the mobile phase through the microcolumn such that components or compounds of the analyte interact with the stationary phase and the mobile phase in a way that leads to a time-resolved separation of the components or compounds of the analyte mixture. Interaction of the analyte with the mobile phase and the stationary phase may lead to an increase in the residence time of one or more compounds of the analyte mixture within the microcolumn, resulting in a time-resolved separation of the analyte mixture. In some embodiments, a stationary phase material is formed of or comprises one or more polymers.

The term "permeability" refers to a material's ability to absorb gaseous analytes, and specifically is the product of solubility (partition) of an analyte vapor or gas in a polymer and diffusivity. The "barrer" is a non-SI unit of the gas (specifically $O_2$) permeability coefficient; one barrer is $10^{-11}$ $(cm^3 O_2)$ $cm^{-1}$ $s^{-1}$ $torr^{-1}$. In some embodiments, a stationary phase material is a material that has a gas permeability that is least about 5 times, at least about 10 times, or at least about 20 times greater than the gas permeability of the microcolumn body. For example, the microcolumn body permeability may be about 100 barrer or less, and the stationary phase permeability may be greater than 100 barrer. In some embodiments, the stationary phase material's permeability is 100 or greater, 150 barrer or greater, 300 barrer or greater, or 500 barrer or greater. In some embodiments, the microcolumn body permeability is 100 or less, 50 barrer or less, 10 barrer or less, or 1 barrer or less. In some embodiments, the stationary phase material permeability is as high as 1000 barrer. In some embodiments, the microcolumn body permeability is as low as 0.1 barrer.

The term "cross-sectional shape" or "cross sectional shape" refers to a shape or geometric description of an element when viewing its cross section or intersection in a transverse plane.

The term "pre-body material" refers to a material that ultimately forms the microcolumn body. In some embodiments, a pre-body material is a monomer, or a material comprising a monomer, or a pre-polymer which may be cured to form a solid microcolumn body. In some embodiments, for example, a pre-body material is a thermosetting epoxy, where the microcolumn body is formed when the thermosetting epoxy is cured via application of appropriate heat.

The term "continuous" when applied to an element such as a hollow channel or other longitudinal element refers to a configuration wherein the element is exists in a continuous configuration along its longitudinal axis. In other words, a continuous hollow channel is one whose hollowness is not broken or interrupted. For example, two hollow channels separated by a solid body may not be characterized as a single continuous hollow channel. The term "continuous" when applied to a surface, such the radial inner surface of a hollow channel, refers to a surface that is substantially continuous without spatial discontinuities in its cross sectional shape. For example, an inner surface of a hollow channel whose cross sectional shape is a circle or an oval may be characterized as continuous. In a contrasting example, an inner surface of a hollow channel whose cross sectional shape has sharp corners or is the result of two misaligned semi-circles may be discontinuous, according to some embodiments.

The term "hollow channel" refers to a longitudinal element that is a cavity (i.e., a substantially longitudinal cavity). A hollow channel may exist within a predominant matrix material, such as within a microcolumn body. A hollow cylindrical element such as a straw or tube may also be characterized as having a hollow channel therein. An exemplary hollow channel, hollow channel 100, is illustrated in FIGS. 42A-42B. Hollow channel 100 is within a microcolumn body 200. Hollow channel 100 extends through microcolumn body 200 between first end 102 and second end 104. Hollow channel 100 has an inner diameter 106 and an outer diameter 108. Hollow channel has a wall 110, which has a thickness 112. Wall 110 may comprise a stationary phase material. Hollow channel 100 also has an inner surface 114.

The term "fiber" refers to a longitudinal element, for example, a longitudinal structural element having a longitudinal dimension, such as a length, greater than one or more cross sectional dimensions, such as a width or diameter. In some aspects, for example, a fiber of the invention has a longitudinal dimension at least a factor of 100 times greater than an average cross sectional dimension, in some examples a longitudinal dimension at least a factor of 1000 times greater than an average cross sectional dimension, in some examples a longitudinal dimension at least a factor of 1,000 times greater than an average cross sectional dimension. In some aspects, for example, a fiber of the invention has a ratio of a longitudinal dimension to an average cross sectional dimension selected from the range of 100 to 100,000,000. A fiber may be, but is not necessarily, cylindrical or ribbon shaped. A fiber may have, but does not necessarily have, a thread or thread-like structure or configuration. The term fiber is inclusive of completely solid longitudinal structural elements or partially solid longitudinal structural elements, such as hollow or porous longitudinal structural elements. An exemplary sacrificial fiber, sacrificial fiber 300, is illustrated in FIG. 43. Sacrificial fiber 300 has a diameter 302 and a length 304. Sacrificial fiber 300 also has a coating 306, which has a thickness 308. The coating may comprise a stationary phase material or a precursor to a stationary phase material.

The term "longitudinal element" refers to an element whose length (or, size along its longitudinal axis) is at least 50% greater than each of its other characteristic size dimensions (i.e., width and height, or diameter).

As used herein, the term "circular" may refer to a shape such as an ellipse, including a circle. The term "circular" may refer to a shape that has a radius of curvature of at least 0.5 mm at any point or interval along its perimeter or circumference. A shape may be circular and have non-circular variations or features on a scale that is at least one orders of magnitude less than the shape's diameter, or effective diameter. In an example, a circular shape that has a diameter of 500 µm may have non-circular variations or features on the order of 50 µm or less. Non-circular variations or features include, but are not limited to, features corresponding to (surface) roughness.

The term "thermally stable" refers to a property of a material such that the material is capable of not decomposing in response to a given temperature. The term "thermally stable" may refer to a property of a material such that the material is capable of not decomposing at a significant rate in response to a given temperature. A significant rate of decomposition may, for example, refer to a decomposition of at least 0.1% of the starting material mass per hour, at least 1% of the starting material mass per hour, or at least 10% of the starting material mass per hour; where decomposition may refer to change of the starting material into one or more other materials (e.g., a material decomposing into decomposition product(s); e.g., a polymer depolymerizing into smaller, optionally volatile, compound(s); e.g., a material thermally decomposing into soot and gas(es)). In an example, a material that is thermally stable at temperatures less than or equal to 250° C. is a material that does not thermally decompose at a significant rate when exposed to temperatures up to 250° C.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

Context for the Present Invention:

Recently, there has been increasing interest in the development of portable gas chromatography (GC) systems for use in the field and in the development of disposable microfluidic technology.[5-6] Conventional GC systems are bulky, have high power consumption, and usually have very long analysis times, often in tens of minutes. These factors have largely limited the use of GC to a laboratory environment; thus, obtaining immediate results from field or environmental samples is difficult. Immediate results are particularly important in situations where chemicals that are dangerous to life and health may be present (e.g., in chemical workplace monitoring, industrial accidents, and military settings). Additionally, personnel who may respond to these situations are not generally trained scientists. Therefore, there is a pressing need for a portable instrument capable of real-time gas analysis that can be operated in the field by minimally trained first responders.

The development of extremely compact GC systems, often called MicroGC (μGC), have potential applications in the fields of biomedicine,[7] environmental sciences,[8-11] and national defense.[12] Angell and Terry were the first to conceptualize the idea of a microfabricated GC system at Stanford University in 1975.[13-14] The instrument they initially developed consisted of a microcolumn etched into a 5 cm silicon wafer and coated with a thin film stationary phase. The resultant device showed poor separation efficiency and the microcolumn was eventually replaced with a shortened commercially available fused silica GC capillary column. Since this first study, there are a number of national laboratories, universities, and instrumentation companies working to develop a portable μGC system. Miniaturized instruments are being developed that follow Angell's and Terry's original conceptualization, constraining a fused silica or metal capillary column to a small area or flat plane.[15] However, there are also commercial instruments and research prototypes that incorporate microcolumns whose structure is etched in silicon or metal.[11-14,16-31]

Almost all microcolumns found in recent literature are prepared in the same way. This microcolumn fabrication process is complicated and requires the use of expensive equipment and hazardous reagents, contributing to very expensive microcolumns. The method consists of three main steps: (1) the column design is patterned onto a Si or metal wafer via lithography, (2) the patterned piece is sealed, and (3) the column is coated with a thin film stationary phase. Lithography requires specialized equipment and may require the use of a cleanroom or involve hazardous chemicals. For columns with rectangular cross-sections, the stationary phases will pool in the corners during the coating step, leading to band broadening and poor separation efficiency.[32] Some circular channeled devices have been reported that attempt to solve this problem; however, the channel etching steps are more complex in these cases.[12,24,21,23]

In more detail, a silicon or metal substrate is etched as a double square spiral or some other shape on a ~3 cm×3 cm chip via a deep reactive ion etching process (essentially a modified Bosch process),[17] high powered lasers,[33] or photolithography/e-beam lithography (i.e., wet chemical etching).[30,34-37] This method produces rectangular channels up to 3 m long on a chip about the size of a quarter most commonly 150 μm wide and about 240 μm deep.[13,30,35,37] Usually, these channels are sealed with glass bonded anodically and coated with a non-polar (e.g., polydimethylsiloxane, PDMS) or polar (e.g., poly(trifluoropropylmethyl) siloxane) stationary phase. The thin film stationary phase can be deposited via either static or dynamic coating. Static coating consists of submersing the channel in a solution of the solid-phase substrate, sealing one end of the tube, evaporating the solution from the open end of the channel, and heating the system to promote crosslinking of the polymer.[29] For this coating method the microcolumn is put under vacuum during which any defect or leak causes column destruction. The coatings are usually about 100-200 nm thick and general have 4,000-6000 theoretical plates/m. Dynamic coating consists of pushing a plug of solvent and pre-polymer through the column while heating to promote crosslinking. This method is not preferred since it produces films with inconsistent and unpredictable thickness.[38,17] The carrier gas for these experiments is often He or dry air, and flow rates are usually less than 1 mL/min.[39-49,18,29]

A number of microcolumns and μGC systems have been reported. Sandia National Labs has designed a GC system that incorporates a 100 μm wide by 400 μm deep spiral channel that is 86 cm long and fits on a 1.44 $cm^2$ silicon chip. This column has proven effective separation of 6 components in less than 1 minute. This microcolumn, surface acoustic wave sensors, and a micropreconcentrator have been integrated into an instrument called the μChemLab.[28,38] Work has also been done by Overton at Louisiana State University with Sandia National Lab[41] on high aspect ratio nickel GC microcolumns that have now been integrated into a commercially available instrument called MicroFastGC.[17,31] A 2 m long 600 μm tall and 50 μm wide column has successfully separated semivolatile and volatile compounds, separating 7 chemical warfare agent simulants and interferents in less than 4 s. A 50 cm long version of this column has been shown to separate a mixture of four hydrocarbons in 2 s.[12,20]

There has been substantial research done by the University of Illinois at Urbana-Champaign[20-21,22,26,42] and the University of Michigan[10,17-19,43] on developing prototypes of fully integrated μGC systems. There are also some recent reports of gas separation and sensing using diffusion based microfluidic devices.[36-37] These devices do not have a carrier gas pushing the analytes through the column but still rely on the difference in analyte interaction with the polymer coated channel walls and analyte diffusion rates. A recent review article[40] by Ohira and Toda details current advancements in preconcentration techniques, column development, and microdetectors for μGCs. The article gives a comprehensive list on page 151 of microsystems for gas analysis complete with referencing articles, LODs, and features of the system. This review also specifically looks at the application of μGCs in environmental sciences and medical technology.[40] There are a number of patents filed for these microcolumns. These patents cover design, fabrication, and coating.[15,24,26,44-48]

Overview of—GC Microcolumns:

Recently at the University of Michigan, a functional prototype of a μGC device for the detection of trichloroethylene was reported.[11] This prototype incorporates two miniature diaphragm pumps, six 3-way microsolenoid valves, an integrated micropreconcentrator/focuser system, two microcolumns, and a chemiresistor array (a common set-up for μGC systems). Typical elution times are ~3 minutes and flow rates are ~1 L/min.[11]

The microcolumns in this prototype were modeled from the etching and coating techniques described previously.[29,43] A square-spiral channel (length=3 m) with a rectangular cross-section of 150 μm×240 μm is etched into silicon via a DRIE lithographic process. The mask used incorporates inlet and outlet ports (deactivated fused silica capillaries 250 μm I.D. sealed with epoxy) and the wafer is sealed by anodically bonded Pyrex. Additionally, Ti/Pt RTD and Cr/Au contact pads are evaporated onto the back of the wafer for programmed heating.[43] The stationary phase is deposited according to a static coating procedure. The resulting film is 0.15 μm thick and the column achieves a theoretical plate count over 4000 plates/m.[43] This is substantially better than previously reported techniques where film thicknesses were >1 μM.[9,29] Additionally, the separation efficiency is good enough to separate mixtures of 30 semi-volatile and volatile compounds.[17] Although the results achieved by this specific prototype are impressive, the fabrication process is complicated and involved.

The example detailed above is a high performing microcolumn in terms of theoretical plate count and peak capacity. For example, the present microcolumns perform well relative to columns reported in the literature that are fabricated similarly. In fact, a recent article describes a 1 m long coated microcolumn capable of separating only four components, and claims this is "expected" due to the extremely short nature of the column.[49]

As mention earlier, circular column geometries have been pursued in a few studies in an effort to make more uniform, and therefore higher performing microcolumns, but these often require additional and more complex etching steps. To general approaches have been used to make circular columns. One of these is to etch a semicircular channel into the silicon wafer.[24] This channel may then be sealed with a flat piece of glass to make a semicircular column channel, or it may be joined with a complementarily etched piece of silicon with another semicircular channel. When these are joined, they form a circular channel. The other strategy is to etch the entire shape into a silicon substrate.[12,21] These techniques etch a circular channel deep within the silicon substrate, and then the top is sealed. A recent patent uses a technique similar to this where the circular column is formed so that the topmost part of it is tangentially in contact with the surface of the wafer, thus allowing for the top flat surface to be sealed while minimizing the irregularity of the channel shape.

Overview of Related Art—Polymeric GC Microcolumns:

We are aware of only one a few reported studies in which an all-polymer microcolumn was fabricated and used for gas separation.[50] In 2008, Malainou et al. reported a microcolumn made entirely from PDMS used for the separation of benzene and xylene. The columns were fabricated by casting and curing PDMS onto a Si/SU-8 lithographically patterned inverse mold, sealing the channels with a PDMS thin film on a polymethylmethacrylate support via oxygen plasma surface modification, and finally attaching tubing via Nanoport fittings. Two columns were tested with dimensions of 1 m length, 280 μm width, and either 30 μm or 50 μm height. The maximum separation efficiency, N=360 plates, was achieved with the 30 μm height column at a working temperature of 85° C., the retention times were ~0.9 minutes for benzene and ~2.8 minutes for xylene, with substantial tailing observed of the analyte peaks.

There has also been an attempt to make a microcolumn using poly(p-xylene), or parylene, as the column substrate material.[51] Columns were constructed by vapor depositing parylene onto an etched silicon channel template. The parylene was meant to serve as both the structural material of the column as well as the stationary phase. A thin metal layer between parylene layers acts as conduit to heat the column, and it also limits the thickness of the stationary phase. Parylene has low gas permeability, however, and thus performed poorly for separating gaseous analytes.

An upcoming technology for the production of polymeric materials, and potentially polymeric GC microcolumns, is additive manufacturing. 3D printing has been used in at least one attempt to make a short column for gas separation and analysis.[52] The column was printed using a high temperature acrylic. Interestingly, columns could be produced with three-dimensional channel arrangements, and the column connections were even printed into the column. The column was not a capillary column, however, and required a packing material rather than a stationary phase coating. This is due to the limited resolution of current 3D printer technology.

The most successful example of polymeric microcolumns developed for gas separation is our previously reported disposable epoxy microcolumns.[1-2] The method for fabricating these columns is greatly simplified in comparison to the complex multistep process for making silicon microcolumns, and it also eliminates the need for applying a stationary phase after column fabrication. To make the columns, epoxy is cast over a column mold, forming a channel 1 m long with a dimension of 250 μm×500 μm or 100 μm×500 μm. The columns are sealed by placing a piece of glass with a thin epoxy coating over the open side of the column and allowing the epoxy to cure. Fused silica capillary tubing is placed in the column ends to allow for connection to a gas chromatograph.

In order to make a column with a stationary phase lining the channel wall in one step, diethoxydimethylsilane (DEDMS) was mixed with the epoxy precursor. Once the mixture was degassed and placed in an oven to cure, the epoxy monomers polymerized to form epoxy polymer while the DEDMS polymerizes to form PDMS. The two polymers phase segregate during the curing process, and the PDMS, possessing a lower surface energy, collects at the surface of the column channels. The resulting column surface has microscopic regions of PDMS rich phase, forming a structure very similar to traditionally coated column channels. This method was used to produce columns with 100 μm×500 μm by 1 m channels, and the columns had effective plate counts of 1800 plates.

With the exception of our previous polymeric columns, there have been no other examples of high-performing polymer microcolumns reported. All-PDMS microcolumns suffer from the high gas permeability of the substrate material, resulting in high retention, tailing, and poor separation. Other polymers, like parylene, do not have a high enough gas permeability interact with analyte gases and separate them. It has been shown with our previous columns that polymer methods can be used to construct columns that have stationary phase coatings sufficient for good separations without using expensive or complicated processes. Building on our work developing polymer microcolumns by incorporating the sacrificial fibers technique developed by Moore et al.[3] and using polymer swelling to deposit a stationary phase film on the sacrificial fibers, as described by Esser-Khan et al.,[4] we have developed distinctly new methods for inexpensively and simply constructing columns that are not limited to rectangular cross sectional geometry and perform efficient gas separations.

Overview of Some Embodiments of the Present Invention

The present invention provides a method of making a tubular channel embedded in a polymer substrate with a diameter of 100-1000 μm and a length of 10 cm to tens of meters; the unique aspect of the process is the use of a sacrificial thread embedded in a setting polymer (thermal-, photo- or thermoplastic) that is subsequently removed by solvent or thermal decomposition leaving the channel in its place. In one embodiment, the wall of the column is coated in a thin layer (0.5 μm) of polydimethylsiloxane or other suitable polymer or liquid coating to enhance partitioning of analytes between the gas phase of the channel and the coated wall. The column is used to separate a sample of gases into its component parts using the usual gas or vapor chromatographic process. This column could be used in a gas chromatography device, especially a portable device for the analysis of volatile samples.

The polymer column was invented to facilitate the analysis of gaseous or volatile samples, particularly in a portable chromatography instrument. The polymer substrate simplifies and reduces the cost of column production relative to traditional lithographed silicon microcolumns. In addition, the sacrificial template production method provides a facile means to produce columns with a circular cross section or other column geometries available from the sacrificial material.

This product is an improvement on the disposable column design previously patented by our lab (United States Patent Application 2015/0300998).[1-2] The improvement lies in the use of a sacrificial fiber to template the column channel.

The previous design used a mold to cast the column channel, resulting in columns limited to a rectangular cross section. In contrast, the sacrificial fiber template produces columns with a circular cross section, akin to traditional capillary columns. Due to the greater uniformity of gas flow through a circular channel in comparison to a rectangular channel, the circular channel should improve the separation efficiency of the column and increase the plate count compared to a rectangular channel of similar cross sectional area.

In addition, a stationary phase coating can be applied to the channel wall via a coated sacrificial fiber directly, or alternatively but less preferred by standard static or dynamic coating methods. The polymer thread can be used to absorb the preferred stationary phase before its use as the sacrificial template in the substrate polymer. Upon removal of the sacrificial material, the thin stationary phase layer will remain within the channel and serve as a coating on the resulting channel wall.

The use of a sacrificial fiber to form the column channel also allows different column geometries to be used. The fiber can be arranged arbitrarily to produce spiral, serpentine, helical, or complex arrangements in both two- and three-dimensions. In contrast, both lithography and our previous polymer columns were limited to two-dimensional arrangements.

The present disclosure demonstrated that a sacrificial fiber can be used to construct an inexpensive yet high-performing gas chromatography microcolumn with circular column geometry. Previous to this work, almost all GC microcolumns were constructed with rectangular column geometry. Traditional gas chromatography used stationary phase-lined silica capillary tubing with circular geometry because it provides the most uniform path for an analyte plug traveling through the column, thus minimizing turbulence and other phenomena which contribute to column broadening. For most reported microcolumns, circular geometry has not been feasible. Silicon-based microcolumns already require multistep lithography processes to create microcolumns with rectangular geometry. Even more complex processes are needed to etch circular column channels, and these processes introduce their own challenges, such as sealing a deeply etched channel or properly aligning two hemispherical channel halves precisely. Even our previous example of microcolumns featured rectangular column channels obtained from polymer molding processes. The process described in this work, in contrast, requires very few steps and no special techniques, lithographic instrumentation, or skills as are required for lithography.

These fiber-templated columns are among only a few examples of inexpensive polymer microcolumns, with our previous polymer microcolumns being the most successful example of polymer microcolumns able to analyze complex gas mixtures. As with those columns, we are using methods that are adaptable to a variety of different polymers, are easily scalable, and can be used with molds of different types and shapes. In addition, as this method relies on a fiber to template the column, it is not limited even to two-dimensional geometry but can rather be arbitrarily arranged in any three-dimensional shape desired.

The ability to coat the fiber with the stationary phase prior to embedding it in the polymer substrate is another feature of this method that is unique and advantageous. Fibers can be easily coated with either the fiber swelling technique we are using or possibly a different polymer coating technique. Highly uniform coatings could be applied to fibers using scalable techniques rather than having to individually coat the channel walls of each microcolumn after it is produced.

The sacrificial fiber-templated microcolumns presented in this work are unique among microcolumns for their cross section geometry and coating method. All of the methods used to construct these columns are simple and inexpensive. These microcolumns already show the potential to match or exceed the separation performance of our previous polymer microcolumns, and in doing so approach the separation efficiency of the best microcolumns currently available. The inexpensive and facile production of these microcolumns will aid in the development of portable gas separation and analysis technology.

Detailed Descriptions of Some Embodiments of the Methods and Microcolumns of the Present Invention Fabrication:
Mold Preparation:
Micromachining was used to fabricate a polymer polyether ether ketone (PEEK) primary mold (also referred to as a master mold). A representative image of the SurfCam CAD/CAM blueprint for the mold is given in FIG. 1A. The mold features a channel 250 μm wide, 500 μm deep, and one meter long in a serpentine arrangement. On the PEEK primary mold this channel is in bas relief. A photograph of the PEEK mold is shown in FIG. 1B. From the PEEK mold, PDMS secondary molds are cast. Dow Sylgard 184 elastomer is mixed in the ratio given by the manufacturer instructions and degassed before pouring over a PEEK column primary mold. After degassing a second time, the PDMS of the secondary mold is cured at 100° C. for two hours. The PDMS secondary molds thus feature a serpentine groove. A photograph of a PDMS secondary mold is shown in FIG. 1C. This groove acts as a shaping guide for the sacrificial fiber as it is encased in a pre-body material (e.g., epoxy). The flexibility of the PDMS secondary mold allows for facile removal of it from the sacrificial fiber and microcolumn body after the pre-body material (e.g., epoxy) is cured.

Fiber Catalyst Preparation:

Poly(lactic acid) (PLA) fibers are used as an example of the sacrificial fiber template for production of the column channel. At high temperatures, PLA can depolymerize into the dimer lactide, which is sufficiently volatile to be removed as vapor. As discovered by Moore et al.,[3] the temperature at which this depolymerization occurs can be reduced to less than 200° C. by the incorporation of the catalyst tin(IV) oxalate into the PLA. At 200° C. under vacuum, a catalyst-treated PLA fiber embedded in an epoxy matrix depolymerizes, and the lactide forms the channel as the vapor is removed.

For some tests, we purchased a 300 μm diameter PLA fiber that has already been catalyst-treated from CU Aerospace (http://www.cuaerospace.com/Products/VascTechMicrovascularComposites.aspx). The exemplary 100 μm fiber is not catalyst-treated, so we used the method developed by Moore et al. to prepare the fiber for low-temperature depolymerization. A length of fiber was placed in a mixture of trifluoroethanol, deionized water, and tin(IV) oxalate. After soaking for a day, the fiber was removed and allowed to dry in air. After drying excess tin(IV) oxalate was gently wiped from the fiber surface.

Fiber Coating:

A thin layer of PDMS is absorbed into the surface of a PLA fiber using the solvent swelling and oligomer trapping method developed by Esser-Kahn.[4] This method uses a tertiary solution of the oligomer to be entrapped, a solvent to swell the fiber, and a solvent to dissolve the oligomer while being a nonsolvent for the fiber; to fill these roles in our study, we are using Dow Sylgard 184, 1,4-dioxane, and hexanes, respectively. In a typical coating, a meter of 300 μm diameter PLA fiber was threaded through a small PTFE tube. The tube was then filled with a coating solution consisting of a mixture of PDMS precursor (Dow Sylgard 184), hexanes, and 1,4-dioxane, and the fiber was left soaking for one hour. Afterwards, the coating solution was drained from the tube, and hexane was added to the tube to rinse the fiber twice. The hexane was removed, and the fiber was placed in a 45° C. oven for 4 hours to cure the PDMS layer. The ends of the fiber were clipped in place to prevent shrinking as the fiber was mildly heated during curing.

Column Casting:

The coated PLA fiber was threaded through the grooves of PDMS serpentine column mold. Tape is then used to form a barrier around the mold in which to pour the thermoset polymer to encase one side of the fiber. As an example, about 4 g 3M DP-190 epoxy monomer (total mass, each part is dispensed in a 1/1 volume ratio) is mixed with 1.2 mL 200 proof ethanol, and the epoxy monomer is poured into the mold over the coated fiber. This thermoset epoxy was chosen for its favorable properties as a column substrate with low gas permeability. Table 1 shows the components and approximate composition of the epoxy. After degassing the epoxy monomer under vacuum, the mold is left to cure at room temperature for 15 hours.

TABLE I

A list of the components and approximate percent composition of the two-part epoxy 3M DP-190.

| Chemical | DP-190 A | B |
|---|---|---|
| 4-4-(1-methylethylidene)biscyclo-hexanol with (chloromethyl) oxirane | — | 30-40 |
| Poly(bisphenol A-co-epichlorohydrin) | — | 60-70 |
| (3-glycidyloxypropyl)trimethoxysilane | — | 0 |
| Aliphatic polymer diamine | 70-90 | — |
| C-18 unsatd, dimers, polymers w/ 4,7,10-trioxatridecane-1,13-diamine | | |
| 4,7,10-trioxatridecane-1,13-diamine | 10-30 | — |
| Calcium trifluoromethanesulfonate | 1-5 | — |
| Toluene | <=0.98 | — |

Once the epoxy has solidified, the epoxy is removed from the PDMS mold carefully to ensure the epoxy does not separate from the PLA fiber. Clear tape is then once again used to form a perimeter in order to cast more epoxy and cover the other side PLA fiber, completely encasing it. About 4 g DP-190 epoxy monomer is mixed with 1.2 mL 200 proof ethanol and poured over the PLA fiber and cured epoxy. After degassing under vacuum, the epoxy is allowed to cure for a few hours at room temperature before the column is placed in a 70° C. oven for 15 hours. After the column is cured, it is allowed to cool to room temperature.

Fiber Removal:

The catalyst-treated PLA fiber is depolymerized at 190° C., and the lactide monomer removed from the epoxy as a vapor, thus leaving a hollow channel through the epoxy substrate. The cured epoxy column is placed in a stainless steel vessel. The vessel is evacuated and heated to 180° C. for 24 hours. The heating is then shut down, and the vessel is allowed to cool under vacuum for 3 hours.

With the fiber removed, a hollow column channel now runs through the epoxy substrate. The column ends are cleaned of any residual fiber material, and the ends are expanded using a needle to allow the column to be connected to capillary tubing leading to the GC instrument. A needle is used to introduce a taper on the ends of the column large enough to insert a 4 cm length of silica capillary tubing. The capillary tubing is then secured with more DP-190 and placed in an oven to cure. The column channel is cleaned to remove any residue from the PLA fiber, as well as residual catalyst. Using a syringe pump, about 1 mL of 1,4-dioxane is slowly eluted through the column. A similar amount of ethanol is them pumped through the column to remove the dioxane, and air is streamed through the column to evaporate any remaining wash liquid. Column pressures are kept minimal during the washing and drying.

Column Testing:

Columns were tested using a Hewlett Packard 5890 Series II gas chromatograph with a flame ionization detector, shown in FIG. 2. Data from the GC were collected using the Chemstation software (Rev. A.10.01). Microcolumns were connected to the GC via the silica capillaries using nanoport fittings. Samples were injected manually, and helium was used as the carrier gas. The columns were tested by running a variety of analyst, mostly different alkanes. A test solution was prepared by combining a mixture of alkanes.

Electron Micrographs of Microcolumns:

A completed fiber-templated microcolumn is shown in FIG. 3. The serpentine arrangement of the channel is evident in the picture. The silica capillaries are secured on the two ends of the column so it can be connected to an instrument. They are cut to a minimum length to allow connection but not increase the path length of the gas unnecessarily through a non-separating material. FIGS. 4A-4B show optical micrographs of 300 µm and 100 µm columns. The serpentine turns are shown, as well as some straight column portions. The columns appear relatively smooth without column obstructions or wall texturing. Importantly, no bubbles are seen in the column channels or the epoxy substrate in FIG. 3 or 4A-4B. It was found that bubbles in the column channel are minimized by laying the template fiber in the PDMS mold first before casting epoxy over it rather than casting an epoxy channel, fitting the fiber into the epoxy, and covering the fiber.

A representative fiber-templated column was cut to obtain column cross sections for analysis with a scanning electron microscope. Two SEM images of the cross section of a 300 µm diameter column are shown in FIGS. 5A-5B. From these micrographs, the circular cross section of the column channel is evident. The micrograph showing a close-up view of one channel shows that the channel wall is relatively smooth, as would be expected based on the smooth surface of the sacrificial fiber. The column was not cleaned prior to imaging, so there is a small amount of residual material present in some of the channels. This is a unique geometry among microcolumns, with few reports of circular cross-section channel columns, and those reports of circular or nearly circular channels were produced using much more complex methods than our fiber template method.

Microcolumn Separation Efficiency:

The fiber-templated microcolumns were tested for their separation efficiency by analyzing their ability to separate alkane samples. The column conditions used for the majority of the tests are given in Table 2. Results where these conditions were not used will be noted.

TABLE 2

GC operating parameters for the testing of 300 µm columns. These parameters were used unless otherwise noted.

| Split Ratio | 100:1 |
| --- | --- |
| Flow Rate | 1.7 mL min$^{-1}$ |
| Column Head Pressure | 7 kPa |
| Linear velocity u | 40 cm s$^{-1}$ |
| Injection port temperature | 250° C. |
| Column temperature | 25° C. |
| FID temperature | 300° C. |
| Injection volume | 0.05 µL |

In some of our initial tests, we attempted to coat a PLA fiber with a thin coating of PDMS by soaking the fiber in a solution of 33/40/27 PDMS precursor/hexane/1,4-dioxane for one hour. A chromatogram of a hexane sample in one of these columns is shown in FIG. 6. The column retained the hexane, but the chromatogram shows a wide peak with significant tailing. The calculated theoretical plate count based on hexane elution is 65 plates. This is indicative that the PDMS coating on the microcolumn is too thick and possibly uneven. We have adjusted the ratios of the coating solution components to find the solution that will provide the optimal thickness for separation in these columns.

FIG. 7 shows a chromatogram of a column prepared using a 20/60/20 PDMS precursor/hexane/1,4-dioxane coating solution to deposit a PDMS layer on the sacrificial PLA fiber. We expected this mixture to deposit a thinner coating on the fiber. The alkane samples eluted through the column in much more narrow peaks compared to the previous example. The figure shows a successful separation of hexane, heptane, octane, and nonane. While the separation efficiency of the column in FIG. 7 is better than in FIG. 6, the peaks are still relatively wide; the theoretical plate count based on the heptane peak is about 200 plates. As is visibly evident in the octane and nonane peaks, part of the peak widening in FIG. 7 is due to peak fronting. This is indicative that the column is overloaded, like due to a thinner stationary phase thickness, but the amount of sample injected onto the column is too high for the more thinly coated column.

We adjusted the split ratio and reduced the sample volume injected in order to improve the chromatographic separations. In addition to coating the columns via depositing a PDMS film on the sacrificial fiber, we also have attempted to repeat the in situ stationary phase formation we previously used through the incorporation of diethoxydimethylsilane (DEDMS) into the epoxy. In this method, DEDMS spontaneously forms islands of PDMS at the channel walls of an epoxy microcolumn through phase separation. Also, we have prepared control microcolumns using undoped epoxy and uncoated PLA fibers to assess the effects of the epoxy substrate itself on analyte gases flowing through the column.

Figure 8:
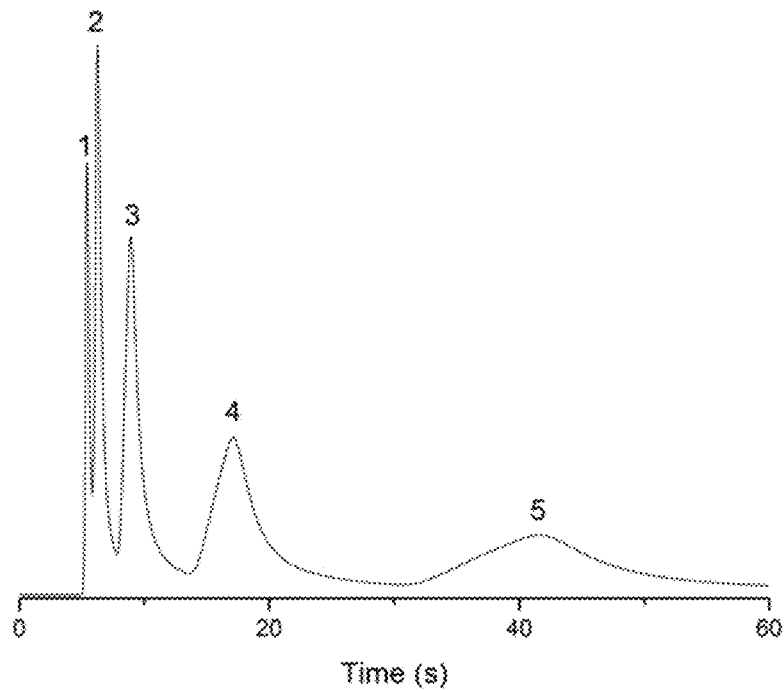
FIG. 8. Chromatogram of the elution of an alkane mixture through a column prepared with a 10% DEDMS in the DP-190 epoxy and an uncoated fiber. The peaks labeled are 1) heptane, 2) octane, 3) nonane, 4) decane, and 5) undecane. The initial peaks are narrow, but broaden greatly with later eluting species. The decane and undecane peaks show some fronting, indicative that the column is still overloaded with sample.
Figure 9:
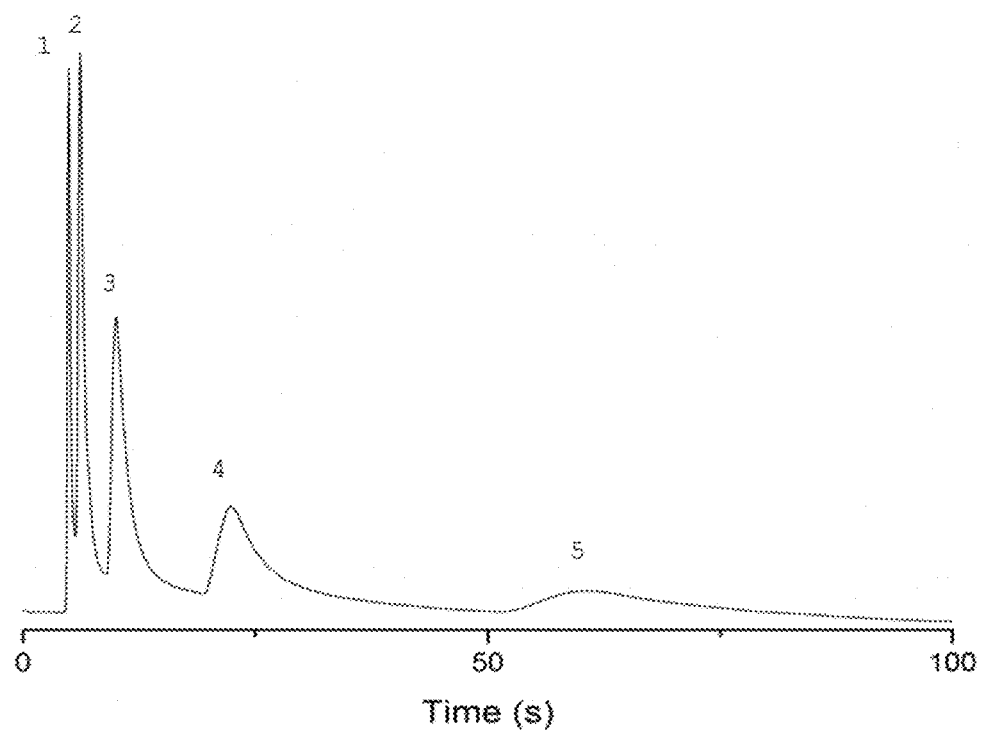
FIG. 9. Chromatogram of the elution of an alkane mixture through a column prepared with DP-190 alone with an uncoated fiber. The labeled peaks are 1) heptane, 2) octane, 3) nonane, 4) decane, and 5) undecane. As with the column made with DEDMS, the earliest eluting peaks are quite narrow, but quickly broaden with later peaks.

Interestingly, as shown in FIGS. 8 and 9, a 10% DEDMS column and a control column, respectively, were able to separate alkane mixture samples, despite the fiber not being coated before use. The epoxy substrate itself appears to have some ability to separate alkane mixtures. Table III shows peak data taken from the chromatograms in FIGS. 8 and 9, as well as theoretical plate counts calculated from each peak. These data show very high separation efficiencies for the earliest eluting peaks. The peaks broaden rapidly for later eluting species, however, resulting in much poorer separation. Part of this effect is likely the columns are still overloaded with sample.

TABLE 3

Chromatographic Data from FIGS. 8 and 9.

| FIGURE | Peak Identity | Center (s) | FWHM (s) | Plate Count |
| --- | --- | --- | --- | --- |
| FIG. 8 | Heptane | 5.40 | 0.33 | 1500 |
|  | Octane | 6.20 | 0.54 | 740 |
|  | Nonane | 8.90 | 1.18 | 320 |
|  | Decane | 17.10 | 3.66 | 120 |
|  | Undecane | 44.55 | 11.9 | 70 |
| FIG. 9 | Heptane | 4.90 | 0.32 | 1100 |
|  | Octane | 6.15 | 0.66 | 500 |
|  | Nonane | 10.00 | 1.76 | 200 |
|  | Decane | 22.35 | 5.45 | 120 |
|  | Undecane | 60.40 | 17.5 | 150 |

Figure 10:
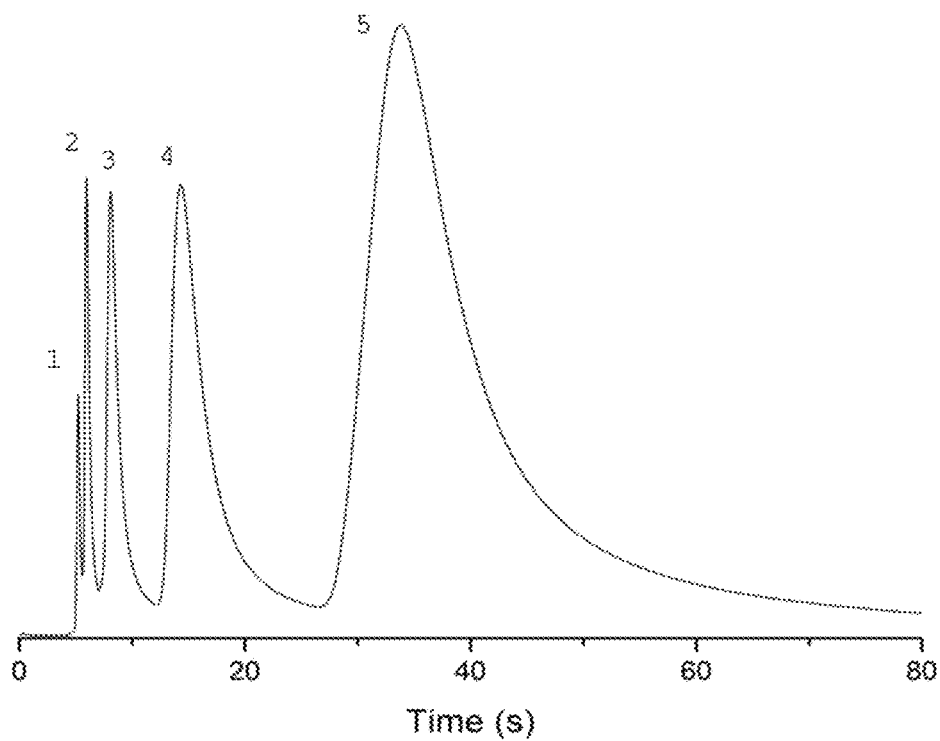
FIG. 10. Chromatogram of the elution of an alkane mixture through a column prepared with DP-190 alone with an uncoated fiber. The sample was injected as vapor from the headspace of an alkane mixture. The labeled peaks are 1) heptane, 2) octane, 3) nonane, 4) decane, and 5) undecane. The reduced sample concentration alleviates fronting effects, resulting in slightly more narrow peaks.

To address the possibility of sample overloading, we reduced our sample injection further to inject the headspace vapor of an alkane mixture comprised of heptane, octane, nonane, decane, and undecane in proportions calculated to give equal partial pressures of vapor in the headspace. As shown in FIG. 10 and a corresponding Table 4, the reduced sample did improve the plate counts of the sample peaks slightly, although the excess broadening of later peaks still persists, and the peaks show more obvious tailing effects.

TABLE 4

Chromatographic data from FIG. 10.

| Peak | Center (s) | FWHM (s) | Plate Count |
|---|---|---|---|
| Heptane | 5.25 | 0.29 | 1800 |
| Octane | 6.00 | 0.43 | 1100 |
| Nonane | 8.10 | 1.05 | 330 |
| Decane | 14.35 | 3.11 | 120 |
| Undecane | 33.75 | 9.25 | 70 |

Figure 11:
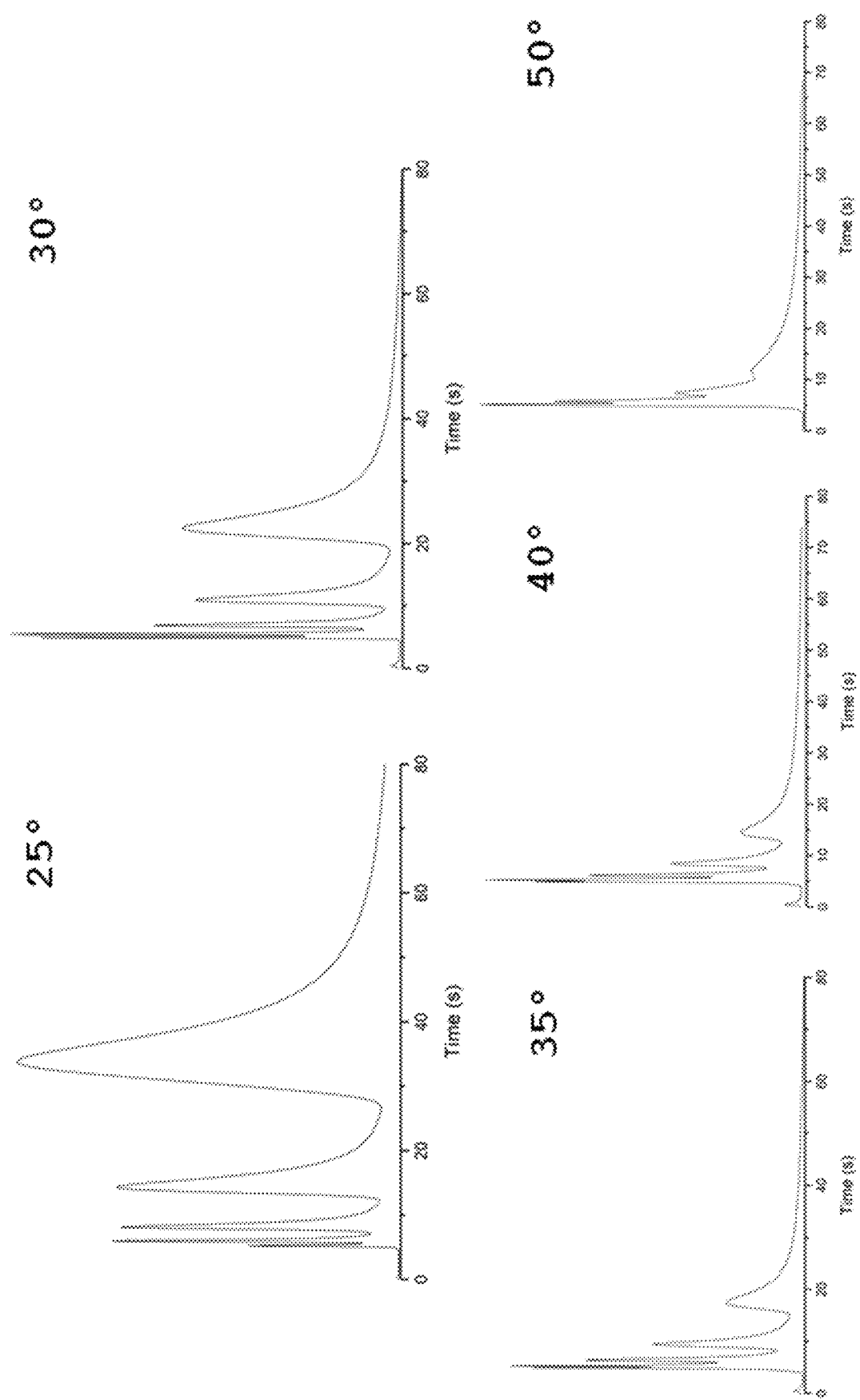
FIG. 11. A series of chromatograms showing the effect of temperature on a the elution of an alkane mixture through a 300 μm column prepared with 10% DEDMS in DP-190 epoxy and an uncoated fiber. As the temperature increases the peaks become less broad, but even at 35° C. the initial peaks are too close together to resolve.
Figure 13:
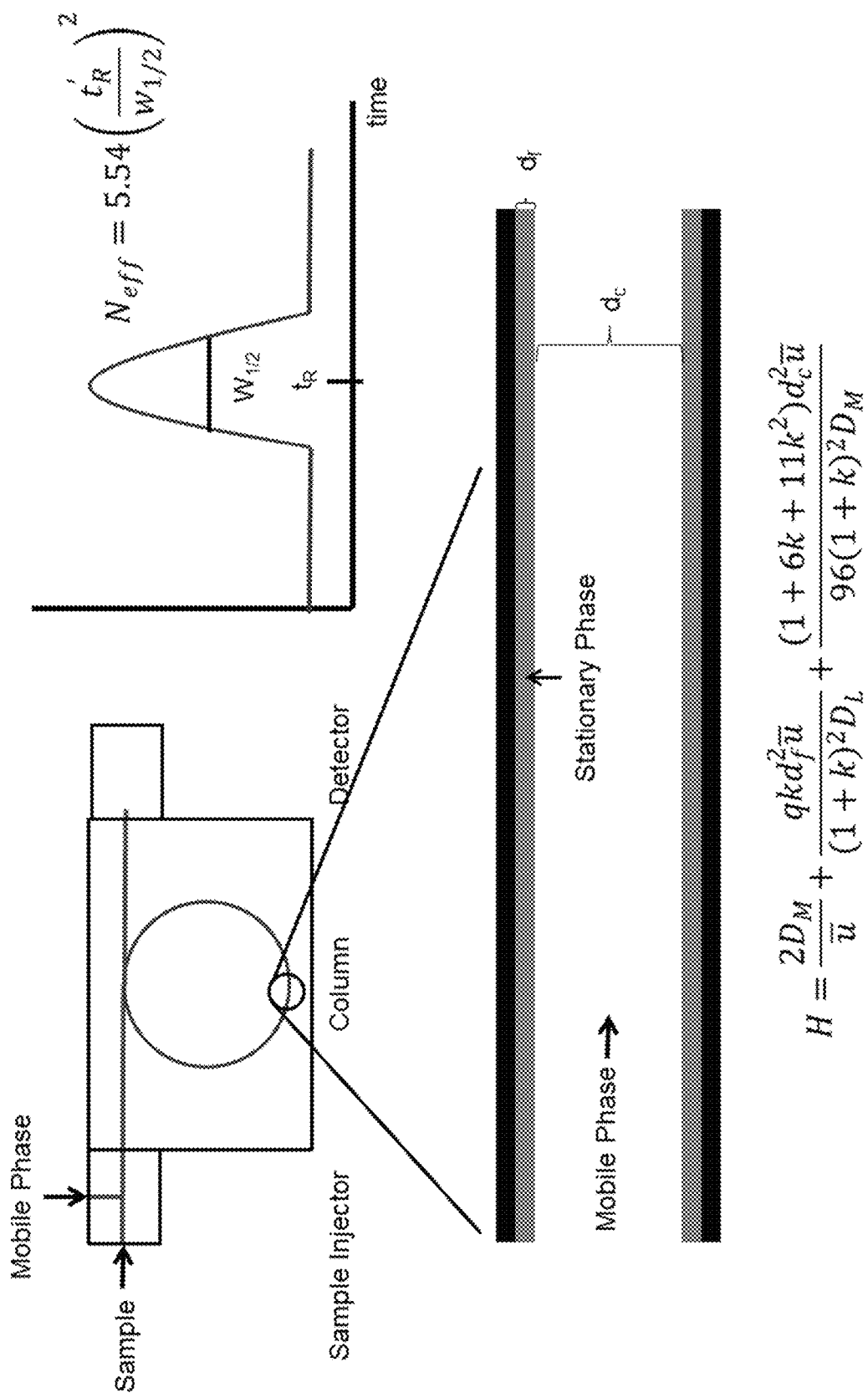
FIG. 13. Illustrations and depictions of certain principles of gas chromatography and microcolumn operation.
Figure 14A:
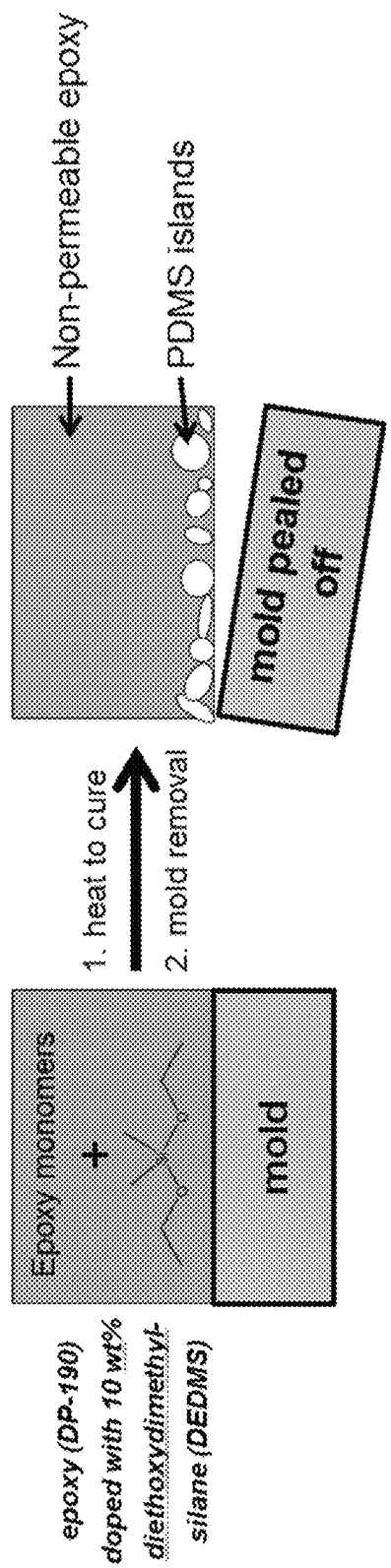
FIGS. 14A-14B. (14A) Schematic corresponding to a formation of PDMS (a stationary phase material) islands at a non-permeable epoxy. (14B) AFM image showing phase-separated epoxy and silane polymer.
Figure 14B:
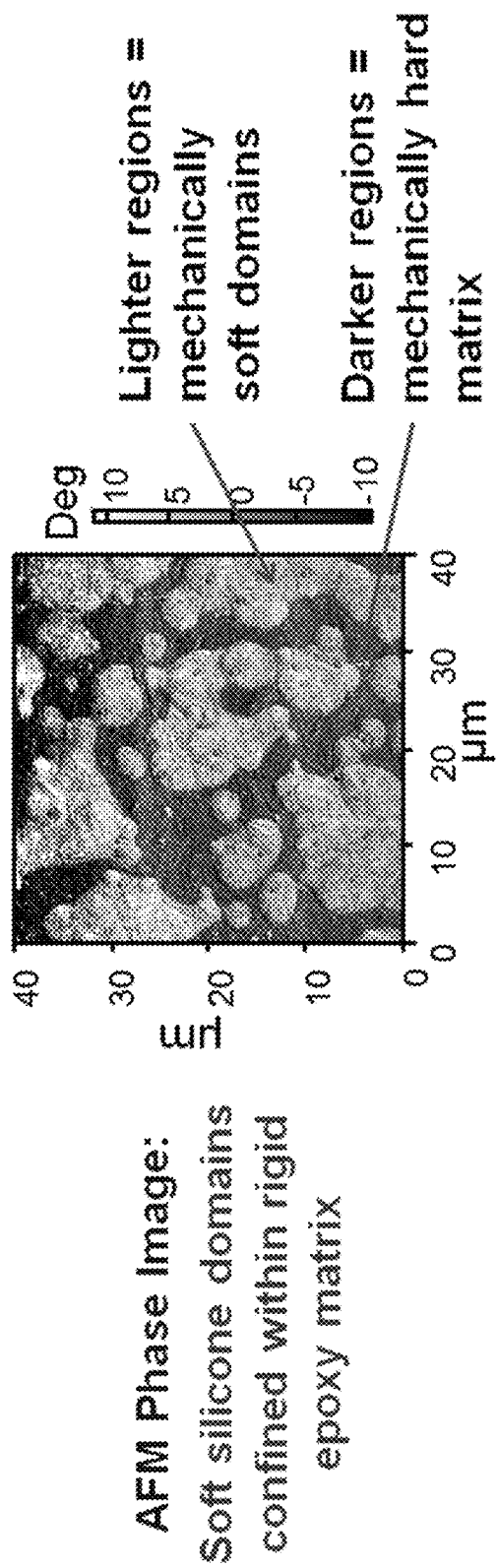
Figure 15:
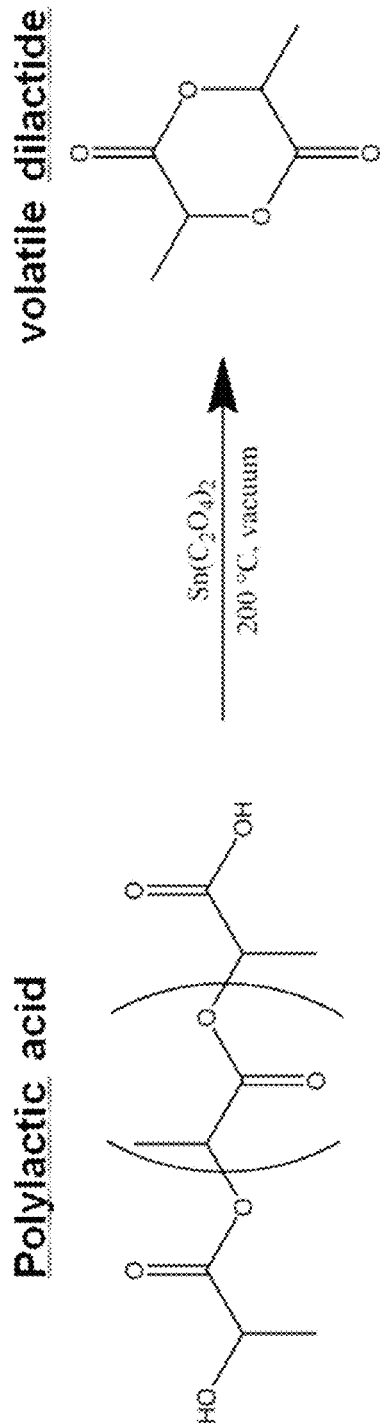
FIG. 15. Chemical reaction schematic corresponding to thermal depolymerization of a sacrificial fiber.
Figure 17:
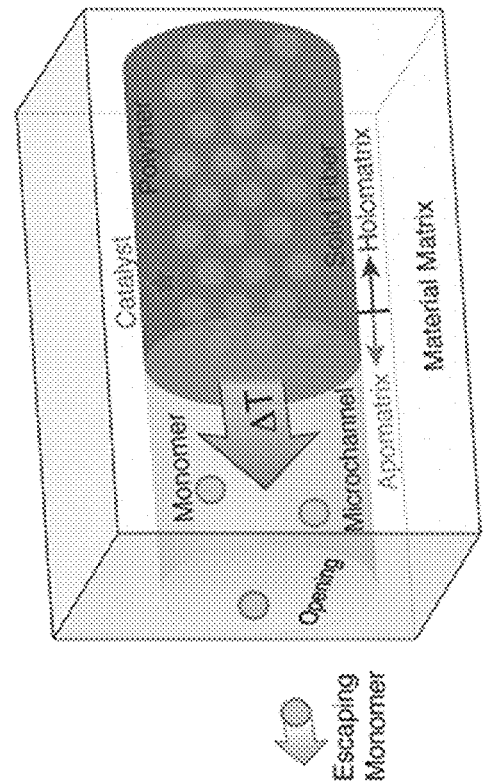
FIG. 17. Illustration depicting removal of a sacrificial fiber via thermal depolymerization.
Figure 16:
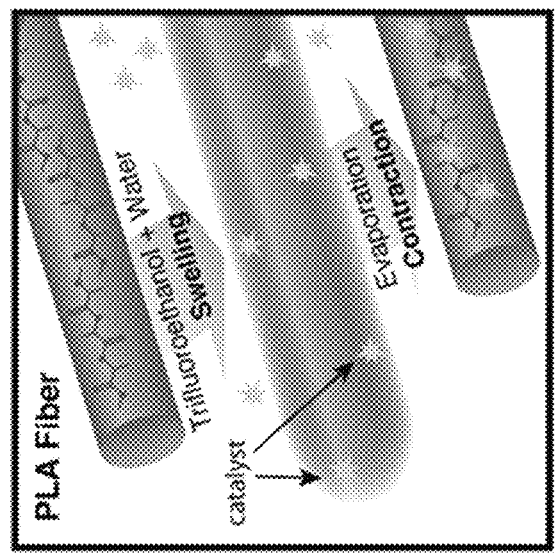
FIG. 16. Schematic depicting impregnation of a sacrificial fiber with a catalyst.
Figure 18:
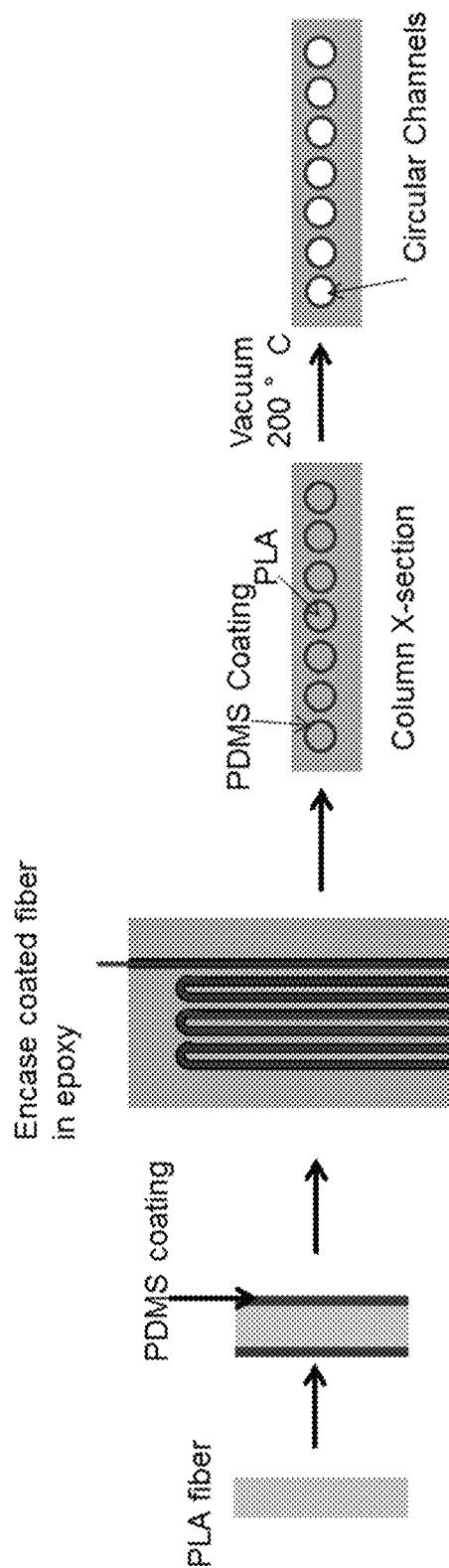
FIG. 18. Schematic of an exemplary method for forming a microcolumn according to the present invention.
Figure 19:
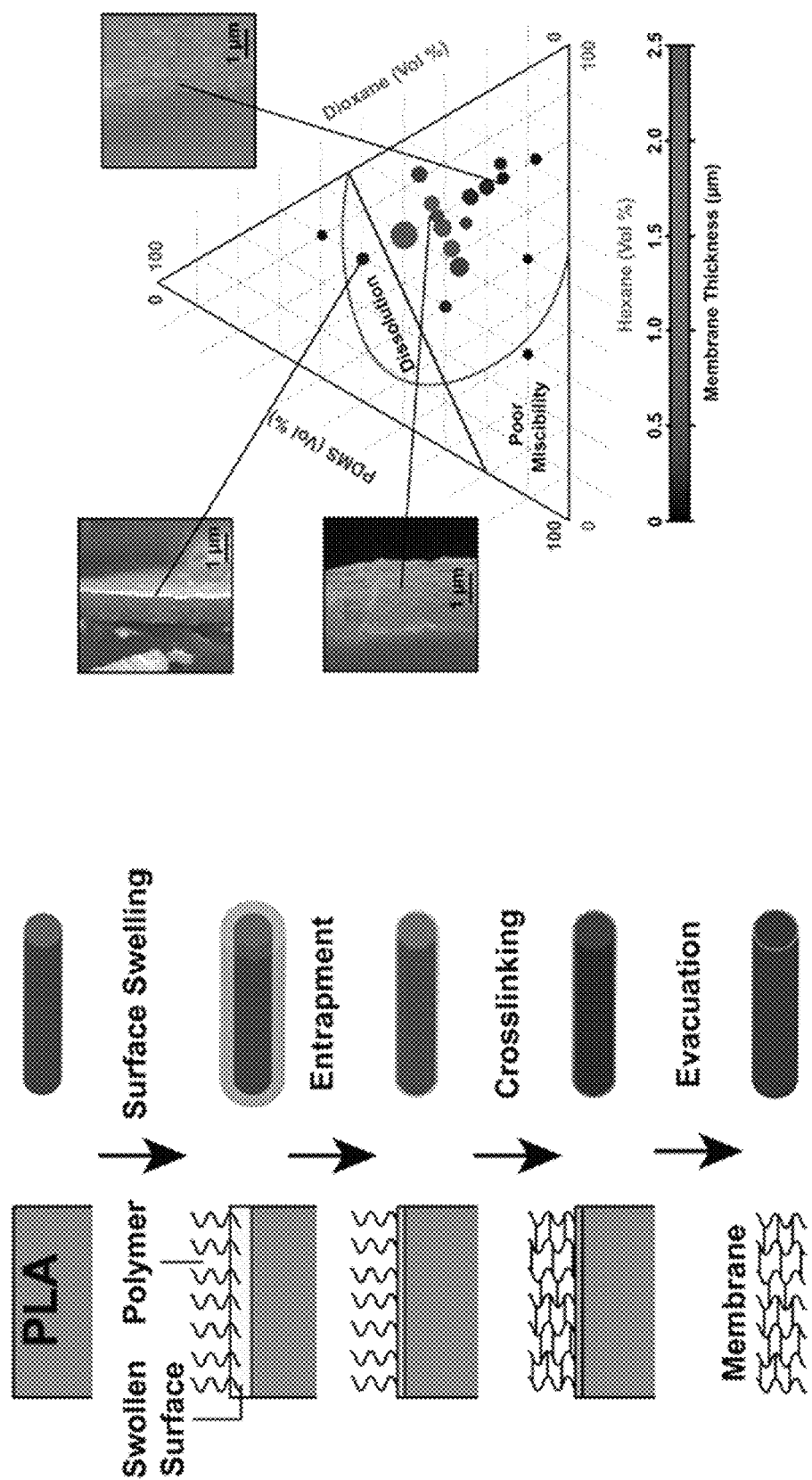
FIG. 19. Schematics and illustrations corresponding to formation of a coating (e.g., PDMS) on a sacrificial fiber (e.g., PLA). The coating may be thin (e.g., 400 nm).
Figure 20:
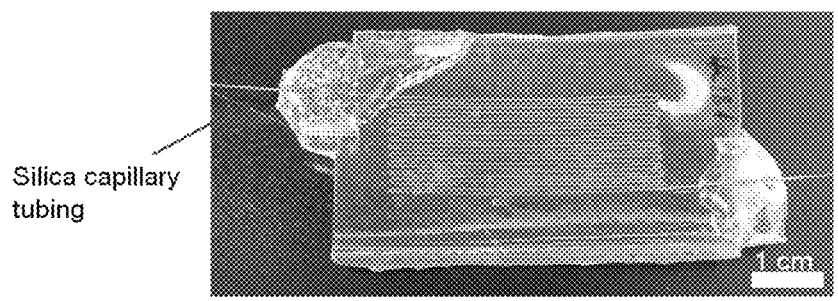
FIG. 20. An exemplary microcolumn according to the present invention.
Figure 21:
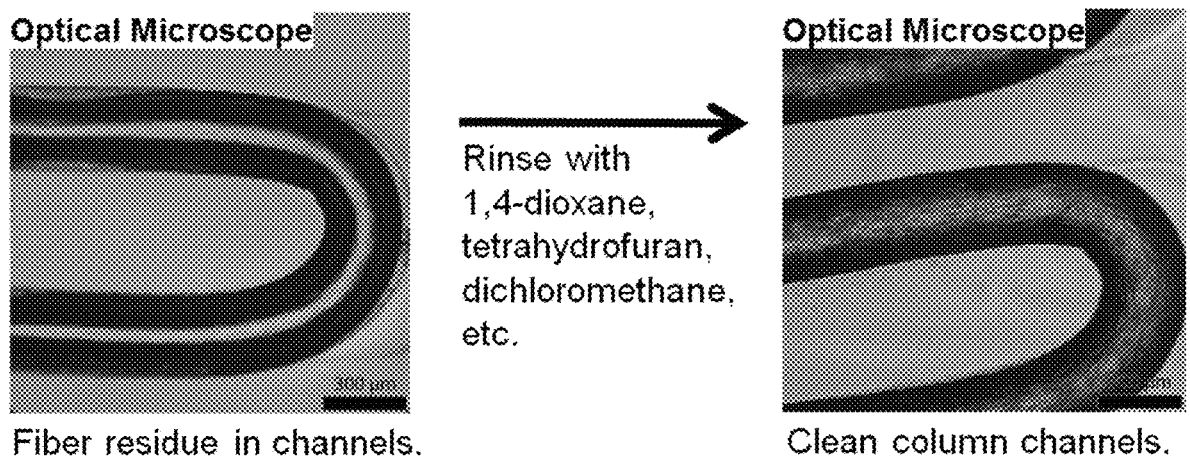
FIG. 21. Optical microscope images of portions of the hollow channel of the microchannel of FIG. 20. After formation, the hollow channel may be rinsed with one or more solvents to remove residue material.
Figure 22:
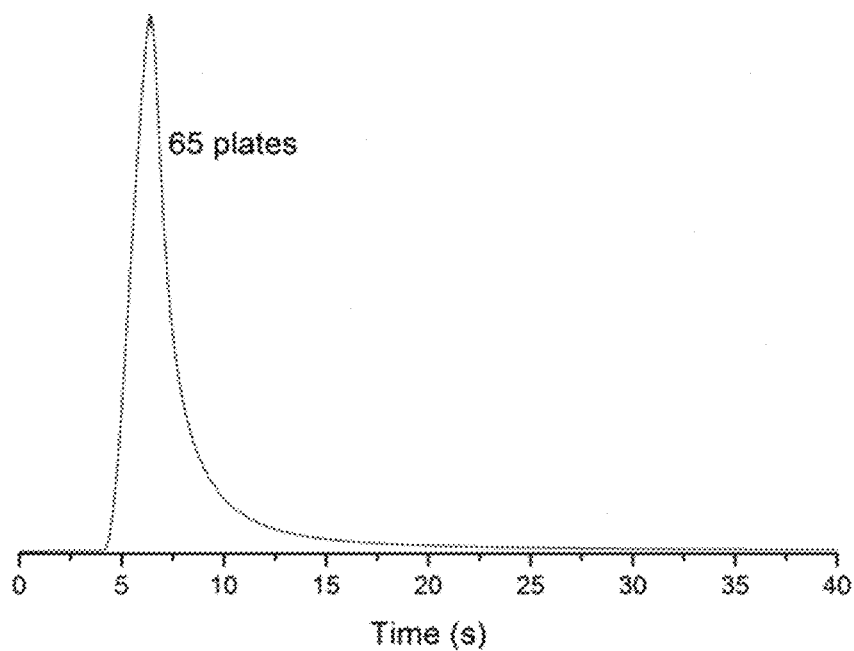
FIG. 22. Chromatogram of the elution of an alkane mixture through an exemplary microcolumn, where a PDMS stationary phase was prepared using a 33/40/27 PDMS/hexane/1,4-dioxane mixture. Wide peaks and tailing are observed.
Figure 23:
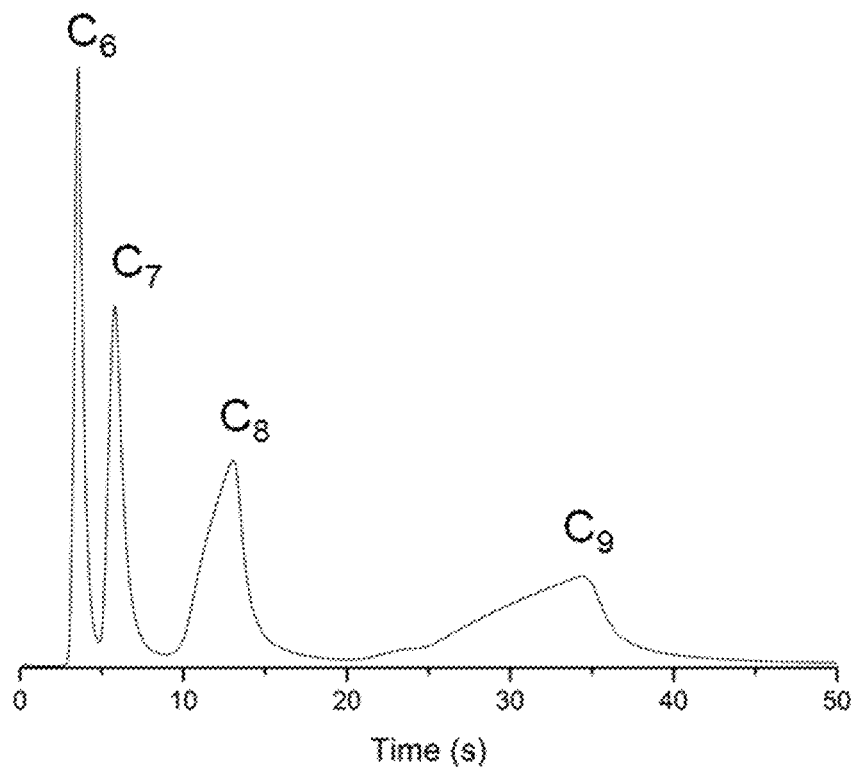
FIG. 23. Chromatogram of the elution of an alkane mixture through an exemplary microcolumn, where a PDMS stationary phase was prepared using a 20/60/20 PDMS/hexane/1,4-dioxane. Peak fronting is observed and over-loading of the sample is indicated.
Figure 24:
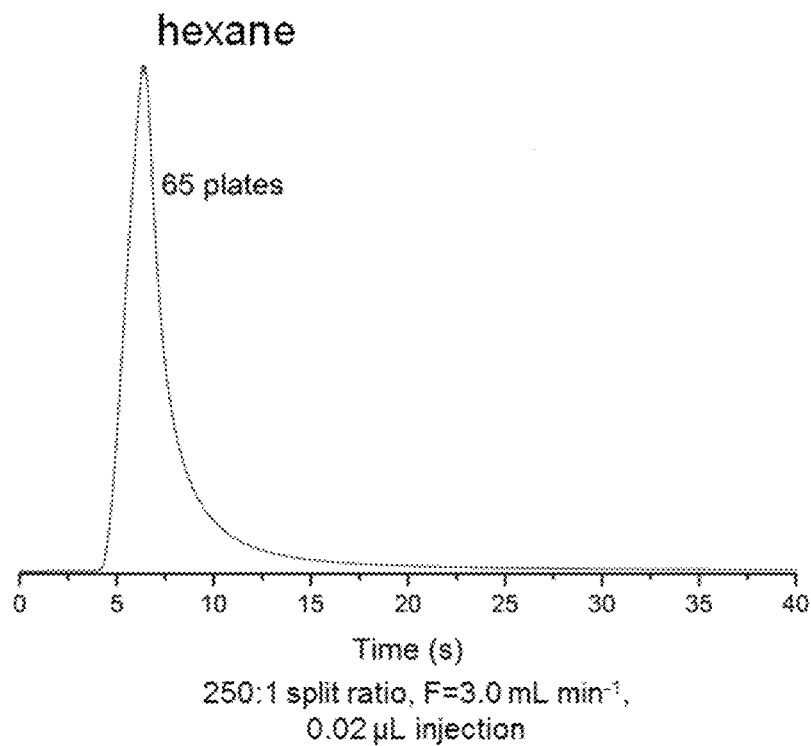
FIG. 24. Chromatogram of the elution of an alkane mixture through an exemplary microcolumn, where a PDMS stationary phase was prepared using a 33/40/27 PDMS/hexane/1,4-dioxane mixture. Wide peaks and tailing are observed.
Figure 25:
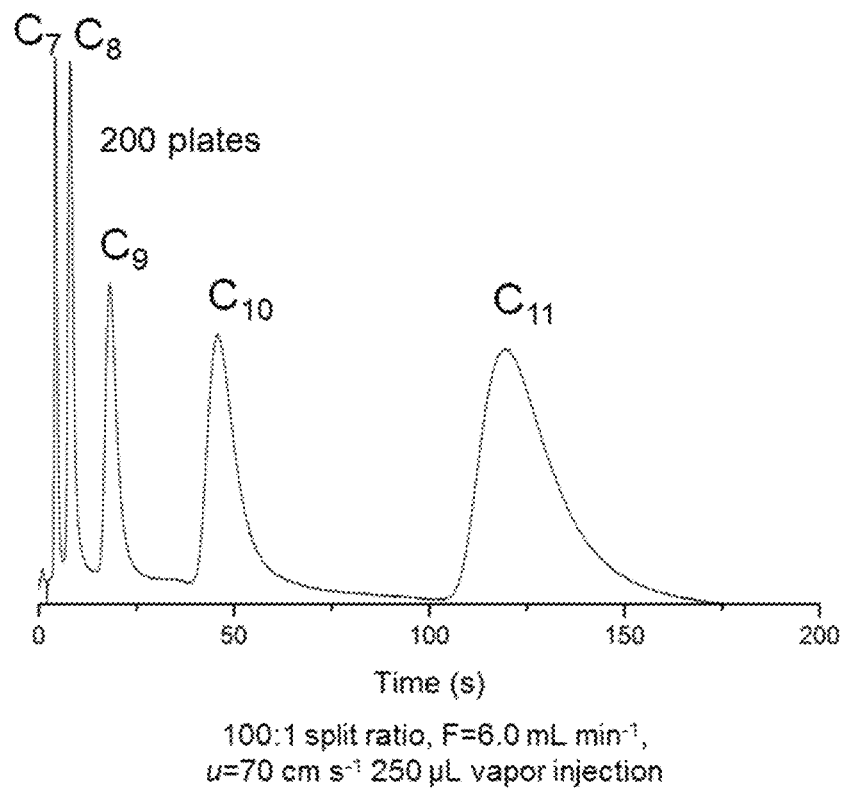
FIG. 25. Chromatogram of the elution of an alkane mixture through an exemplary microcolumn, where a PDMS stationary phase was prepared using a 20/60/20 PDMS/hexane/1,4-dioxane. The sample was injected as a vapor from the headspace of an alkane mixture and the flow rate was optimized.
Figure 26:
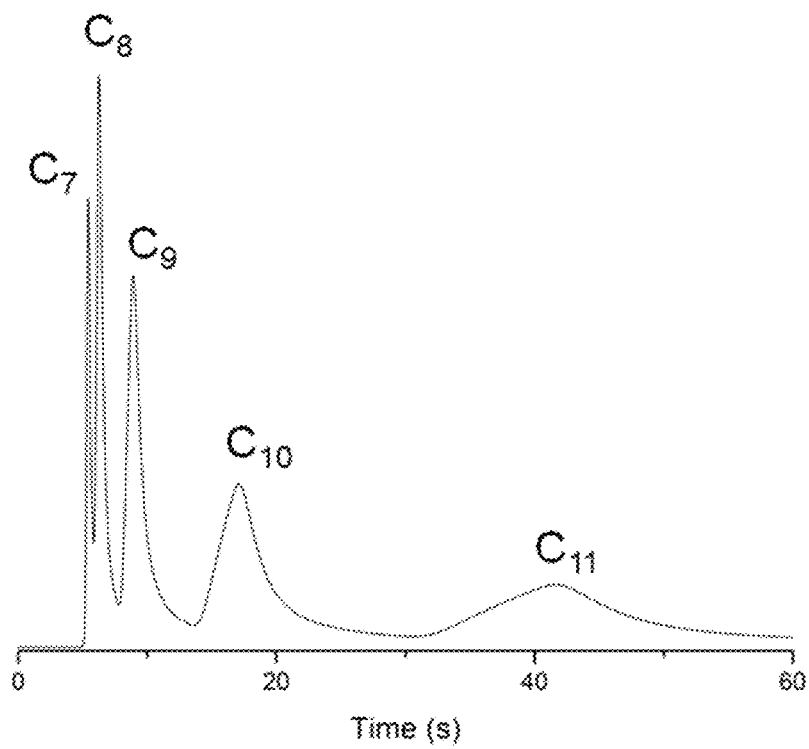
FIG. 26. Chromatogram of the elution of an alkane mixture through an exemplary microcolumn, with a stationary phase having DEDMS prepared using 10% DEDMS in epoxy. The microcolumn was prepared using an uncoated fiber. Very good separation of light analytes is observed. Broadening of later peaks is observed.
Figures 27A, 27B:
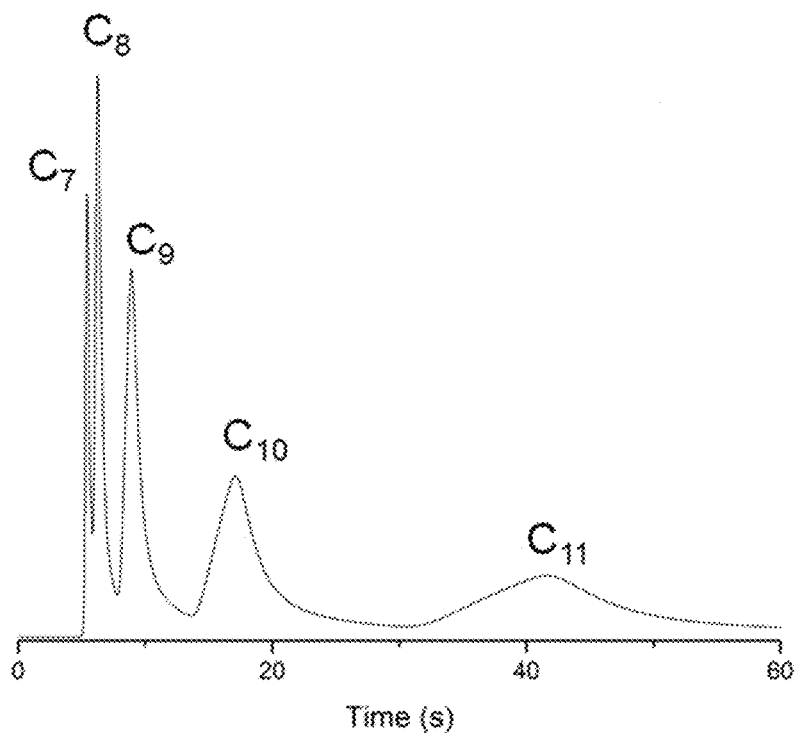
FIGS. 27A-27B. (27A) Chromatogram of the elution of an alkane mixture through an exemplary microcolumn, with a stationary phase having DEDMS prepared using 10% DEDMS in epoxy. The microcolumn was prepared using an uncoated fiber. Results indicate that the column was overloaded. (27B) Table summarizing the chromatogram data for each alkane species.
Figures 28A, 28B:
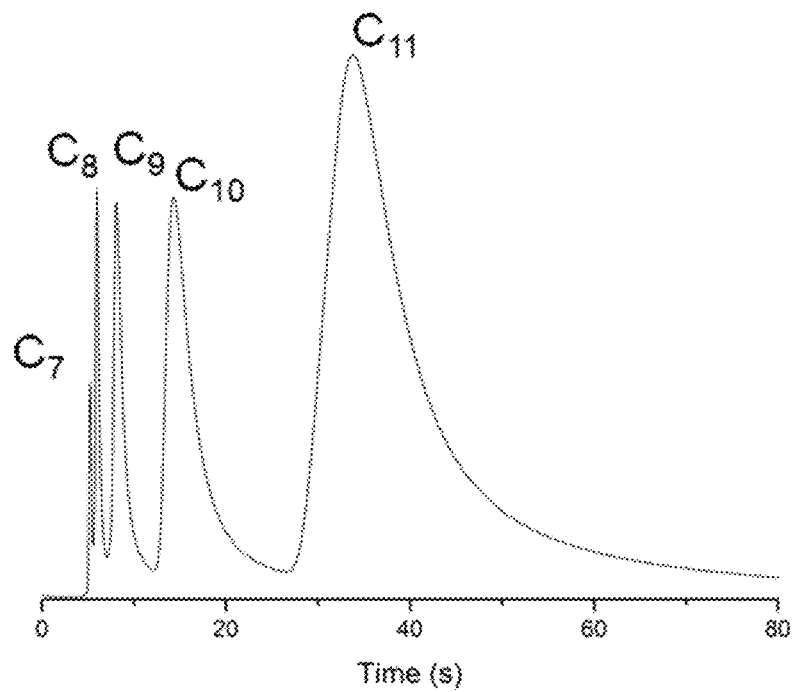
FIGS. 28A-28B. (28A) Chromatogram of the elution of an alkane mixture through an exemplary microcolumn, with a stationary phase having DEDMS prepared using 10% DEDMS in epoxy. The microcolumn was prepared using an uncoated fiber. The sample was injected using the vapor in the headspace of an alkane mixture. (28B) Table summarizing the chromatogram data for each alkane species.
Figure 29A:
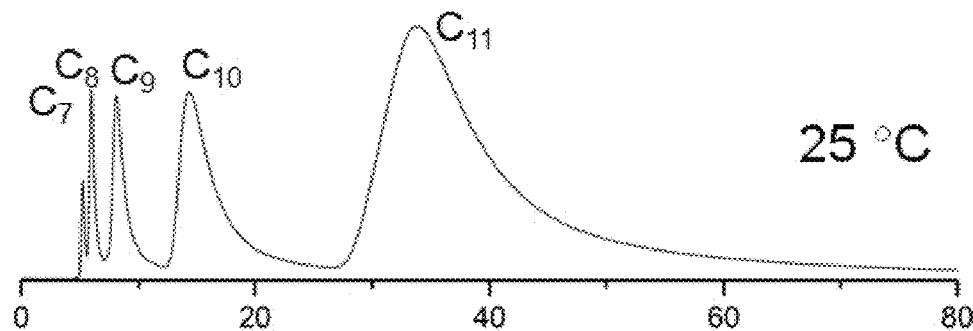
FIGS. 29A-29D. Chromatograms of the elution of an alkane mixture through an exemplary microcolumn at (29A) 25° C., (29B) 30° C., (29C) 35° C., and (29D) 40° C., showing the effects of column temperature. Slight heating is observed to improve plate count. Some tailing and broadening is observed. Among these data, best separation is observed at 30° C. The highest observed plate count for these data is 2100.
Figure 29B:
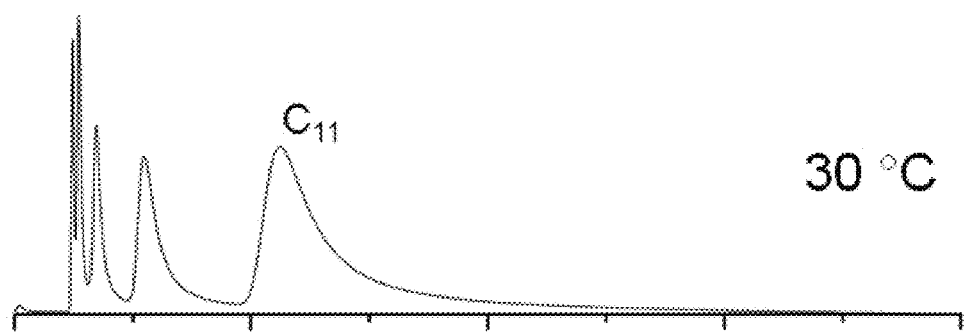
Figure 29C:
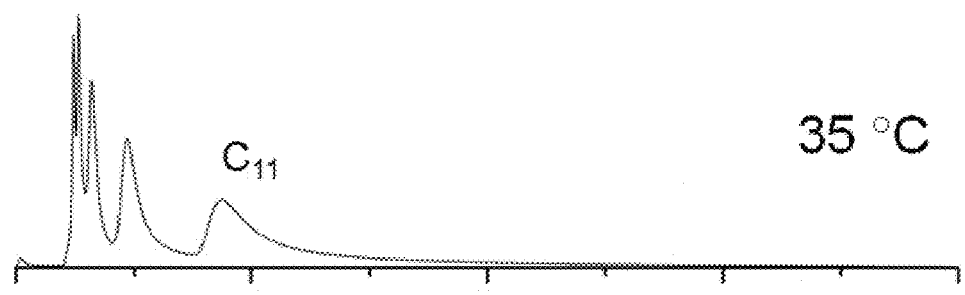
Figure 29D:
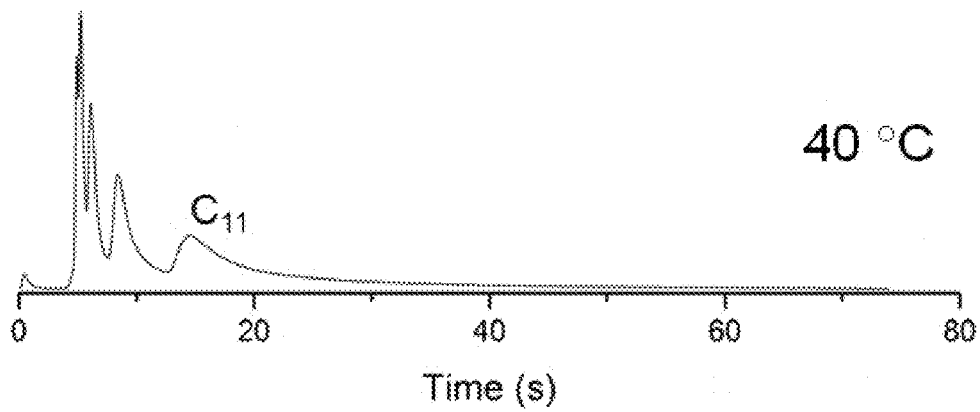
Figure 31:
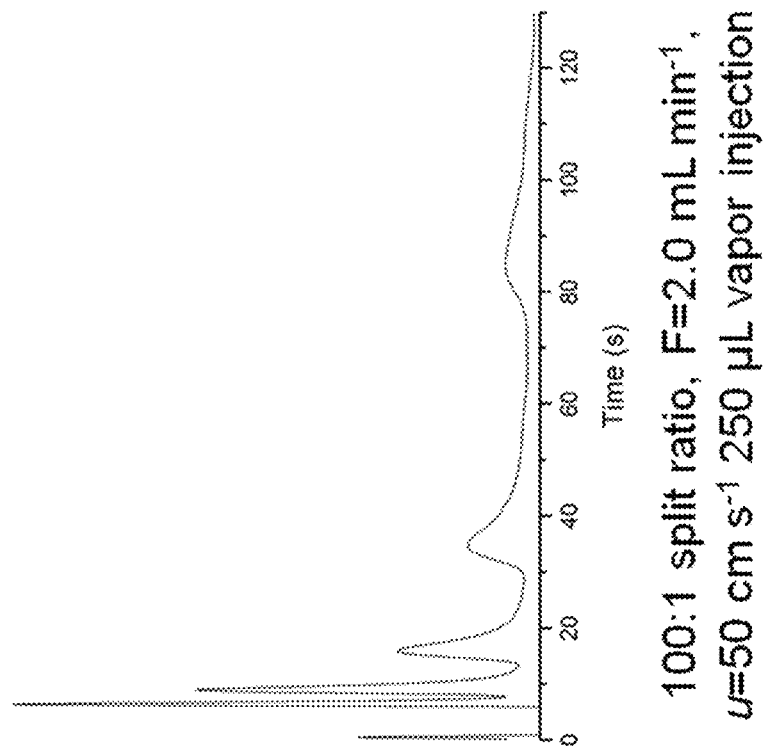
FIG. 31. Chromatogram of the elution of an alkane mixture through an exemplary microcolumn, where a PDMS stationary phase was prepared using a 15/70/15 PDMS/hexane/1,4-dioxane. The hollow channel was cleaned with dichloromethane.
Figure 30:
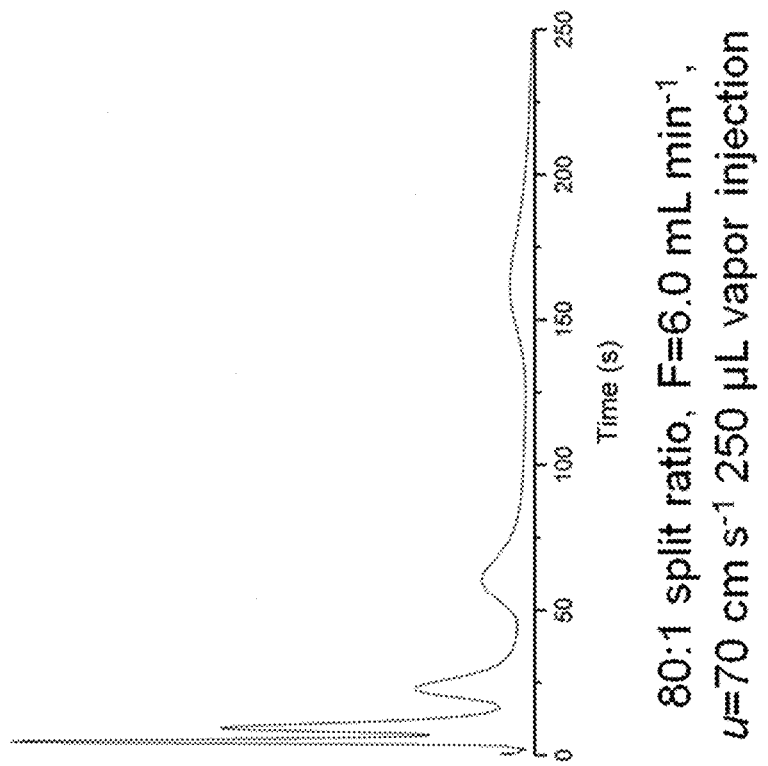
FIG. 30. Chromatogram of the elution of an alkane mixture through an exemplary microcolumn, where a PDMS stationary phase was prepared using a 15/70/15 PDMS/hexane/1,4-dioxane mixture. The hollow channel was cleaned with dioxane.
Figure 33:
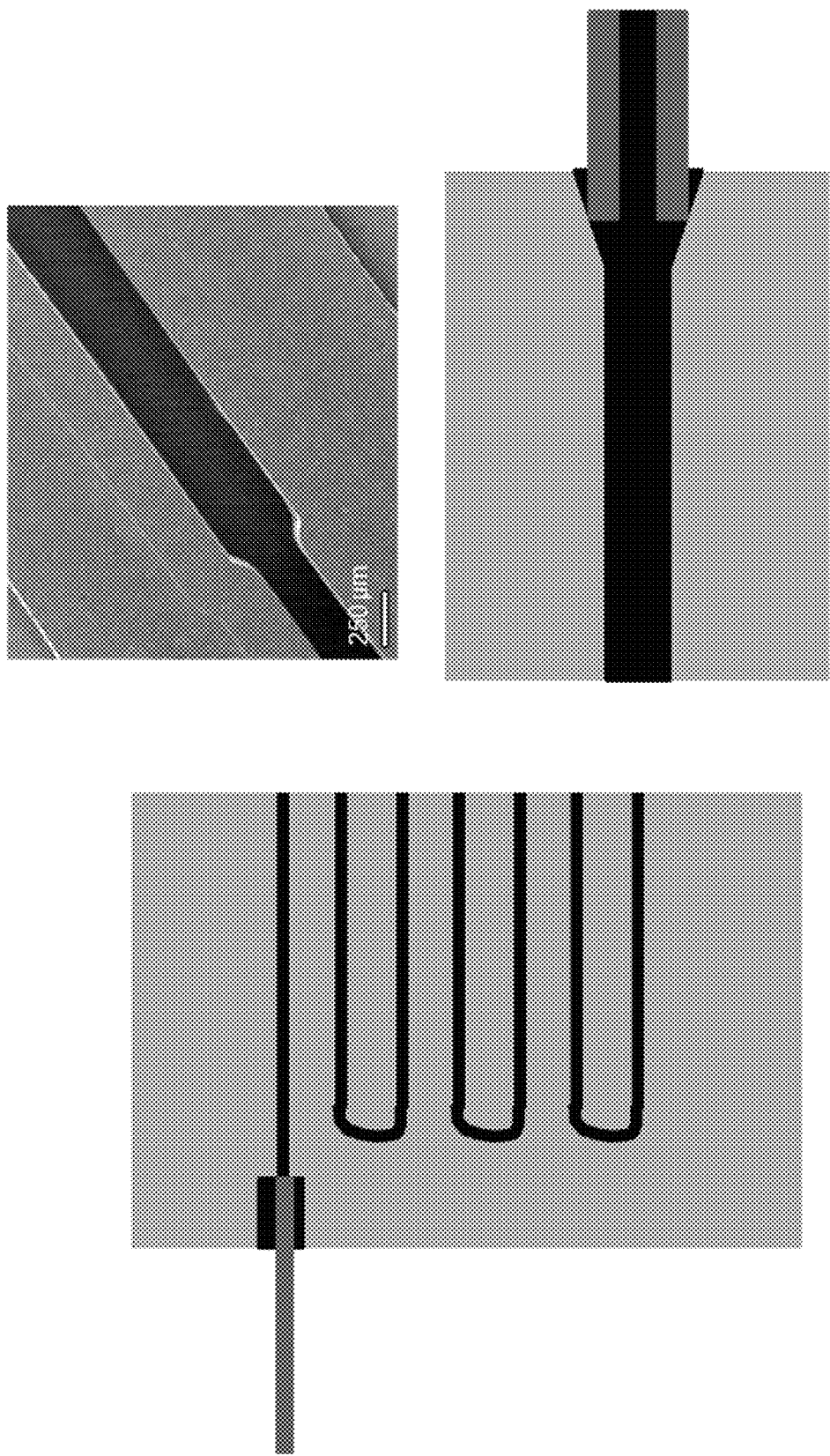
FIG. 33. SEM image and illustrations of a capillary connection scheme, where needle-templated hollow channel ends are formed. A taper may be molded in cast microcolumns. A taper may be forced.
Figure 34:
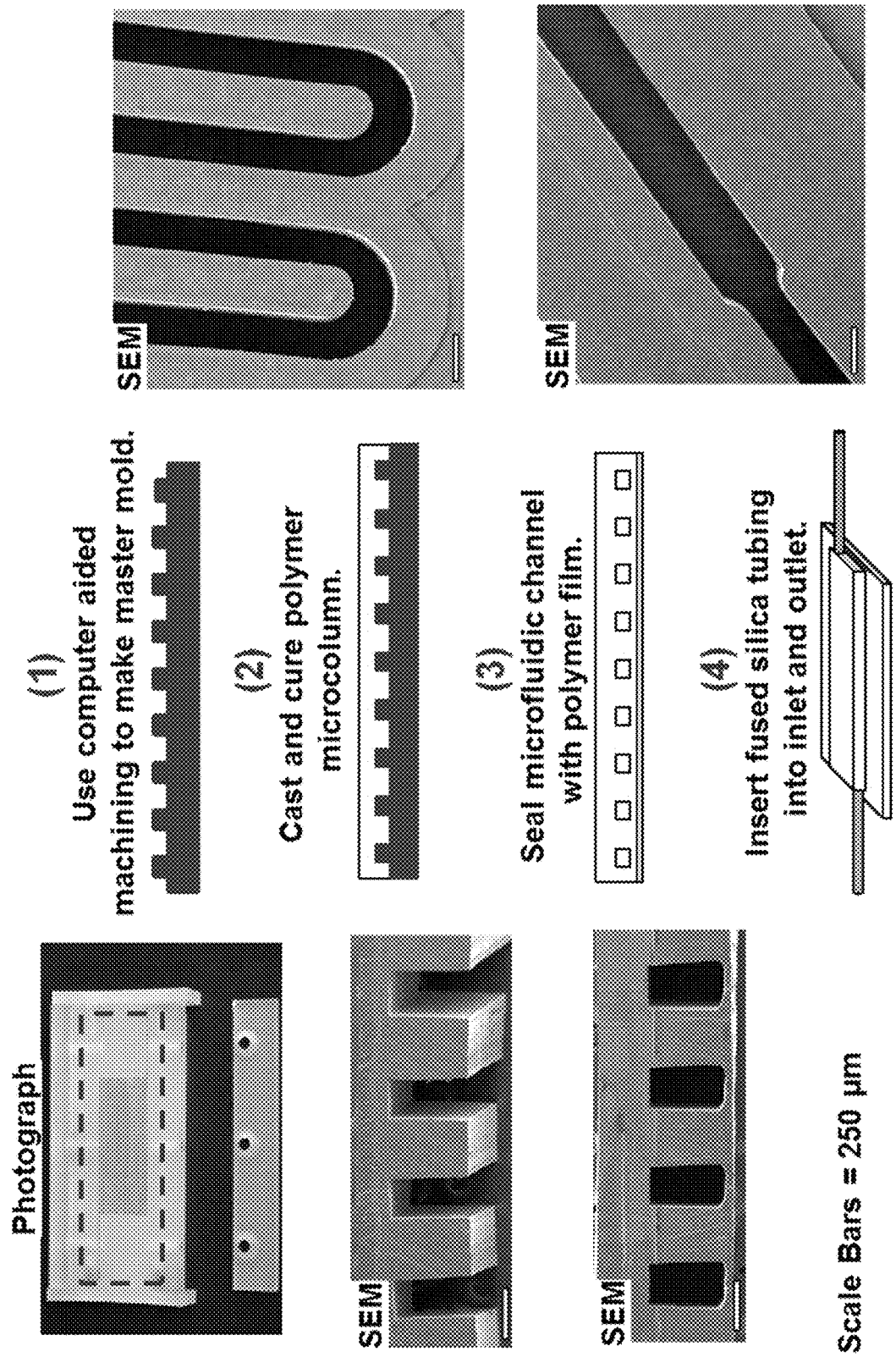
FIG. 34. Images and schematics corresponding to certain processes described in Suslick, et al. (U.S. Patent Publication No. 2015/0300998) or Rankin, et al. (J. M. Rankin, K. S. Suslick, "The development of a disposable gas chromatography microcolumn", in Chemical Communications, year 2015, volume 51 (43), pages 8920-8923).

Temperature Effects on Separation Efficiency:

We have also evaluated the effect of column temperature on the separation efficiency. FIG. 11 shows the chromatograms of a 10% DEDMS column that separating a sample of alkanes at different temperatures. At as low of a temperature as 35° C. some of the peaks became unresolved, but at 30° C. the separation efficiency is improved, as shown by the calculated theoretical plate counts in Table 5. The plate counts for the earliest eluting species are similar or greater than our previously reported polymer microcolumns, and much greater than any other polymer microcolumn reported. While the peak broadening of later eluting species remains a challenge, these columns show potential for efficient separations.

TABLE 5

Effect of column temperature on plate counts of alkane peaks.

| Temperature (° C.) | Heptane | Octane | Nonane | Decane |
|---|---|---|---|---|
| 25 | 1800 | 1100 | 330 | 120 |
| 30 | 2200 | 1400 | 500 | 200 |
| 35 | N/A* | N/A* | 350 | 200 |
| 40 | N/A* | N/A* | 400 | 150 |

REFERENCES

1. Suslick, K. S.; Rankin, J. M. Microcolumn for use in gas chromatography. Oct. 22, 2015, US Patent Appl. 2015/0300998.
2. Rankin, J. M.; Suslick, K. S., The development of a disposable gas chromatography microcolumn. Chemical Communications 2015, 51 (43), 8920-8923.
3. Dong, H. D.; Esser-Khan, A. P.; Thakre, P. R.; Patrick, J. F.; Sottos, N. R.; Whit, S. R.; Moore, J. S., Chemical Treatment of Poly(lactic acid) Fibers to Enhance the Rate of Thermal Depolymerization. ACS Appl. Mater. Interfaces 2012, 4 (2), 503-509.
4. Nguyen, D. T.; Kleiman, M.; Ryu, K. A.; Hiew, S.; Brubaker, K.; Mughnetsyan, R.; Truong, R.; Dolan, B.; Tackett, E.; Esser-Khan, A. P., Three-Dimensional Conformal Coatings through the Entrapment of Polymer Membrane Precursors. ACS Appl. Mater. Interfaces 2014, 6 (4), 2830-2835.
5. Kuo, J. S.; Chiu, D. T., Disposable microfluidic substrates: transitioning from the research laboratory into the clinic. Lab on a Chip 2011, 11 (16), 2656-2665.
6. Haghighi, F.; Talebpour, Z.; Sanati-Nezhad, A., Through the years with on-a-chip gas chromatography: a review. Lab on a Chip 2015, 15 (12), 2559-2575.
7. Lorenzelli, L.; Benvenuto, A.; Adami, A.; Guarnieri, V.; Margesin, B.; Mulloni, V.; Vincenzi, D., Development of a gas chromatography silicon-based microsystem in clinical diagnostics. Biosens. Bioelectron. 2005, 20 (Copyright (C) 2011 American Chemical Society (ACS). All Rights Reserved.), 1968-1976.
8. Lu, C.-J.; Whiting, J.; Sacks, R. D.; Zellers, E. T., Portable Gas Chromatograph with Tunable Retention and Sensor Array Detection for Determination of Complex Vapor Mixtures. Analytical Chemistry 2003, 75 (6), 1400-1409.
9. Lambertus, G.; Sacks, R., Stop-Flow Programmable Selectivity with a Dual-Column Ensemble of Microfabricated Etched Silicon Columns and Air as Carrier Gas. Analytical Chemistry 2005, 77 (7), 2078-2084.
10. Lambertus, G. R.; Fix, C. S.; Reidy, S. M.; Miller, R. A.; Wheeler, D.; Nazarov, E.; Sacks, R., Silicon Microfabricated Column with Microfabricated Differential Mobility Spectrometer for GC Analysis of Volatile Organic Compounds. Analytical Chemistry 2005, 77 (23), 7563-7571.
11. Kim, S. K.; Chang, H.; Zellers, E. T., Microfabricated Gas Chromatograph for the Selective Determination of Trichloroethylene Vapor at Sub-Parts-Per-Billion Concentrations in Complex Mixtures. Analytical Chemistry 2011, 83 (18), 7198-7206.
12. Potkay, J. A.; Lambertus, G. R.; Sacks, R. D.; Wise, K. D., A low-power pressure- and temperature-programmable micro gas chromatography column. J. Microelectromech. Syst. 2007, 16 (Copyright (C) 2011 American Chemical Society (ACS). All Rights Reserved.), 1071-1079.
13. Angell, J., Silicon micromechanical devices. Scientific American 1983, 248 (4), 44.
14. Terry, S. C.; Jerman, J. H.; Angell, J. B., A gas chromatographic air analyzer fabricated on a silicon wafer. Electron Devices, IEEE Transactions on 1979, 26 (12), 1880-1886.
15. Rogues, N. J. Flat Spiral Capillary Column Assembly With Thermal Modulator. U.S. Pat. No. 7,513,936 B2, 2009.
16. Sacks, R.; Coutant, C.; Veriotti, T.; Grail, A., Pressure-tunable dual-column ensembles for high-speed GC and GC/MS. J. High Resolut. Chromatogr. 2000, 23 (Copyright (C) 2011 American Chemical Society (ACS). All Rights Reserved.), 225-234.
17. Reidy, S. M. High-Performance Micro-Fabricated Gas Chromatography Columns For Complex Mixture Analysis. Dissertation, The University of Michigan, Online, 2009.
18. Reidy, S.; Lambertus, G.; Reece, J.; Sacks, R., High-Performance, Static-Coated Silicon Microfabricated Columns for Gas Chromatography. Analytical Chemistry 2006, 78 (8), 2623-2630.
19. Reidy, S.; George, D.; Agah, M.; Sacks, R., Temperature-programmed GC using silicon microfabricated columns with integrated heaters and temperature sensors. Anal. Chem. (Washington, D.C., U. S.) 2007, 79 (Copyright (C) 2011 American Chemical Society (ACS). All Rights Reserved.), 2911-2917.
20. Radadia, A. D.; Salehi-Khojin, A.; Masel, R. I.; Shannon, M. A., The fabrication of all-silicon micro gas chromatography columns using gold diffusion eutectic bonding. Journal of Micromechanics and Microengineering 2010, 20 (1), 015002.
21. Radadia, A. D.; Morgan, R. D.; Masel, R. I.; Shannon, M. A., Partially Buried Microcolumns for Micro Gas Analyzers. Analytical Chemistry 2009, 81 (9), 3471-3477.
22. Radadia, A. D.; Masel, R. I.; Shannon, M. A.; Jerrell, J. P.; Cadwallader, K. R., Micromachined GC Columns for Fast Separation of Organophosphonate and Organosulfur Compounds. Analytical Chemistry 2008, 80 (11), 4087-4094.

23. Pai, R. S.; Mott, D. R.; Stepnowski, J. L.; McGill, R. A.; Higgins, B. A.; Simonson, D. L. In Microfabricated Gas Chromatograph for Trace Analysis, Technologies for Homeland Security, 2008 IEEE Conference on, 12-13 May 2008; 2008; pp 150-154.

24. McGill, R. A.; Mott, D. R.; Nguyen, V.; Pai, R.; Stepnowski, J. L. Microfabricated gas chromatograph. U.S. Pat. No. 8,132,443 B2, 2012.

25. Matsuoka, S.; Nishino, M.; Kanai, M.; Nishimoto, T.; Takemori, Y.; Ueda, M.; Komori, K., Development of µGC (micro gas chromatography) with micromachined chip column. Shimadzu Hyoron 2010, 67 (Copyright (C) 2011 American Chemical Society (ACS). All Rights Reserved.), 61-69.

26. Masel, R. I.; Radadia, A. D. Micromachined Gas Chromatography Columns For Fast Separation of Organophosphonate and Organosulfur Compounds and Methods for Deactivating Same. US20090211452 A1, 2009.

27. Lu, C.-J.; Steinecker, W. H.; Tian, W.-C.; Oborny, M. C.; Nichols, J. M.; Agah, M.; Potkay, J. A.; Chan, H. K. L.; Driscoll, J.; Sacks, R. D.; Wise, K. D.; Pang, S. W.; Zellers, E. T., First-generation hybrid MEMS gas chromatograph. Lab on a Chip 2005, 5 (10), 1123-1131.

28. Lindner, D., The µChemLab™ project: Micro total analysis system R&D at Sandia National Laboratories. Lab on a Chip—Minituarization for Chemistry and Biology 2001, 1 (1), 15N-19N.

29. Lambertus, G.; Elstro, A.; Sensenig, K.; Potkay, J.; Agah, M.; Scheuering, S.; Wise, K.; Dorman, F.; Sacks, R., Design, Fabrication, and Evaluation of Microfabricated Columns for Gas Chromatography. Analytical Chemistry 2004, 76 (9), 2629-2637.

30. Kolesar, E. S., Jr.; Reston, R. R., Review and summary of a silicon micromachined gas chromatography system. IEEE Trans. Compon., Packag., Manuf. Technol., Part B 1998, 21 (Copyright (C) 2011 American Chemical Society (ACS). All Rights Reserved.), 324-328.

31. Bhushan, A.; Yemane, D.; Overton, E. B.; Goettert, J.; Murphy, M. C., Fabrication and Preliminary Results for LiGA Fabricated Nickel Micro Gas Chromatograph Columns. Microelectromechanical Systems, Journal of 2007, 16 (2), 383-393.

32. Sumpter, S. R.; Lee, M. L., Enhanced radial dispersion in open tubular column chromatography. Journal of Microcolumn Separations 1991, 3 (2), 91-113.

33. Ngan, M. L.; Lee, K. C.; Cheah, K. W., High power density laser etching of silicon. Journal of Applied Physics 1998, 83 (3), 1637-1641.

34. He, B.; Tait, N.; Regnier, F., Fabrication of Nanocolumns for Liquid Chromatography. Analytical Chemistry 1998, 70 (18), 3790-3797.

35. Reston, R. R.; Kolesar, E. D., Silicon-micromachined gas chromatography system used to separate and detect ammonia and nitrogen dioxide. I. Design, fabrication, and integration of the gas chromatography system. Journal of Microelectromechanical Systems 1994, 3, 134-146.

36. Chia-Yen, L.; Lung-Ming, F.; Ting-Fu, H.; Shih-Chung, C.; Che-Ming, C.; Wen-Cheng, K. In High-performance MEMS-based gas chromatography column with integrated micro-heater, 2010 Symposium on Design Test Integration and Packaging of MEMS/MOEMS (DTIP), 5-7 May 2010; 2010; pp 190-194.

37. Kolesar, E. D.; Reston, R. R., Silicon-micromachined gas chromatography system used to separate and detect ammonia and nitrogen dioxide. II. Evaluation, analysis, and theoretical modeling of the gas chromatography system. Journal of microelectromechanical systems 1994, 3, 147-154.

38. Halliday, J.; Lewis, A. C.; Hamilton, J. F.; Rhodes, C.; Bartle, K. D.; Homewood, P.; Grenfell, R. J. P.; Goody, B.; Harling, A.; Brewer, P.; Vargha, G.; Milton, M. J. T.; Halliday, J.; Lewis, A. C.; Hamilton, J. F.; Rhodes, C.; Bartle, K. D.; Homewood, P.; Grenfell, R. J. P.; Goody, B.; Harling, A.; Brewer, P.; Vargha, G.; Milton, M. J. T., Lab-on-a-Chip GC for Environmental Research. LC GC EUROPE 2010, 23 (Article), 514-+.

39. Liu, J.; Gupta, N. K.; Wise, K. D.; Gianchandani, Y. B.; Fan, X., Demonstration of motionless Knudsen pump based micro-gas chromatography featuring micro-fabricated columns and on-column detectors. Lab on a Chip 2011, 11 (20), 3487-3492.

40. Ohira, S.-I.; Toda, K., Micro gas analyzers for environmental and medical applications. Analytica Chimica Acta 2008, 619 (2), 143-156.

41. Bhushan, A.; Yemane, D.; Trudell, D.; Overton, E.; Goettert, J., Fabrication of micro-gas chromatograph columns for fast chromatography. Microsyst Technol 2007, 13 (3-4), 361-368.

42. Byunghoon, B.; Jihyung, K.; Junghoon, Y.; Qingmei, C.; Curtis, R.; Mark, S., Development of a portable gas analyzer using a micro-Gas Chromatograph/Flame Ionization Detector (micro-GC/FID) for NASA's environmental missions. In 42nd International Conference on Environmental Systems, American Institute of Aeronautics and Astronautics: 2012.

43. Serrano, G.; Reidy, S. M.; Zellers, E. T., Assessing the reliability of wall-coated microfabricated gas chromatographic separation columns. Sensors and Actuators B: Chemical 2009, 141 (1), 217-226.

44. Overton, E. B. Microstructure chromatograph with rectangular column. U.S. Pat. No. 6,068,684 A, 2000.

45. Masel, R. I.; Radadia, A. D.; Shannon, M. Column Design For Micro Gas Chromatograph. U.S. Pat. No. 8,123,841 B2, 2012.

46. German, J. H.; Terry, S. C. Gas Chromatography System And Detector And Method. U.S. Pat. No. 4,471,647 A, 1984.

47. Agah, M.; Potkay, J.; Sacks, R.; Wise, K. High-Performance Separation Microcolumn Assembly And Method of Making Same. US20040255643 A1, 2004.

48. Lewis, P. R.; Wheeler, D. R. Non-planar microfabricated gas chromatography column. U.S. Pat. No. 7,273,517 B1, 2007.

49. Chen, B.-X.; Hung, T.-Y.; Jian, R.-S.; Lu, C.-J., A multidimensional micro gas chromatograph employing a parallel separation multi-column chip and stop-flow µGC×µGCs configuration. Lab on a Chip 2013, 13 (7), 1333-1341.

50. Malainou, A.; Vlachopoulou, M. E.; Triantafyllopoulou, R.; Tserepi, A.; Chatzandroulis, S., The fabrication of a microcolumn for gas separation using poly(dimethylsiloxane) as the structural and functional material. Journal of Micromechanics and Microengineering 2008, 18 (10), 105007.

51. Noh, H.-s.; Hong-seok Noh, H.-s.; Noh, Parylene gas chromatographic column for rapid thermal cycling. Journal of microelectromechanical systems 2002, 11 (6), 718.

52. Lucklum, F.; Janssen, S.; Lang, W.; Vellekoop, M. J., Miniature 3D gas chromatography columns with integrated fluidic connectors using high-resolution stereolithography fabrication. Procedia Engineering 2015, 120, 703-706.

The invention can be further understood by the following non-limiting examples.

Example 1: Polymer Gas Chromatography Microcolumns Produced with a Sacrificial Template Introduction: Gas chromatography (GC) is a powerful tool for analyzing volatile samples, but traditional GC instruments are confined to laboratory use, due in large part to their bulk. The need to analyze volatile samples outside the laboratory and in real time has spurred the development of portable GC devices. Portable GC devices have already found commercial use in industrial and environmental applications, and there are ongoing efforts to further miniaturize the various components of GC instruments, including the GC column.

The first GC microcolumn was developed by Terry and Angell, who used photolithography to etch a channel into a silicon wafer.[1] Since the invention of the silicon GC microcolumn, other researchers have continued to improve upon microcolumn designs and incorporate silicon GC microcolumns into portable GC instruments.[2-5] The silicon chip-based GC microcolumns differ from traditional silica capillary columns in a number of ways. First, the photolithographed columns can be made in very compact patterns, making them much smaller than a coil of silica capillary tubing. Second, GC microcolumns are usually much shorter in length than a traditional GC column. The shorter length of a microcolumn gives it less resolving ability than a traditional GC column, but the smaller size and shorter analysis time granted by the shorter column may be desirable in a portable device collecting data in the field.

While silicon GC microcolumns have led been extensively studied and used, photolithography is an expensive and time-consuming process. There has been limited research into alternative materials and methods for producing GC microcolumns.[6-8] Our group previously developed an alternative disposable GC microcolumn using a polymer substrate rather than a silicon wafer.[9-16] Instead of relying on photolithographic techniques, the polymer GC microcolumn can be made using simple polymer molding and processing techniques. The polymer columns can be cast from a mold rather than etching the channel out of the substrate. Additionally, rather than applying the stationary phase after the column channel is created, we were able to use polymer phase separation to produce a thin stationary phase coating during the casting and curing of the column substrate. Using a polymer substrate, we demonstrated that functional GC microcolumns can be produced using fewer steps and much simpler techniques.

We have continued to improve the design and performance of polymer GC microcolumns, and a challenge we have addressed is the shape of the channel cross-section. Much like the most common photolithographic method to make silicon GC microcolumns, our molded polymer columns were produced with a rectangular channel cross-section, whereas a circular cross-section is the ideal shape to produce columns with the highest separation efficiency. There are reports of silicon GC microcolumns with various cross-sectional geometries, including circular or nearly circular geometry, but these columns required advanced etching techniques or having to align multiple pieces. In contrast to these methods, a GC microcolumn with a circular channel cross-section can be easily produced using a polymer substrate and a sacrificial channel template.

In this example we report the development of a disposable polymer GC microcolumn with a circular channel cross-section using a sacrificial fiber template. We also report the performance of these columns for the separation of small linear alkanes.

Experimental Section

Materials. Proxima HPR 2029 polydicyclopentadiene thermoset resin and Proxima CT 762 catalyst hardener were purchased from Materia. VascTech 300 μm diameter catalyst-treated polylactic acid fiber was purchased from CU Aerospace. 3M Scotchweld DP105, 3M Scotchweld DP125, and 3M Scotchweld DP190 were purchased from McMaster-Carr. Silica capillary tubing (FS-115, 360 μm outside diameter, 150 μm inside diameter) was purchased from Fisher Scientific. N-pentane, n-hexane, n-heptane, and n-octane were purchased from Sigma-Aldrich and used as received. Chromatograms were obtained using a Hewlett-Packard 5890 Series II gas chromatograph with a flame ionization detector.

Figure 35:
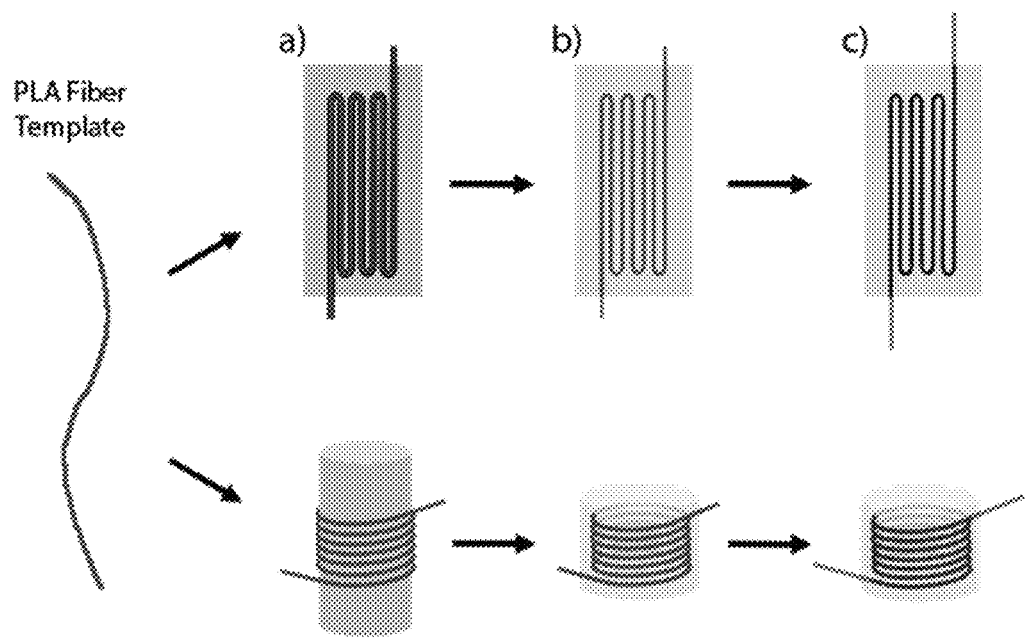
FIG. 35. A cartoon showing an exemplary method for making a microcolumn using a sacrificial fiber in accordance with the present invention. Microcolumns can be made to have any geometry. Exemplary two-dimensional (2D, top) and three-dimensional (3D, bottom) geometries are illustrated. The sacrificial PLA fiber is a) placed in a mold, then b) the substrate polymer is cast to encase the fiber. c) The fiber is evacuated from the substrate, leaving a channel, and fused silica capillaries are placed on the channel ends to connect the microcolumn to a GC system.

Column Production. A cartoon showing the general process to make a microcolumn is shown in FIG. 35. The columns were produced primarily in two different shapes—a two-dimensional serpentine design or a three-dimensional helical design. VascTech PLA fiber with a 300 μm diameter was used as the template for a circular cross-section column channel. The fiber is pretreated with a tin catalyst to vaporize under vacuum at elevated temperature. For the serpentine columns, an epoxy serpentine mold was used as an aid to hold the sacrificial fiber in the intended shape. With the mold prepared, 4.0 g HPR 2029 resin was mixed with 80 μL CT 762 catalyst. The mold was then placed under vacuum for 5 minutes to remove air bubbles and transferred to a 40° C. oven to cure for 4 hours. Once the resin had cured, the epoxy mold was removed with care to ensure the fiber remained adhered to the polyolefin substrate. Clear tape was used to form walls around the cured polyolefin, and another 4.0 g HPR 2029 was mixed with 80 μL CT 762 and added to completely cover the PLA fiber. The resin was once again degassed under vacuum before placing in an oven to cure as described before.

The cured polyolefin column was then placed in a vacuum oven at 190° C. for 24 hours to vaporize and remove the sacrificial fiber. A small awl was used to flange the ends of the channel, and 2.5 cm segments of fused silica tubing were adhered to the flanged column ends using an epoxy adhesive. The column is then submerged in water with air flowing through it to check for leaks. To remove any residue from the sacrificial fiber, about 5 mL acetone was eluted through the column, followed by an hour of a flowing air stream to remove remaining acetone.

The process to make a helical column is similar to the process for making serpentine columns. The sacrificial fiber is wrapped around a threaded cylindrical epoxy mold. With the mold assembled, a thin layer of thermoset polyolefin can be deposited over the fiber. The threaded cylindrical epoxy mold is made to be removed in pieces, and a small amount of epoxy can be added to the inside of the polyolefin ring as needed to fully cover the sacrificial fiber. For each casting step the polyolefin is degassed and cured as described above. Silica capillaries are attached to the column ends and the column is cleaned of residue as described for serpentine columns.

Dynamic Coating. To apply a stationary phase on a column, the dynamic coating method was used. Coating solutions were prepared ranging in concentration of 5-50 wt % OV-101 in hexane. The coating solution was injected into the column until about 10% of the length of the column was filled, then the plug was eluted through the column at a speed ranging from 1-10 mm/s. A syringe pump was used for this purpose to ensure the plug moved through the column at a consistent speed. After eluting through the column, the syringe pump continued to convey air slowly through the column for 1 hour. Then the column was transferred to a slightly faster air stream (1 mL/min) for 6 hours to remove any remaining solvent.

Analysis. The structure of the column was observed using scanning electron microscopy. Thin slices were cut from a column and sputter-coated with a gold-palladium alloy. SEM images were taken with a Hitachi S-4800 SEM operating at 10 kV accelerating voltage and 10 µA current.

To test the chromatographic ability of the GC microcolumns, they were connected to a Hewlett-Packard 5890 Series II gas chromatograph via silica capillary tubes 15 cm long leading from the injection port and FID and connected using PEEK union connectors. The carrier gas is helium. The mobile phase flow rate is set to 1.0 mL/min. A split ratio of 100:1 was used for sample injections. The test sample was a solution of n-alkanes from pentane to octane mixed in proportions to have approximately equal vapor pressure. 100-200 µL of the vapor above the solution was sampled for a GC run. The data was collected using the Chemstation (Rev. A. 10.01) software package. Chromatograms were processed and analyzed using Origin Pro.

Static Coating. A dilute coating solution of OV-101 in octane was prepared. A typical concentration was 5 mg/mL. The solution was degassed under vacuum before being injected into a column. Once the column was completely filled with the solution and no bubbles were present, the column was place under partial vacuum for 12 hours to remove the solvent.

Fiber Coating. One possible method to apply the stationary phase to the column channel is to apply the stationary phase as a thin layer on the sacrificial fiber prior to its embedment in the polyolefin substrate. We used a modified procedure based on the method of applying thin conformal polymer coatings developed by Esser-Kahn et al. A 1 m segment of the sacrificial PLA fiber was threaded through a thin polytetrafluoroethylene tube such that the ends of the fiber were secured at the ends of the tube. A mixture of PDMS, hexane, and 1,4-dioxane was prepared and transferred into the PTFE tube with the PLA fiber. The fiber was soaked with the solution for 1 hour before the solution was removed and the PTFE tube was filled with hexane to rinse the fiber. After the hexane was removed, the fiber and tube were placed in a 40° C. oven for several hours to dry and cure the thin polymer coating. The coated PLA fibers could then be used to make a column.

Results And Discussion:

The shape of a microcolumn channel affects its ability to separate a sample of analytes. For a given channel area, a circular channel cross-section will have the best separation efficiency. Previous reports of efforts to make microcolumns with circular cross-sections were limited by the lithographic process, and thus made columns with nearly circular geometry or produced two semicircular pieces which then had to be aligned together. If we were to make a polymer microcolumn by casting into a mold, as we had done in our previously reported work, we would run into similar challenges. Thus, we decided to make microcolumn channels by casting the polymer substrate around a sacrificial template.

Among the possible options for a sacrificial material, we chose PLA fiber.

Moore et al. have been developing a technique to use PLA in the production of microvascular polymers.[11-12] They found that if PLA is treated with a tin catalyst, such as tin(II) oxalate, the PLA will depolymerize to dilactide at 200° C. under vacuum. In these conditions, the dilactide is a vapor. This conversion of the solid template material to a gaseous product works well for making a GC microcolumn, where the template material needs to be removed from a long, thin channel. In comparison, attempts at making microcolumns by embedding a polyvinylalcohol fiber could only be cleared for short channel lengths (<10 cm length). For 1 m microcolumns, only a few centimeters on either end could be cleared.

Initially, epoxy resin was used to cast the polymer substrate. In our previous report we showed that an epoxy polymer substrate could be used to make a functional GC microcolumn. Epoxy can also be used to encase a sacrificial fiber, although the epoxy we used became slightly discolored after heating to vaporize the sacrificial template. An epoxy formulated for higher temperatures may be preferable. Not only is it important for the polymer substrate to withstand elevated temperatures, but the polymer substrate should also ideally be chemically inert so it does not interact with potential analytes. Considering an epoxy substrate, the polymer contains a variety of functional groups, including amine and hydroxyl groups that could interact with analytes and complicate the chromatographic separation. Thus, in considering different substrate polymer materials, we opted to switched to a thermoset polyolefin. HPR 2029, obtained from Materia, Inc., is a mixture of polydicyclopentadiene and polytricyclopentadiene. It is cured via ring opening metathesis polymerization using Grubbs' catalyst. The resulting polymer is temperature stable both for the vaporization of the sacrificial template and the operation of the GC microcolumn at up to 100° C. Also, the material is relatively inert since the material does not contain polar functional groups.

Figure 36A:
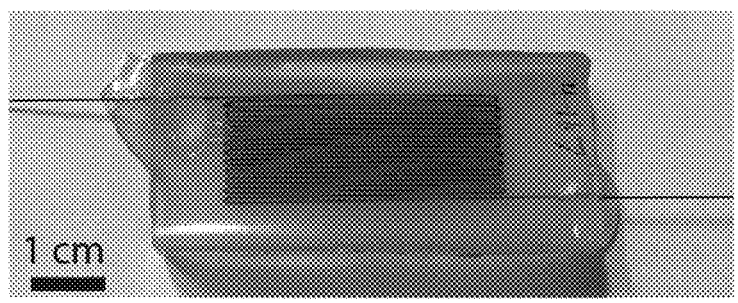
FIGS. 36A-36B. Photographs showing FIG. 36A) a serpentine and FIG. 36B) a helical column produced using a sacrificial fiber template. A dyed was added to the column channels to enhance the visibility.
Figure 36B:
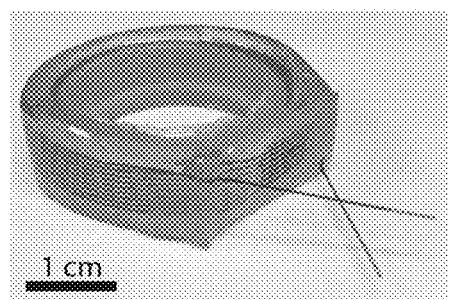

Photographs of representative microcolumns are shown in FIGS. 36A-36B. Columns have been made in both a two-dimensional serpentine configuration, as well as a three-dimensional helical configuration. The serpentine configuration is similar to our previous polymer microcolumns. The use of a fiber template for the column channel, however, allows for making columns of any arbitrary shape in two or three dimensions. In the case of either the serpentine or helical columns, usually two pours of the substrate monomer were necessary to ensure the sacrificial fiber was covered completely on all sides.

Figure 37A:
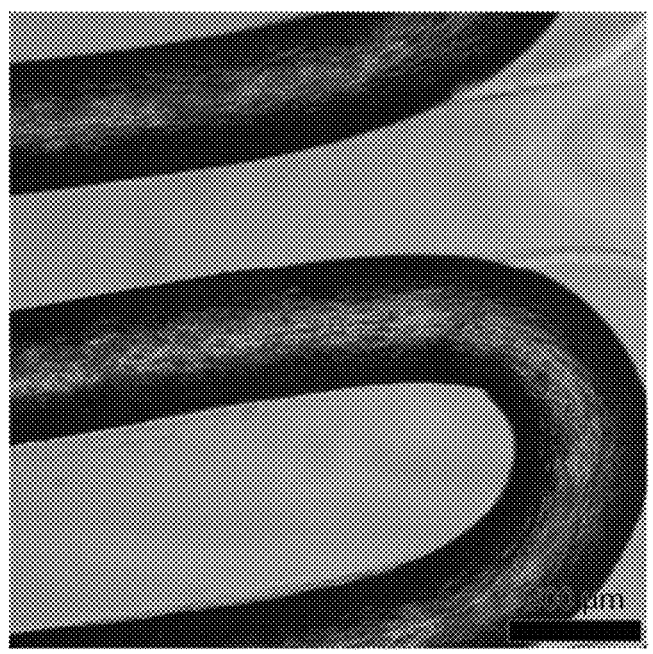
FIG. 37A. Optical micrograph showing a small segment of the channel formed from the sacrificial fiber template. The texture of the channel surface is apparent from the image. Some of the texture is due to the texture of the sacrificial fiber surface, but some is also due to remaining fiber residue. No irregularities were observed from air pockets or other potential defects along the fiber surface.
Figure 37B:
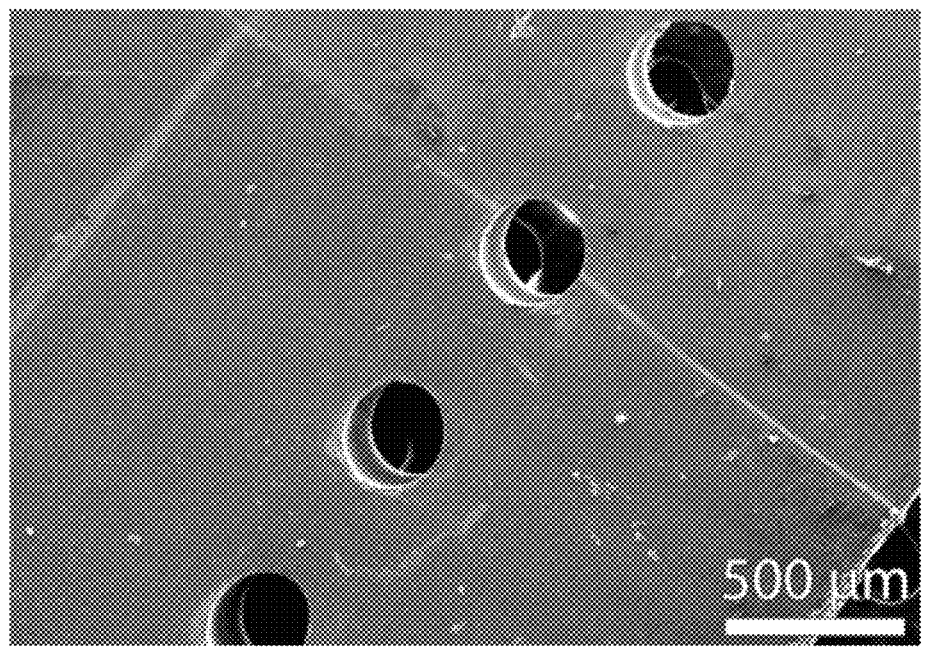
FIG. 37B. SEM image of a thin cross-sectional slice of a microcolumn. The column channels are circular in shape.

FIGS. 37A-37B provide a closer look at the microcolumn channels. FIG. 37A shows the channel of a serpentine microcolumn. The radial cross-section of a microcolumn, given in FIG. 37B, shows the circular geometry of the channel cross-section. Microcolumns were visually inspected for defects, but generally this procedure produces channels free of air pockets, and the channel wall is formed by the sacrificial fiber. FIGS. 37A-37B do show some texture on the channel wall. Some of the texture is attributable to the sacrificial fiber, which has striations along its length that are comparable to some of the features of the channel wall in FIG. 37A and FIG. 38C. Another source of surface roughness on the channel wall is residue from the fiber removal. The PLA fiber vaporization leaves behind some residue. The column channel is flushed with solvent to dissolve away any remaining fiber material, but this may not completely wash away parts of the fiber, such as the insoluble tin catalyst.

To identify potential residue on the channel surface, energy-dispersive X-ray spectroscopy (EDS) was used to analyze the channel surface of a polyolefin microcolumn. FIGS. 38A-38D show the results of the EDS analysis. In FIG. 38B, The inset SEM image shows where an EDS analysis was performed on the surface of the column channel, and the tin La peak indicates the presence of residual tin on the surface of the column channel. After washing a column with acid and solvent to clean fiber residue, FIG. 38D shows an EDS spectrum of the labeled section of the inset SEM image. The acid has effectively removed the presence of tin from the channel surface. The presence of tin and oxygen is consistent with the catalyst used to facilitate the vaporization of the fiber. Washing the channel with water or solvents does not remove the residue. Washing the microcolumn channel with acid was found to remove the catalyst residue, with greater acid concentrations being more effective. FIGS. 38A and 38C show optical micrographs of a column channel before and after it has been washed with 1 M HCl, respectively. The smaller rough features of the channel surface are removed, while the striations remain.

The stationary phase precursor is not included in the substrate monomer to form with the curing of the microcolumn. Instead, the stationary phase must be applied to the microcolumn similar to silicon microcolumns. Thus, dynamic or static coating can be used to apply a stationary phase. Another possible method of coating the microcolumn we considered was to apply the stationary phase as a thin coating on the sacrificial fiber prior to embedding it in the substrate polymer.[13] Of the methods we tried, dynamic coating has yielded columns with the best separation performance.

Figure 39A:
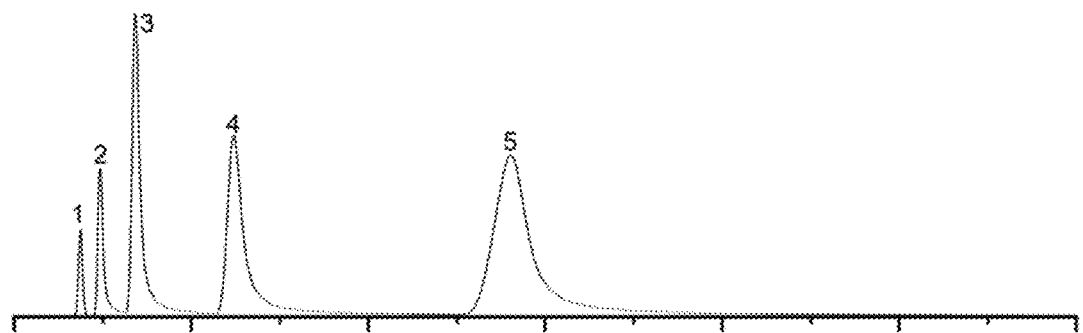
FIGS. 39A-39C. Representative chromatographic data for the separation of a sample of alkanes using sacrificial fiber template polymer microcolumns. The chromatograms in FIG. 39A and FIG. 39B are from serpentine and helical microcolumns, respectively. The chromatographic peak labels are: 1) methane, 2) pentane, 3) hexane, 4) heptane, and 5) octane. The chromatograms were obtained at 25° C. by injecting 100 μL of vapor from above a sealed analyte solution. The split ratio was 100:1. The chromatograms in FIG. 39A and FIG. 39B correspond to the lowest points of the Van Deemter plots shown in FIG. 39C, where the black graph is for the serpentine column, and the red graph is for the helical column. The plot shows plate height, H, in meters as a function of mobile phase linear velocity, $\bar{u}$, in cm s$^{-1}$.
Figure 39B:
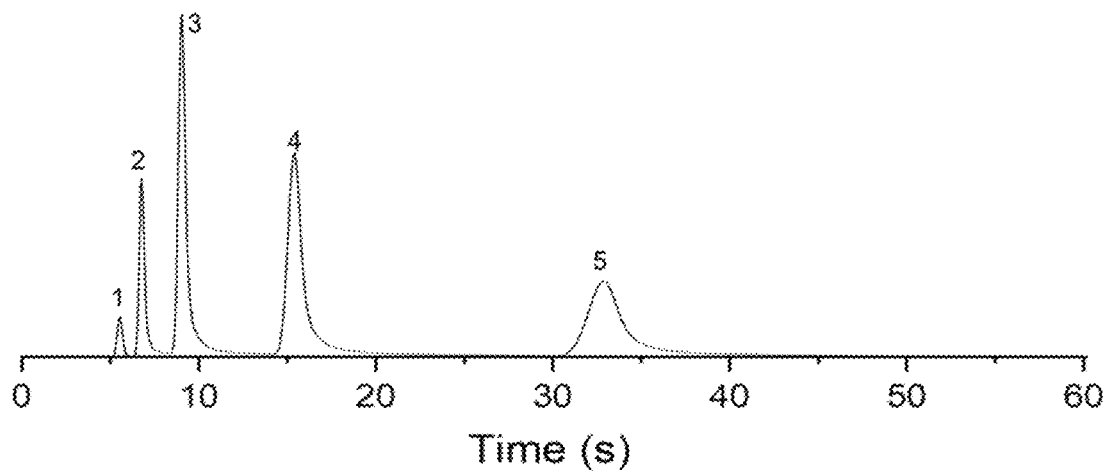
Figure 39C:
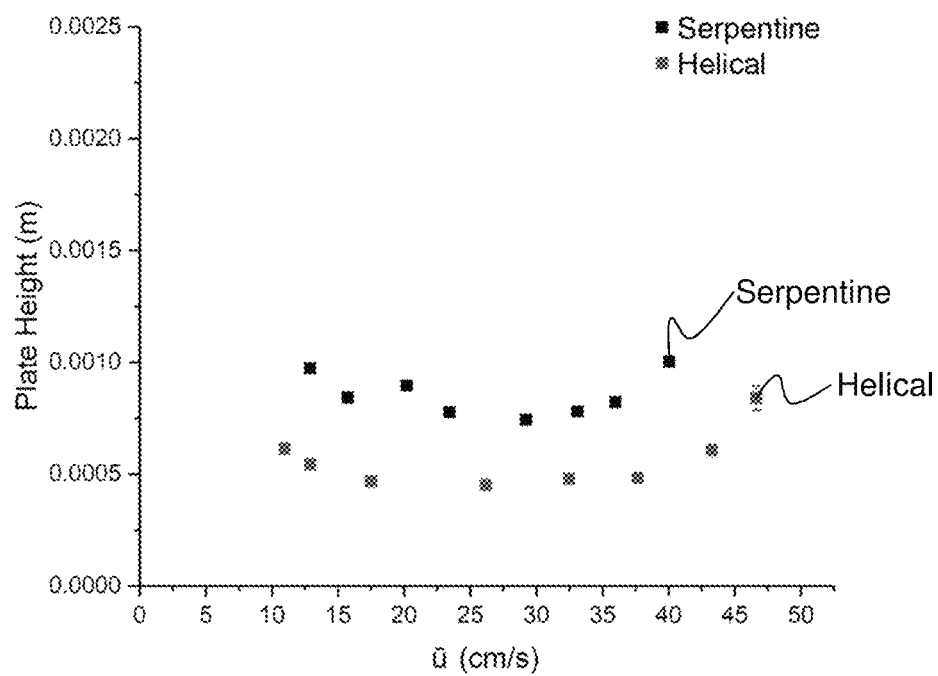

Solutions of OV-101 in hexane were used to coat the microcolumns. We chose the stationary phase and the n-alkane analytes in order to compare the performance of the sacrificial templated microcolumns with our previous molded polymer microcolumns. When dynamically coating the microcolumns, it was found that faster speed did not yield better coating, so we used near the minimum plug speed our system would allow. The concentration of OV-101 was varied to obtain different coating thicknesses. For the serpentine polyolefin microcolumns a 40% OV-101 solution produced columns with the highest theoretical plate count. A chromatogram of the separation of an alkane mixture is shown in FIG. 39A using a serpentine microcolumn dynamically coated using a 40% OV-101 solution as described. The pentane, hexane, heptane, and octane in the mixture are all clearly resolved. The highest theoretical plate count achieved for the serpentine microcolumns was 1300 m$^{-1}$. A Van Deemter plot for the serpentine microcolumn is shown in FIG. 39C as the black squares, and the smallest plate height is obtained between $\bar{u}$=30-35 cm s$^{-1}$. The modest separation performance of the serpentine microcolumns prompted us to search for possible problems that could hinder a chromatographic separation.

One problem observed with the serpentine microcolumns is inconsistencies at the column turns. The column turns are formed by folding the sacrificial fiber, and this process does not always produce turns of the same shape or radius. In addition, if the polymer substrate is insufficiently cured, heating the column can cause the fiber to contract and elongate the turn. These irregularities contribute to a decrease in plate count. In an experiment to test the effect of curing temperature and time on the elongation of the channel turns, we found that the ratio of the channel width at the turn to the channel width at a straight section of the column was greater than one for microcolumns allowed to cure less than 3 days at room temperature before being placed in a 35° C. curing oven. While the turn elongation is easily prevented, the other shape irregularities suggest the compact serpentine configuration may not be ideal with the sacrificial fiber. Modifying the column for wider turns may help with column consistency, but this would make the microcolumn less compact. Another option is to change the configuration of the microcolumn.

For two-dimensional microcolumns, serpentine or spiral configurations are mostly used. By using a sacrificial fiber to template the microcolumn channel, the configuration does not need to be limited to two-dimensional configuration, so we chose to use a helical design. The helical microcolumn configuration eliminates the sharp turns of the serpentine design. Unlike a spiral, the helical configuration we used maintains a diameter of 3 cm that minimizes racetrack effects while maintaining a compact size. The center of the helix was made hollow to keep the amount of substrate material around the channel thin for efficient heating.

Besides the change in configuration, the helical microcolumns were produced using the same procedure as the serpentine microcolumns. The stationary phase was applied using the dynamic coating method. In contrast to the serpentine columns, the best performing stationary phase was obtained when using a 15% OV-101 solution in hexane for the dynamic coating process. Testing the performance of the helical microcolumns showed that they outperform the serpentine microcolumns. FIG. 39B shows a chromatogram of an alkane solution separated using a helical column dynamically coated using a 15% OV-101 solution. In comparison to FIG. 39A, the peaks appear narrower with less tailing. The red plot in FIG. 39C shows a van Deemter plot for a helical microcolumn. FIG. 39C provides a direct comparison of the plate height of the serpentine and helical microcolumns, showing the improvement gained through changing the column geometry. The maximum plate count of the helical microcolumns was 2300 m$^{-1}$, an improvement over both the serpentine microcolumns described in this paper, as well as our initial polymer microcolumns.

The increased separation efficiency gained by changing to a helical configuration can be attributed to an increased uniformity of the microcolumn channel. All along the column length, the channel maintains a circular cross-section, and there are no points of channel elongation. Also, during a chromatographic separation the tight turns of the serpentine column introduce band broadening through the racetrack effect, whereas the helical configuration reduces this problem.

In consideration of the ease of producing the columns, being able to coat the sacrificial fiber with the stationary phase prior embedding it in the polymer substrate may be easier than using a traditional coating method, provided a consistent layer can be applied. We used both the Esser-Kahn method for applying a thin conformational silicone coating on PLA, as well as a simple method of dipping a PLA fiber in a stationary phase solution. In some cases, the columns produced using fibers coated with both methods had lower plate counts than the dynamically coated columns, and the peaks showed tailing. These results indicate that the stationary phase coatings may be inconsistent in under certain conditions. The inconsistency may lie partly in the coating methods used, as well as possible insufficiencies of the laboratory-scale apparatuses for coating long fiber lengths. Poor column performance, where applicable, may be due to the fiber residue covering the stationary phase or the removal of stationary phase material when washing the channel.

The performance of sacrificial fiber template polymer microcolumns may possibly be further improved using different coating methods, such as static coating. Similarly, 300 µm diameter PLA was used because it was a small diameter fiber available that was treated for vaporization, but a smaller diameter fiber may increase plate count. Regarding the types of samples that can be analyzed using polymer microcolumns, the compatibility of the polymer and the analyte is an important consideration. For example, toluene swells the PDCPD substrate polymer, which would interfere with separation of toluene-containing samples. Different substrate materials may have properties that make them more suitable for specific analytes, or improve other properties relevant to their use in the GC microcolumn.

Conclusions: We have developed a method to make polymer gas chromatography microcolumns with a circular channel cross section using a sacrificial fiber as a channel template. PLA fiber treated with tin oxalate was used as the sacrificial fiber material because it can be depolymerized and removed as a vapor under vacuum at 190° C. Both epoxy and PDCPD were used as column substrate materials, but the relative inertness and higher temperature tolerance of PDCPD made it a better column material. The use of a sacrificial fiber template allowed for 3-dimensional column configurations. A helically configured microcolumn coated with OV-101 was able to separate an alkane mixture with a plate count of 2300 $m^{-1}$.

References corresponding to Example 1:
1. Terry, S. C.; Jerman, J. H.; Angell, J. B., A gas chromatographic air analyzer fabricated on a silicon wafer. Electron Devices, IEEE Transactions on 1979, 26 (12), 1880-1886.
2. Reidy, S.; Lambertus, G.; Reece, J.; Sacks, R., High-Performance, Static-Coated Silicon Microfabricated Columns for Gas Chromatography. Analytical Chemistry 2006, 78 (8), 2623-2630.
3. Yuan, H.; Du, X.; Tai, H.; Yang, X.; Xu, M., MEMS-based column coated with reduced graphene oxide as stationary phase for gas chromatography. RSC Advances 2017, 7 (52), 32749-32756.
4. Hsieh, H.-C.; Kim, H., A miniature closed-loop gas chromatography system. Lab on a Chip 2016, 16 (6), 1002-1012.
5. Haghighi, F.; Talebpour, Z.; Sanati-Nezhad, A., Through the years with on-a-chip gas chromatography: a review. Lab on a Chip 2015, 15 (12), 2559-2575.
6. Lucklum, F.; Janssen, S.; Lang, W.; Vellekoop, M. J., Miniature 3D gas chromatography columns with integrated fluidic connectors using high-resolution stereolithography fabrication. Procedia Engineering 2015, 120, 703-706.
7. Noh, H.-s.; Hong-seok Noh, H.-s.; Noh, Parylene gas chromatographic column for rapid thermal cycling. Journal of microelectromechanical systems 2002, 11 (6), 718.
8. Malainou, A.; Vlachopoulou, M. E.; Triantafyllopoulou, R.; Tserepi, A.; Chatzandroulis, S., The fabrication of a microcolumn for gas separation using poly(dimethylsiloxane) as the structural and functional material. Journal of Micromechanics and Microengineering 2008, 18 (10), 105007.
9. Rankin, J. M.; Suslick, K. S., The development of a disposable gas chromatography microcolumn. Chemical Communications 2015, 51 (43), 8920-8923.
10. Suslick, K. S.; Rankin, J. M. Microcolumn for use in gas chromatography. Oct. 22, 2015, 2015.
11. Dong, H. D.; Esser-Khan, A. P.; Thakre, P. R.; Patrick, J. F.; Sottos, N. R.; Whit, S. R.; Moore, J. S., Chemical Treatment of Poly(lactic acid) Fibers to Enhance the Rate of Thermal Depolymerization. ACS Appl. Mater. Interfaces 2012, 4 (2), 503-509.
12. Esser-Kahn, A. P.; Thakre, P. R.; Dong, H.; Patrick, J. F.; Vlasko-Vlasov, V. K.; Sottos, N. R.; Moore, J. S.; White, S. R., Three-Dimensional Microvascular Fiber-Reinforced Composites. Advanced Materials 2011, 23 (32), 3654-3658.
13. Nguyen, D. T.; Kleiman, M.; Ryu, K. A.; Hiew, S.; Brubaker, K.; Mughnetsyan, R.; Truong, R.; Dolan, B.; Tackett, E.; Esser-Khan, A. P., Three-Dimensional Conformal Coatings through the Entrapment of Polymer Membrane Precursors. ACS Appl. Mater. Interfaces 2014, 6 (4), 2830-2835.

Example 2: Supplemental Descriptions

Optional supplemental descriptions and examples, for example relating to preparation of materials or testing procedures, may be found in Suslick, et al. (U.S. Patent Publication No. 2015/0300998) and in Rankin, et al. (J. M. Rankin, K. S. Suslick, "The development of a disposable gas chromatography microcolumn", in Chemical Communications, year 2015, volume 51 (43), pages 8920-8923), each of which is incorporated herein in its entirety. Some exemplary supplemental descriptions are provided below.

A reusable mold may made by micromachining polychlorotrifluoroethylene (PCTFE) with the negative relief of a serpentine channel design. An organosilane may be doped into a nonpermeable flexible epoxy, optionally yielding phase segregation of siloxane-rich phase. A mixture of n-alkanes (e.g., $C_5$-$C_{10}$) may be injected onto the column. Some exemplary useful materials may include two-part flexible epoxies (3M DP-190, DP-125, and DP-105) and polydimethylsiloxane two-part kit (Dow Corning Sylgard 184).

Figure 40A:
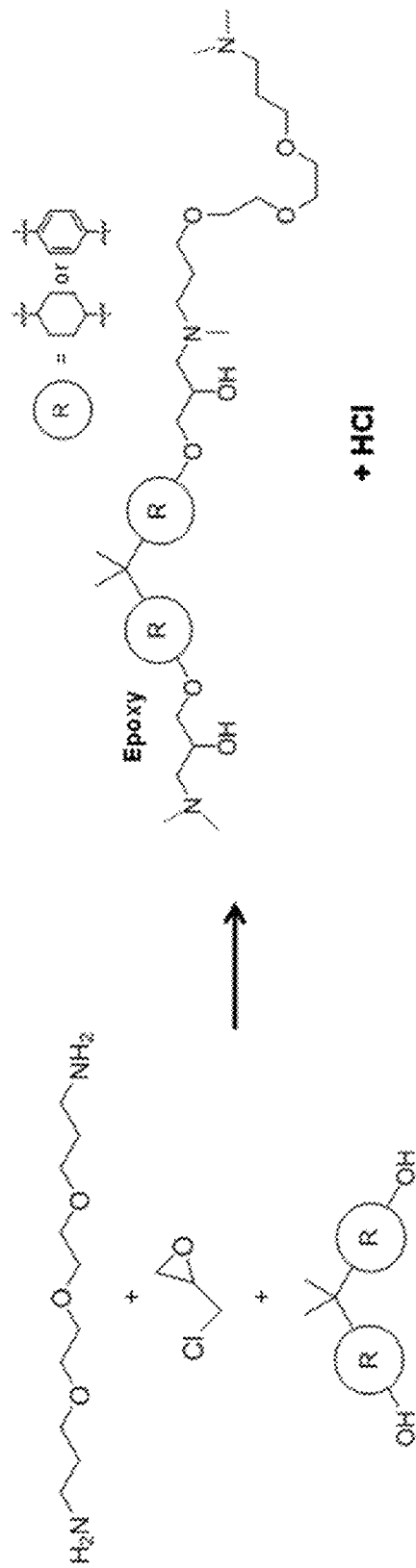
FIGS. 40A-40B. Polymerization reactions for the (FIG. 40A) epoxy (DP-190) and (FIG. 40B) organosilane (DEDMS) components of the thermoset polymer composite.
Figure 40B:
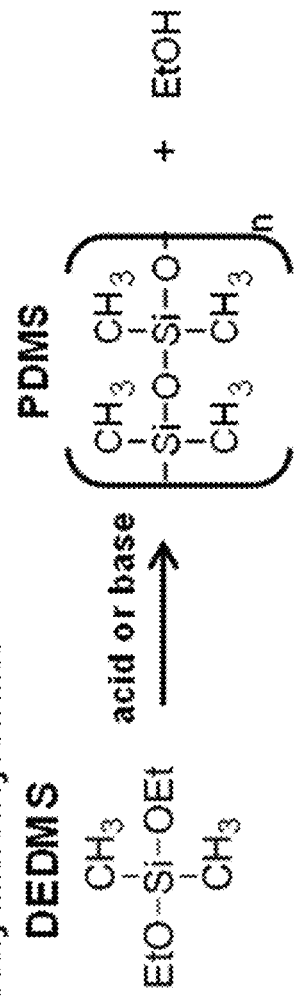
Figure 41:
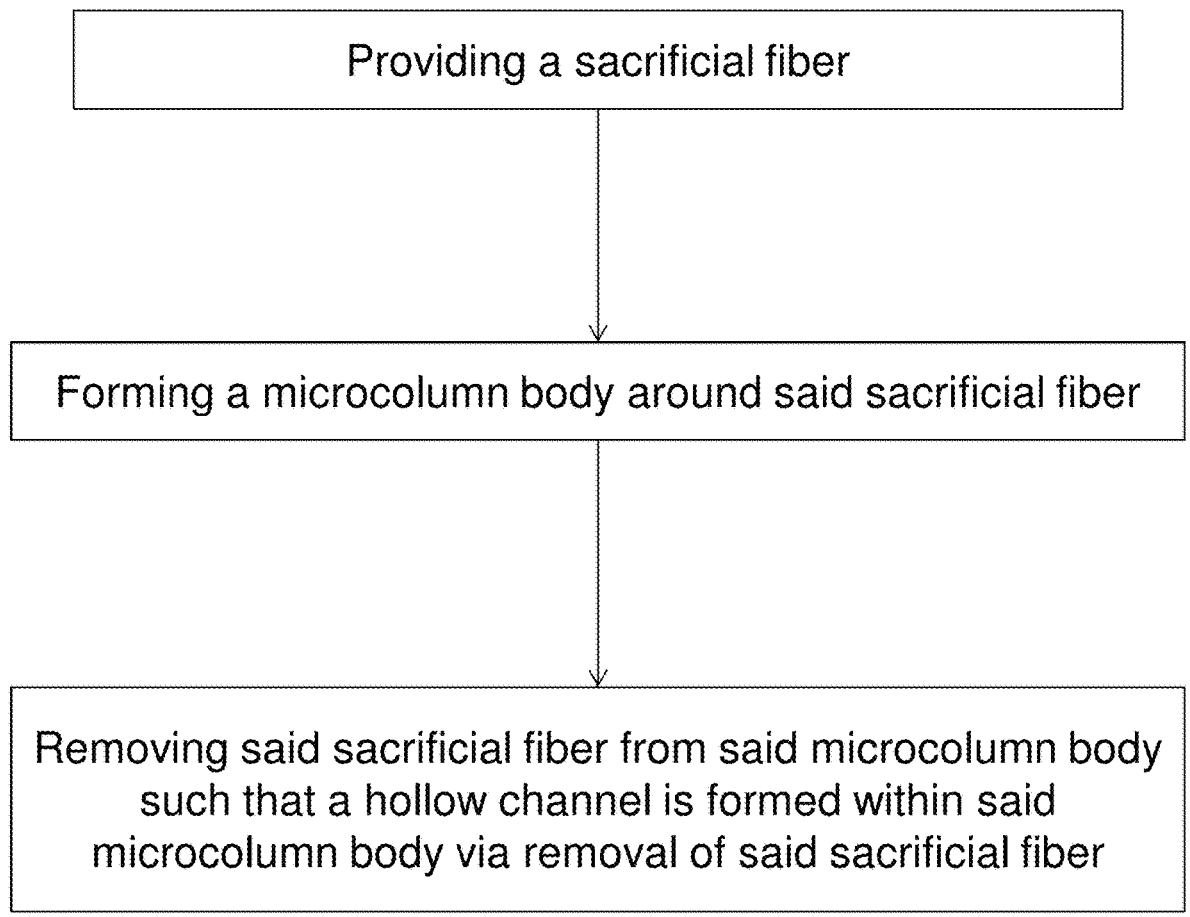
FIG. 41. Schematic of an exemplary method for forming a microcolumn according to the present invention.

Exemplary polymerization reactions of organosilane DEMDS and epoxy components are given in FIGS. 40A-40B. Phase separation may occur between an epoxy-rich phase and a siloxane rich-phase (the polymerizations may be largely independent). One byproduct of the polymerization of epoxy may be HCl, which is known to catalyze the condensation of alkoxysilanes. Alkoxysilanes form Si—O—Si bonds due their stability relative to Si—O—C or Si—N—C bonds. The condensation of DEDMS forms cyclic and oligomeric dimethylsilicones, similar to the well-known condensation of dichlorodimethylsilane. The product may or may not contain covalent linkages between the epoxy-rich and siloxane-rich regions.

Microcolumns having cross reactions between the epoxy monomer and siloxane monomer are also contemplated. GDMES (3-(glycidoxypropyl)dimetheyethoxysilane) may be used as an organosilane dopant, which may result in coupling of the glycidoxypropyl group to a majority phase epoxide occurs. The epoxy functionality on the organosilane additive may inhibit phase segregation of the siloxane and epoxy domains, yielding a uniform polymer with higher gas permeability.

The full cure time of flexible epoxies may be ~7 days, which may allow the small organosilane monomers, cyclics, and oligomers to diffuse to the surface. Siloxane film "thickness" may be tunable by shortening or lengthening the cure time of one or both components of the thermoset composite, which should change the diffusion characteristics of the siloxane through the polymerizing epoxy network and lead to either thicker or thinner siloxane-rich domains at the channel surface. The epoxy component may be changed or tuned to have similar materials properties but less surface functionality to reduce wall activity and improve the separation of polar analytes (e.g., amines, alcohols, etc.).

Polyimide coated fused silica capillary tubing may be inserted into the microcolumn inlet and outlet for connection to the GC injection and detector ports. DP-125 flexible epoxy may be used to bond the tubing to the microcolumn and produce a leak-free seal.

Column testing may be performed using an HP 5890 Series II GC/FID. The carrier gas may be helium set to a column head pressure of ~1 psi. Microtight unions may be used to connect the microcolumn to fused silica capillary tubing which may be connected to the injection port and FID detector. The presence of a single flow path may be confirmed from the symmetry of the methane peak. Data may be collected at a rate of 20 Hz using Chemstation software (Rev. A.10.02).

The microcolumn may be coupled with a colorimetric sensor.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Many of the molecules disclosed herein contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A method for forming a microcolumn, the method comprising steps of:
    providing a sacrificial fiber having circular cross-sectional shape;
    forming a microcolumn body around said sacrificial fiber; and
    removing said sacrificial fiber from said microcolumn body such that a hollow channel is formed within said microcolumn body via removal of said sacrificial fiber;
    forming a coating on an outer surface of said sacrificial fiber, wherein said coating forms a wall of said hollow channel during said step of removing of said sacrificial fiber, said wall comprising a stationary phase material; wherein said step of forming a coating comprises steps of solvent swelling and oligomer or polymer trapping of a stationary phase material; wherein:
    said hollow channel has a three-dimensional geometry; said hollow channel has a longitudinal axis; a three-coordinate system of space is required to fully describe all points along the longitudinal axis of the hollow channel;
    said hollow channel extends through said microcolumn body, and said hollow channel is continuous between a first end and a second end of said hollow channel; a cross-sectional shape of said hollow channel is circular between said first end and said second end of said hollow channel;
    said hollow channel has an inner diameter and an outer diameter defining a thickness of a wall of said hollow channel, and wherein said thickness of said wall between said first end and said second end of said hollow channel is within 10% of an average thickness of the wall;
    said inner diameter of said hollow channel is selected from the range of 10 to 1000 µm; said hollow channel has a length that is selected from the range of 10 cm to 100 m; said thickness of said wall is selected from the range of 0.05 µm to 10 µm; an inner surface of said hollow channel has a surface roughness $R_q$ of less than 0.20 µm; and
    said microcolumn has a theoretical plate count selected from the range of 50 to 15000 plates/meter corresponding to separation of one or more compounds selected from the group consisting of heptane, octane, nonane, decane, and any combination thereof.

2. The method of claim 1, wherein an inner surface of said hollow channel is substantially smooth.

3. The method of claim 1, wherein said sacrificial fiber has a circular cross-sectional shape and wherein said hollow channel has a cross-sectional shape that is substantially equivalent to a cross-sectional shape of said sacrificial fiber.

4. The method of claim 1, wherein an outer surface of said sacrificial fiber has a coating thereon; and wherein said coating forms a wall of said hollow channel during said step of removing of said sacrificial fiber, said wall comprising a stationary phase material; wherein said coating has a thickness, said thickness of said coating being substantially uniform between ends of said sacrificial fiber; and wherein said sacrificial fiber comprises one or more polymers.

5. The method of claim 4, wherein said step of removing said sacrificial fiber comprises thermally decomposing said sacrificial fiber, thermally depolymerizing said sacrificial fiber, solvent etching said sacrificial fiber, or a combination thereof.

6. The method of claim 1, wherein said stationary phase material comprises a monomer, a prepolymer, a polymer, or a combination thereof.

7. The method of claim 6, wherein said stationary phase material comprises one or more polymers selected from the group consisting of polydimethylsiloxane (PDMS), polyphenylmethylsiloxane, poly(trifluoropropyldimethyl) siloxane, polycyanopropyl-phenyl siloxane, diethoxydimethylsilane (DEDMS), polyethylene glycol, and any combination thereof.

8. The method of claim 4, wherein said sacrificial fiber comprises one or more polymers selected from the group consisting of a polyanhydride, poly(lactic acid) (PLA), a polyperoxide, polybutadieneperoxide, a nitrated polymer, nitrocellulose, a polymer that exhibits solid to gaseous decomposition at temperatures below 250° C., and any combination thereof.

9. The method of claim 4, wherein said sacrificial fiber comprises a catalyst to facilitate thermal decomposition or depolymerization of the sacrificial fiber; and wherein said catalyst comprises a metal.

10. The method of claim 1, wherein said sacrificial fiber is capable of being thermally depolymerized or thermally decomposed at a temperature equal to or less than 250° C.; and wherein said coating is thermally stable at a temperature up to 250° C.

11. The method of claim 1, wherein said thickness of said wall is substantially equivalent to a thickness of a coating on an outer surface of said sacrificial fiber.

12. The method of claim 1, further comprising a step of forming a mold, said mold comprising a channel recess feature; wherein said step of forming a microcolumn body comprises a step of inserting said sacrificial fiber into said channel recess feature of said mold; and wherein said step of forming a microcolumn body comprises a step of encasing said sacrificial fiber in a first pre-body material.

13. The method of claim 12, wherein said channel recess feature has a three-dimensional geometry; wherein said channel recess feature has a longitudinal axis; and wherein a three-coordinate system of space is required to fully describe all points along the longitudinal axis of the channel recess feature.

14. The method of claim 1, said method not comprising a step of lithographical etching of silicon.

15. The method of claim 1, wherein said microcolumn body is characterized by a gas permeability of less than 100 barrer; and wherein said stationary phase material is characterized by a gas permeability of at least 100 barrer.

16. The method of claim 1, wherein said microcolumn is a portion of a gas chromatograph or wherein said microcolumn is a portion of a portable gas chromatograph.

17. The method of claim 1, wherein said three-dimensional geometry is (i) corkscrew, (ii) spiral, (iii) helical, (iv) 3D stacked serpentine, (iv) double helical, (v) toroidal, (vi) that of a hollow tube wrapped around a torus, cylinder, cone, prism, and/or pyramid, or (vii) any combination thereof.

18. The method of claim 4, wherein said sacrificial fiber has a diameter selected from the range of 10 to 1000 µm; wherein said sacrificial fiber has a length that is selected from the range of 10 cm to 100 m; and wherein said coating has a thickness is selected from the range of 0.05 µm to 10 µm.

19. The method of claim 1, wherein said microcolumn body comprises one or more polymers.

* * * * *